United States Patent [19]

Sargeant et al.

[11] Patent Number: 5,491,463
[45] Date of Patent: Feb. 13, 1996

[54] POWER LINE COMMUNICATION SYSTEM

[75] Inventors: Matthew G. Sargeant; Michael A. Neal, both of Indianapolis, Ind.

[73] Assignee: Advanced Control Technologies, Inc., Indianapolis, Ind.

[21] Appl. No.: 84,711

[22] Filed: Jun. 28, 1993

[51] Int. Cl.[6] .................................................. H04B 3/00
[52] U.S. Cl. ........................... 340/310.01; 340/310.02; 340/310.04; 340/310.06
[58] Field of Search .................... 340/310 R, 310 A, 340/310 CP, 825.5, 825.22, 825.72, 825.69, 310.01, 310.06, 310.02, 310.04

[56] References Cited

U.S. PATENT DOCUMENTS

| | | | |
|---|---|---|---|
| 4,189,713 | 2/1980 | Duffy | 340/168 R |
| 4,200,862 | 4/1980 | Campbell et al. | 340/310 A |
| 4,367,455 | 1/1983 | Fried | 340/310 A |
| 4,377,754 | 3/1983 | Thompson | 307/114 |
| 4,387,371 | 6/1983 | Beker et al. | 340/825.52 |
| 4,398,178 | 8/1983 | Russ et al. | 340/310 A |
| 4,418,333 | 11/1983 | Schwarzbach et al. | 340/310 A |
| 4,429,299 | 1/1984 | Kabat et al. | 340/310 A |
| 4,430,639 | 2/1984 | Bennett | 340/310 A |
| 4,467,314 | 8/1984 | Weikel et al. | 340/310 CP |
| 4,518,945 | 5/1985 | Doyle et al. | 340/310 A |
| 4,524,288 | 6/1985 | Schimmelpennink et al. | 307/40 |
| 4,628,440 | 12/1986 | Thompson | 364/140 |
| 4,638,299 | 1/1987 | Campbell | 340/310 A |
| 4,703,306 | 10/1987 | Barritt | 340/310 CP |
| 4,755,792 | 7/1988 | Pezzolo et al. | 340/538 |
| 4,992,774 | 2/1991 | McCullough | 340/310 A |
| 4,998,024 | 3/1991 | Kirk et al. | 307/40 |
| 5,005,187 | 4/1991 | Thompson | 375/94 |
| 5,072,216 | 12/1991 | Grange | 340/825.52 |
| 5,109,222 | 4/1992 | Welty | 340/825.72 |

*Primary Examiner*—Donnie L. Crosland
*Attorney, Agent, or Firm*—Ice Miller Donadio & Ryan; Paul B. Overhauser; Doreen J. Gridley

[57] ABSTRACT

A power line communication system. The system includes at least one transmitter for generating and transmitting signals over a power line and at least one receiver for the receipt of signals transmitted over the power line. The transmitter and receiver(s) devices include a storing mechanism containing the address of the device and a programming port for electrical connection to a mating connector of a programmer. The programmer also includes a selector for selection of a desired address such that the address of the addressable device may be changed by the programmer. The transmitter also includes a timing mechanism for automatically retransmitting signals over the power line and the receiver includes a time measuring mechanism for ascertaining whether a signal has been received within a predetermined time period and a mechanism for setting the receiver in a default state should no signals be received within that time period. The invention also includes a test transmitter capable of generating and transmitting selected signals over the power line for testing the receivers connected to the power line, and a test receiver for monitoring and displaying both the data and the strength of signals transmitted over the power line.

27 Claims, 12 Drawing Sheets

| BIT PATTERN | FIRST NUMBER CODE | LETTER CODE | SPECIAL CODE (C5=0) OR ADDRESS CODE | SPECIAL CODE (C5=1) OR COMMAND CODE |
|---|---|---|---|---|
| 0110 | 1 | A | 1 | RESERVED #1 (NORMAL) |
| 1110 | 1 | B | 2 | RESERVED #2 (SHIFTED) |
| 0010 | 3 | C | 3 | ON (NORMAL) |
| 1010 | 4 | D | 4 | ON (SHIFTED) |
| 0001 | 5 | E | 5 | ALL UNITS ON (NORMAL) |
| 1001 | 6 | F | 6 | ALL UNITS ON (SHIFTED) |
| 0101 | 7 | G | 7 | BRIGHT (NORMAL) |
| 1101 | 8 | H | 8 | BRIGHT (SHIFTED) |
| 0111 | 9 | I | 9 | RESERVED #2 (NORMAL) |
| 1111 | 10 | J | 10 | RESERVED #2 (SHIFTED) |
| 0011 | 11 | K | 11 | OFF (NORMAL) |
| 1011 | 12 | L | 12 | OFF (SHIFTED) |
| 0000 | 13 | M | 13 | ALL UNITS OFF (NORMAL) |
| 1000 | 14 | N | 14 | ALL UNITS OFF (SHIFTED) |
| 0100 | 15 | O | 15 | DIM (NORMAL) |
| 1100 | 16 | P | 16 | DIM (SHIFTED) |

*Fig. 4*

POWER LINE COMMUNICATION SYSTEM

FIELD OF THE INVENTION

This invention relates to an electrical appliance control system, and, in particular, to a power line data transmission protocol for the control of various electrical appliances and a transmitter, receiver, test transmitter, test receiver and programmer for a power line communication system using such a protocol.

BACKGROUND OF THE INVENTION

The control of power to various electronic devices within a particular location has been achieved through the implementation of data communication over the location's power lines. Systems controlled in this manner include electronic appliances connected to electrical outlets, security alarm systems, garage door openers, lighting systems and the like. In general, a receiver is connected between the power line and each device to is be controlled, and at least one transmitter is connected to the power line. By utilizing the power line as the means for communication between the transmitters and receivers, such control systems may be installed without requiring the installation of additional wiring. Further, utilization of the power line also provides a greater physical range of control than may be available via infrared, ultrasonic or RF control systems.

Perhaps the most prevalent data protocol used today is what is known as the X-10 protocol developed by Pico Electronics of Fife, Scotland, and whose products are distributed in the United States by X-10 (USA) Inc. of Northvale, N.J. The X-10 power line data communication protocol is disclosed in U.S. Pat. Nos. 4,200,862, 4,628,440 and 4,638,299. Specifically, at a modulation frequency which is much greater than the 60 Hz AC signal, such as 120 KHz, the transmission of data is synchronized to the zero-crossing point of the AC power line. Each transmission is comprised of a start code (always set at 1110), an appliance or house code, and an operation or key code. The house code is composed of four bits representing the letters A through P. The key code is composed of five bits and either corresponds to either a number from one (1) to sixteen (16) or a particular operational command, such as ON, OFF, BRIGHT and DIM. The X-10 protocol supports up to 256 address codes as there are sixteen (16) letters and sixteen (16) numbers available as an address designation for an addressable device connected to the system. These 256 addresses are represented by A1–A16, B1–B16 ... P1–P16.

To ensure data integrity, both the house codes and key codes of the X-10 protocol are actually transmitted in true and complement form on alternate half cycles of the power line. For example, if the letter B is represented by the house code 1110, the pattern 10101001 is actually transmitted as the house code. Thus, transmission of the four (4) bit start code, the four (4) bit house code, and the five (5) bit key code takes a total twenty-two (22) cycles.

The data signals transmitted using the X-10 protocol are generally of the form:

[address][address] ... [function][function]

where "..." represents a pause or gap between transmissions of at least three (3) power line cycles in duration, "address" represents an address of a particular receiver and "function" represents the operation to be performed on the "address" transmitted. The "address" and "function" commands are each composed of a start code, a house code and a key code as described above and are repeated to ensure proper data integrity in the transmission. Further, several sets of "address" commands may be transmitted in succession such that the "function" command transmitted is applied to the preceding addresses transmitted. Thus, for example, to instruct receivers identified as A1 and A2 to be turned off, the following data pattern is transmitted:

[A1][A1]... [A2][A2]... [Aoff][Aoff]

Upon receipt of this command by the receivers connected to devices A1 and A2, power to the devices is disconnected by the receiver. Commands other than [Aoff], such as [Aon] or [Dim] (to dim lights) may also be used.

The limitation of the X-10 protocol in supporting only up to 256 addresses poses problems for those installations, such as large hotels, where it is necessary to support a significant number of receivers in excess of 256. The X-10 protocol also includes the capability for an "extended code." The extended code, a key code represented by the bit pattern 01111, is to be followed immediately, i.e., there is no gap in transmission, by a series of 8-bit bytes with the first 8-bit byte identifying the number of data bytes to follow. Though not yet known to be implemented in any commercially available product, use of the extended code would result in data transmission of a structure similar to the following example:

[Aext][Nbyte][byte 1][byte 2]... [byte N]

where "Nbyte" is the number of 8-bit bytes of data, "byte 1" to "byteN", to follow. The use of the extended code of the X-10 protocol is believed to have been designed to increase the number of available commands beyond [Aon], [Aoff] and [Dim], However, the extended code compromises data integrity as there are no gaps between successive bytes transmitted, nor are "Nbyte" and the data bytes following repeated. Moreover, the extended code does not provide a readily apparent method for supporting more than 256 address codes.

Another power line communication control system directed toward the provision of a security system for a hotel is disclosed in U.S. Pat. No. 4,367,455. As presented, the communications protocol utilized is described as generating modulation signals at 120 KHz over the 60 Hz AC line frequency and, like the standard X-10 protocol, is also limited to the support of 256 devices. To accommodate more than 256 address codes for devices connected thereto, it is suggested that more than one modulation frequency be implemented, with each modulation frequency supporting 256 address codes. This approach requires additional manufacturing costs for the system as the system must support the generation and receipt of multiple modulation frequencies. For example, each receiver may be required to recognize a multitude of frequencies. Alternately, isolation filters may be strategically installed, such as one after each circuit breaker, to isolate the power line after the filter to be receptive to only a particular frequency. Use of isolation filters does not require that each receiver be sensitive to all frequencies, but may require that different sets of receivers, each receptive to a specific modulation frequency, be manufactured and installed. Therefore, it is desirable to provide a power line communication protocol which is able to support more than 256 address codes without requiring additional hardware (other than, of course, the provision of additional receivers and possibly transmitters) thereby limiting manufacturing costs.

Another disadvantage of prior art systems is the implementation of application specific integrated circuits (ASICs) in both the transmitters and receivers to perform the communications protocol. Though the use of ASICs assists in reducing manufacturing costs for a large volume over other electronic solutions, hardware implementation of the protocol also results in inflexibility in implementing new command codes as a new ASIC must be developed to accommodate the new protocol codes. Therefore, it is desirable to develop an electrical appliance control system which utilizes a microprocessor and associated software to afford the manufacturer or user greater flexibility in creating new commands to be transmitted, received and interpreted. For example, it may be desirable to implement a set of codes which correspond to various levels of dimming for lights connected to the control system as opposed to simply offering a DIM or BRIGHT command code. Additionally, the use of software is preferable as it provides a mechanism whereby the actual power line communication protocol may be changed if desired. For example, the same software may be utilized to support a system having a particular protocol which supports up to 256 address codes as may be used to support a system having a different communication protocol to support 4096 or more address codes.

Though power line communication protocols use various transmission standards to ensure that noise is not interpreted as a command, present power line control systems do not provide a mechanism whereby precautions are taken to ensure that a transmitted signal is received by the appropriate receiver. Thus, for example, should a utility company desire to command a household's water heater to be disconnected for load shedding purposes, and the power line is noisy or a temporary interruption of the provision of power occurs during transmission of that signal, the water heater will not be turned off (or back on). Therefore, it is desirable to provide an automatic refresh capability whereby the signal is continually transmitted at specified time intervals to ensure that the command is received regardless of the presence of temporary noise or power interruption in the power lines connected the transmitter to the receiver.

It is also possible for problems of longer duration than may be cured by an automatic refresh capability to occur with systems of the prior art. Under circumstances such as a long power interruption or the presence of noise over an extended period of time, an electrical appliance connected to the system may be left in an undesirable state. For example, an appliance may be left on for a longer period than desired. Therefore, it is desirable to provide a power line communication system which automatically determines that communication to the receivers of the system is operating improperly and to thereby instruct the electrical appliance to return to its default state, such as turning off the appliance connected to the receiver.

To assist in installing or maintaining of a power line communication system, a test transmitter and a test receiver are often provided for prior art systems. Generally, the test transmitter is one which, when electrically connected to system, generates a test signal. For example, the test transmitter Model No. 6269 offered by X-10 (USA) Inc. for use with its products continuously generates P1 on/off signals when the test transmitter is plugged into an electrical outlet of the power line communication system. To ensure that the test signal is being transmitted over the power line, a test receiver indicating signal strength, such as test receiver Model No. 6270 offered by X-10 (USA) Inc., is provided for electrical connection to the power line. In this manner, the user may be assured that it is possible for a data signal transmitted over the power line to be received by a receiver connected to the system. Specifically, if an error condition is detected, it is likely that excessive noise or spurious electronic signals are present along the signal transmission line.

However, such test transmitters and test receivers are not useful when attempting to determine whether a particular addressable device, such as a transmitter or a receiver, is operating properly as prior art test transmitters generate a special test signal to ascertain whether the transmission line is acceptable. For example, if a particular device connected to a receiver of the system does not respond as commanded by a transmitter of the system, it would be useful to ascertain whether the receiver or the transmitter, not the transmission line, is in proper working condition. Therefore, it is desirable to provide a test transmitter which is able to transmit any specified data signal to any receiver connected to the system and to provide a test receiver which can "listen" to the data signals transmitted over the power line and provide a visual or audible indication of the received signal. In this manner, the receivers and transmitters themselves may be tested. Additionally, given the multitude of receivers and transmitters connected to the system, it is also desirable to provide portable test transmitters and receivers and to provide a means for selecting the address to which a command is to be transmitted or for which a signal is to be monitored. Finally, rather than a test receiver simply indicating an error condition as is known in the art, it is desirable to provide a visual display which displays the data signal received by the test receiver. Such a display may also be desirable for a test transmitter so that the operator can verify that the data signal transmitted is the same as was intended and programmed by the operator.

As stated above, electrical appliance control systems require that each device connected to the system that is to be individually controlled be uniquely identified. Thus, a means is provided with each receiver for selecting the designated address code of a particular receiver for controlling a device connected to the receiver. Transmitters connected to the system may also have an address code associated therewith as well. For example, the receivers of U.S. Pat. No. 4,200,682 utilizes two sixteen-position rotary switches for the selection of the address of the receiver—one rotary switch for selection of the house code and another rotary switch for selection of the device or key code of the X-10 protocol. The switches of U.S. Pat. No. 4,200,682 allow up to 256 address codes to be utilized in the system. Similarly, the receivers of U.S. Pat. No. 4,418,333 each have two rotary switches for selection of the house and unit codes, respectively, with each switch having sixteen positions resulting in support for 256 addresses. The track lighting system of U.S. Pat. No. 5,072,216 utilizes two sixteen-position switches to allow a total of 256 unique address codes to be set for the individual lights of the system.

In many applications, there are physical constraints as to the size of the receiver. For example, the receiver may comprise an electrical outlet and therefore must be of the same size as a standard outlet receptacle. If a system is to provide the capability to select a multitude of addresses, more switches or more complex switches having a greater number of switch positions may be required. Thus, increased addressing capability by using physical switches results in higher manufacturing costs and may result in a unit which exceeds the physical constraints of the unit's installation site.

Additionally, the provision of mechanical switches on each receiver and possibly on each transmitter provides a means for selecting the address of the unit which is easily accessible to the consumer. However, these switches are also accessible to those individuals not authorized by the consumer thereby allowing an unauthorized individual to improperly alter the address of the receiver/transmitter so that the system behaves in an undesirable manner or renders the system essentially inoperable. Therefore, it is desirable to provide a means for selecting the address code of each addressable unit connected to the system that does not utilize mechanical switches and which is not easily accessible to unauthorized personnel.

OBJECTS OF THE INVENTION

Accordingly, it is one object of the present invention to provide a power line communication data protocol which is able to support more than 256 address codes and which uses a transmission protocol implementable by presently available devices.

It is another object of the present invention to provide a power line communication protocol which ensures data integrity by utilizing transmission protocols which have become accepted as standard in the industry.

It is still another object of the present invention to provide a power line communication protocol which is able to support 4096 or more receivers without requiring additional hardware or special hardware capabilities that are not required for a power line communication system which supports only 256 receivers.

It is yet another object of the present invention to provide a power line communication control system which utilizes microprocessor-based software to manage the data protocol so that additional command codes or variations to the data protocol may be made without modifying the hardware of the transmitters and receivers of the system.

It is another object of the present invention to provide a power line communication control system which ensures that commands are sent and received as desired despite the presence of noise or a temporary power interruption by providing an automatic refresh capability whereby the signal repeatedly transmitted at a specified time interval.

It is yet another object of the present invention to provide a power line communication system in which the receivers of the system are reset to the receiver's default state in the event the receiver has not received a signal for a significant amount of time as may be caused by the presence of a lengthy power interruption or the presence of noise over the power line for a predetermined amount of time.

It is still another object of the present invention to provide a test transmitter which is portable and which can be programmed for transmitting a signal to any address.

It is an object of the present invention to provide a test receiver for a power line control system which is portable and which can display all data signals transmitted over the system.

It is yet another object of the present invention to provide a power line control system which is able to support more than 256 address codes without requiring the implementation of mechanical switches for address selection of a particular addressable unit connected to the system so as to limit manufacturing costs, to ensure that the receiver is able to reside within the physical limitations established for the receiver, and to assist in prohibiting unauthorized personnel from accessing the address selection mechanism.

It is yet another object of the invention to provide a programmer for a power line control system that uses an identical interface for receivers and transmitters in the system and which may be used to program an address into a receiver or transmitter.

BRIEF DESCRIPTION OF THE DRAWINGS

FIG. 4 shows a table of one embodiment of the bit pattern values of codes transmitted according to the communications protocol of FIG. 3.

SUMMARY OF THE INVENTION

Figure 1:
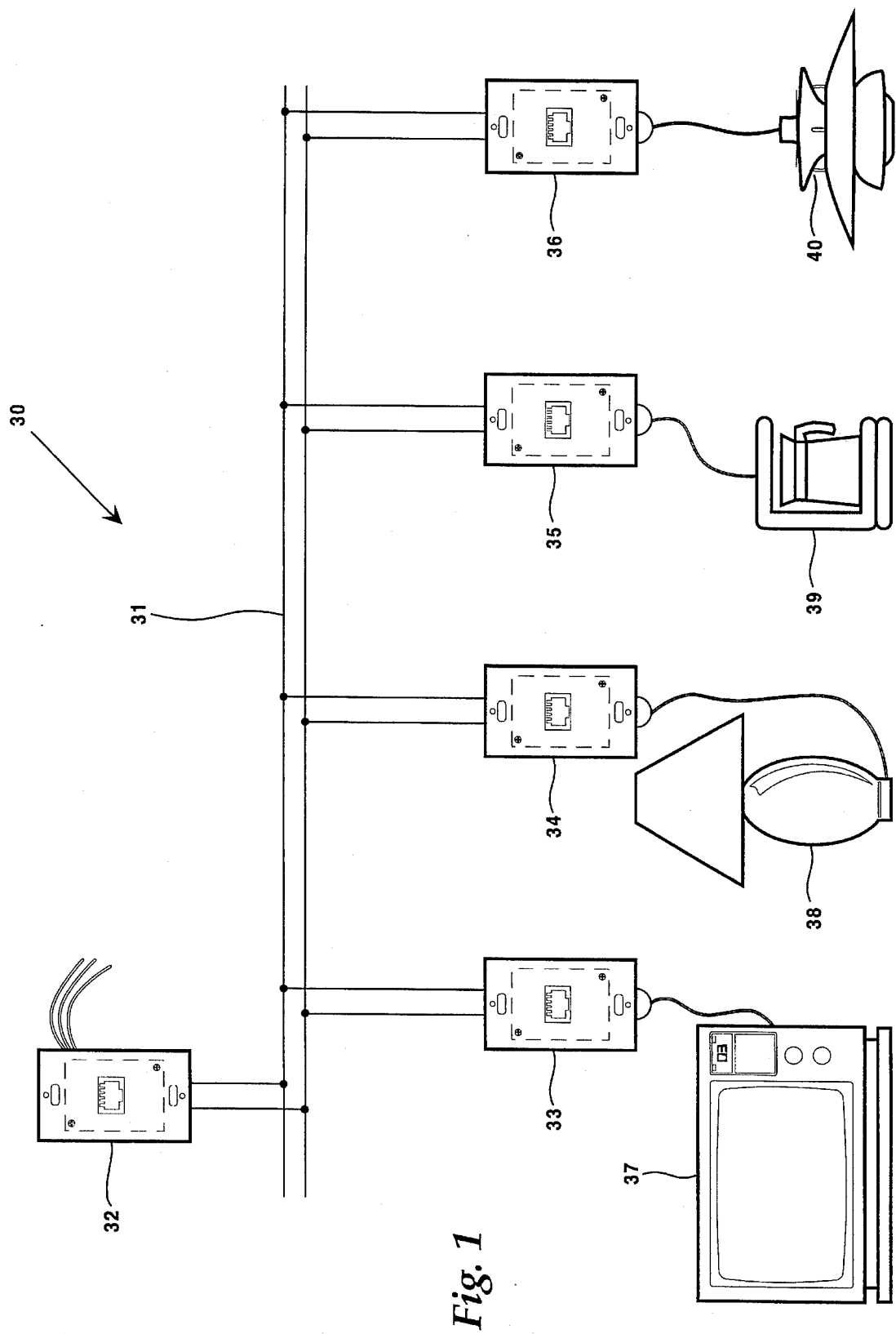
FIG. 1 shows a diagrammatic view of the power line communication system according to the present invention.

The invention comprises a power line communication system having numerous advantages over the prior art. The system includes at least one transmitter for electrical connection to a power line for transmission of a data signal over the power line at a frequency much greater than the frequency of the power line with the signal's data bits transmitted at the zero crossing of the power line signal. The system also includes at least one addressable receiver for electrical connection to the power line and capable of receiving the data signal generated by the transmitter. In one embodiment of the system, the data signal is of a format making it possible to address at least 4096 unique addresses by implementation of an address command comprising a start code, a first number code, an extended code, a letter code and a second number code to represent devices having an address code of 1A1 to 16P16. In a second embodiment, the transmitter includes a means for generating and transmitting data signals of a plurality of data protocols and a means for selecting a desired data protocol so that the system is capable of supporting addressable receivers using a variety of data protocols.

The transmitter, in one embodiment, further comprises a timing means for automatically retransmitting a previously transmitted signal onto the power line after a predetermined time period. This "refresh" capability helps to ensure that the signal is received by the intended addressable device despite an interruption of power or the presence of temporary noise or other interferences over the power line. The receiver of the present invention may also include a means for measuring the time since the last data signal was received by the receiver and a means for causing the appliance connected to the receiver to enter its default state should the time measured exceed a predetermined amount of time. When the receiver includes this refresh capability, the presence of an excessive delay in receipt of a signal as may be caused by a lengthy power interruption does not permit the receiver to remain in an undesirable state.

In another embodiment of the system, the transmitters and/or receivers have a means for storing a programmable address code therein and an electrical programming port connector operatively connected to the address code storing means. The system further includes a programmer having a mating connector for connection to the electrical programming port connector of the addressable devices, a means for selecting a desired address code and a means for electrically transmitting the selected address code over the mating connector, such that upon transmission of the selected address code from the programmer via the electrical programming port connector of the addressable device, the selected address is stored by the device. In this manner, no mechanical switches are used for address selection, thereby reducing manufacturing costs of the addressable device, ensuring that the physical size of the addressable device remains within physical limits established regardless of the range of address codes available, and assisting in prohibiting unauthorized access to address selection. In one form thereof, the receivers and transmitters of the system have identical electrical programming port connectors. In another form thereof, the receivers and transmitters are responsive to inquiries sent from the programmer wherein in format in regarding the status of the device is transmitted in response to a specific signal received by the programmer. Thus, many of the same elements are implemented in all addressable devices, whether a transmitter or a receiver, to provide the user with status information about the particular device.

In yet another embodiment, the addressable devices (transmitters and receivers) also comprise a means for storing a password and a means for preventing the alteration of the device's address code unless the device also receives a password which is the same as the password stored in the device. This prevents an unauthorized user having a programmer as discussed above from changing the address code to thereby enhance the system's security.

In addition to the programmer of the present invention having the capability to program the device's address code or to require as to the device's current status, in one embodiment the programmer is also a test transmitter. The test transmitter includes a means for connecting the test transmitter to the power line and a means for generating a data signal, wherein the data signal includes an address code for designating an addressable device and a command code for designating the electrical function, such as ON or OFF, to be performed by the addressable device.

The system also comprises a test receiver having a means for connecting the test receiver to a power line and a means for displaying the data contained in a signal transmitted over the power line, such that upon occurrence of a signal over the power line, the test receiver displays the address of that signal with the display means. The test receiver also includes a means for displaying an action code transmitted over the power line and/or a means for ascertaining and displaying the signal of such a signal. In this manner, the user may evaluate the operation of any transmitter connected to the power line at any point along the power line.

DETAILED DESCRIPTION

Referring now to FIG. 1, there is shown a diagrammatic view of one embodiment of the power line communication system according to the present invention. In this embodiment, power line communication system 30 comprises transmission line 31 to which transmitter 32 and a plurality of receivers 33–36 are electrically connected. The electrical connection of transmitter 32 and receivers 33–36 will be described in further detail herein. In this embodiment, transmitter 32 works in conjunction with receivers 33–36 to control television 37, lamp 38, coffee maker 39 and overhead light 40 which are electrically connected to first 33, second 34, third 35 and fourth 36 receivers, respectively. In general, the configuration illustrated in FIG. 1 is representative of power line communication systems of the present invention as well as those in the prior art.

During operation of power line communication system 30, transmitter 32 transmits a data signal at a frequency much greater than the frequency of the AC transmission line 31. Specifically, transmitter 32 according to the present invention transmits data signals over transmission line 31 at a frequency of 120 kHz at times equivalent to the zero-crossing of the frequency, 60 Hz, of power line 31. However, other communication protocols that are not limited to the zero-crossing point are also within the scope of the invention. Receivers 33–36 recognize the data signal generated by transmitter 32. If the data signal is intended to operate an electronic device connected to any one of receivers 33–36, that receiver will respond. For example, the receiver may activate a relay to thereby perform an electrical function for the device connected thereto. For example, a data signal transmitted from transmitter 32 over power line 31 may include a command to instruct first receiver 33 to turn off the power to television set 37 or transmitter 32 may transmit a data signal instructing fourth receiver 36 to either dim or brighten overhead light 40. Power line communication systems such as that illustrated in FIG. 1 are advantageous as they may be installed in an existing home, hotel, business, industrial plant and the like without requiring the installation of special wiring. Further, the distance between transmitter 32 and receivers 33–36 of power line communication system 30 is not as limited as it may be for a control system wherein the transmitter emits an infrared or ultrasonic signal to receivers.

Figure 2:
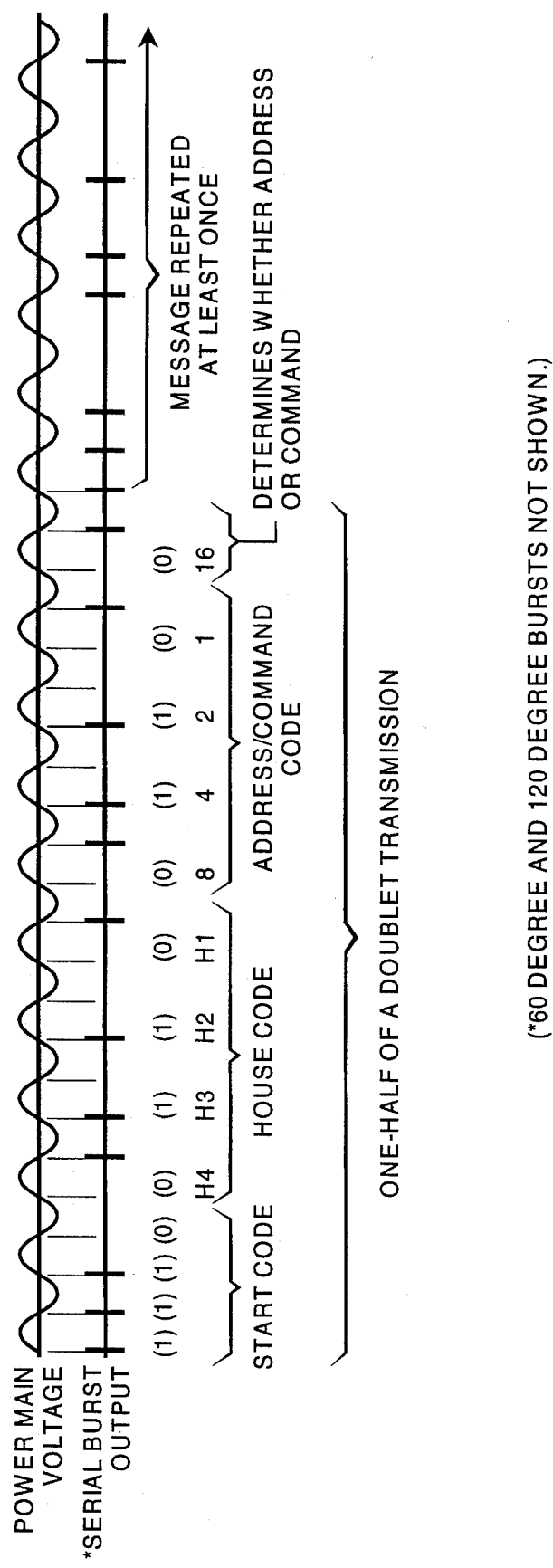
FIG. 2 shows a diagrammatic view of a data word of a communications protocol utilized for power line communication systems which constitutes prior art.

FIG. 2 shows a diagrammatic view of a data word of a communications protocol utilized for power line communication systems which constitutes prior art. In this system, disclosed collectively in U.S. Pat. Nos. 4,200,862, 4,628,440 and 4,638,299, which are incorporated herein by reference, data signals are transmitted at a frequency of 120 kHz and each data bit of the data word is transmitted at the zero-crossing of the 60 Hz frequency signal of the transmission line to which the system is connected. As shown in FIG. 2, the data word transmitted by a transmitter connected to the power line communication system comprises a start code, a house code, and a key code. The key code may correspond to either an address or a command, depending on the value of the last bit of the key code. Specifically, when the last bit of the key code is zero (0), the key code comprises an address code. When the last bit of the key code is one (1), the key code comprises a command code. To insure data integrity, each data word sent via the transmitter is repeated. In this manner, the receiver is more apt to receive a valid data signal. To further ensure data integrity, the house code and key code are sent in both true and complement form on alternate half-cycles of the transmission line frequency.

Because the house and key codes, when the key code is used as an address code wherein the last bit of the key code is zero (0), are both comprised of four data bits to designate an address, a total of 256 addresses are supported by the protocol of FIG. 2. This is limiting in installations, such as large hotels, wherein a large number of electronic devices connected to the power line system are desired to be controlled.

Figure 3:
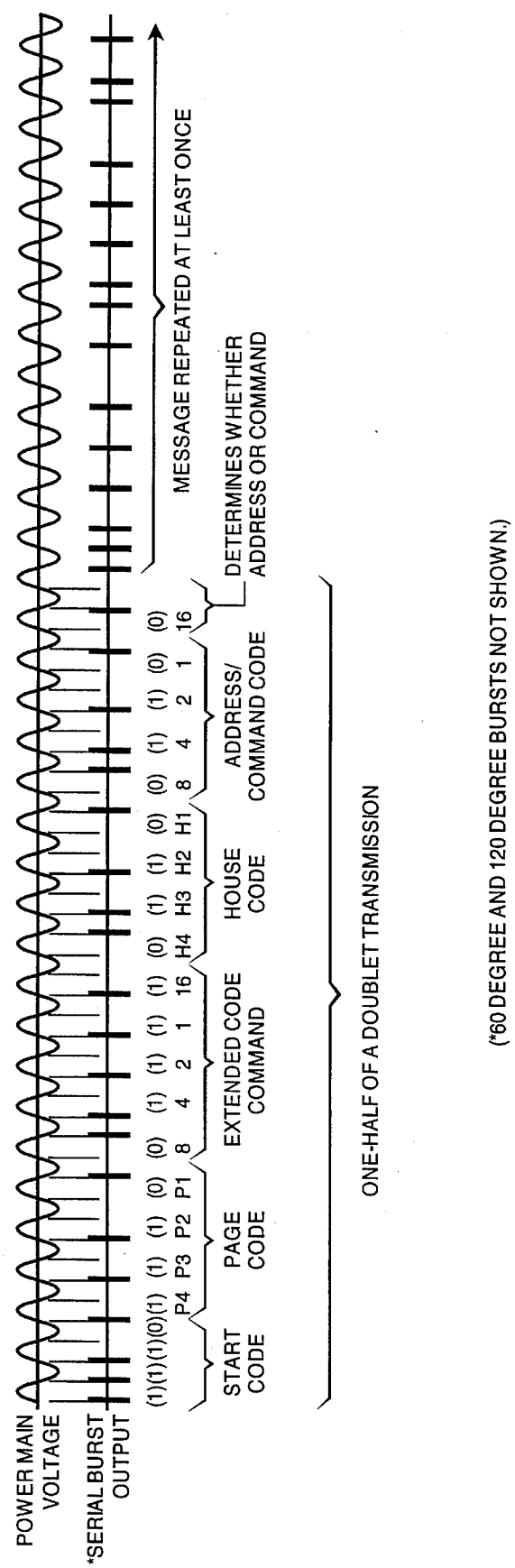
FIG. 3 shows a diagrammatic view of one embodiment of the data word of the communications protocol of the power line communication system of the present invention.

Referring to FIG. 3, there is a shown a diagrammatic view of one embodiment of the data word of the communications protocol of the power line communication system of the present invention. In this embodiment, the data word comprises a start code, a page code (first number code), an extended code, a house code (letter code) and a key (address/command) code. As in the prior art, the four bit start code is arbitrarily set and this embodiment is always set to the bit pattern 1110. The five bit extended code in this embodiment is always set to the bit pattern 01111. By utilizing the combination of the page code, house code and key code to designate an address, the protocol of the present invention is able to access a total of 4096 addressable devices connected to the system. Like the protocol disclosed in FIG. 2, the data words are repeated and the page, extended, house and key codes are transmitted in true and complement form to insure data integrity.

The format of the data word disclosed in FIG. 3 can be utilized to represent either an address command or a function command—the former being distinguished from the latter by the value of the last bit of the key code. Therefore, at a minimum, the entire data signal transmitted must comprise an address command and a function command. It has become standard in the industry, however, to successively repeat each data word. Therefore, in the preferred embodiment, the data signal of the present invention is of the form:

[address][address]. . . [function][function]

where "address" is the address data word, "function" is the command data word and ". . . " represents a pause or gap between transmissions of data words, the pause being at least three (3) power line cycles in duration. In this manner, the integrity of the data signal as has been accomplished with the prior art is maintained while providing support of at least 4096 addresses with a power line communication system utilizing such a protocol.

Also, to limit the number of data words comprising the data signal, should it be desired to instruct multiple addresses to perform the same function, the data signal may alternately be comprised of several address data word doublets ("doublet" meaning two identical data words transmitted in succession without pauses therebetween) with each doublet followed by a pause in transmission and with all address data words followed by a function data word doublet. Thus, for example, if the function desired is to be applied to two addresses, the entire data signal is of the form:

[address 1][address 1]. . . [address2][address2]. . . [function][function]

In this manner the redundancy of data word transmission is retained without requiring that a function data word doublet follow each address data word doublet.

It will be appreciated by those of skill in the art that the implementation of the extended code in the manner disclosed for the present invention is advantageous over that of the prior art. The same data integrity is maintained in the present invention while providing support for at least 4096 address codes. In the prior art, the "extended code" is used to indicate that special data words are to follow as is previously discussed herein. However, those special data are not transmitted in doublets (successively repeated), nor are there pauses between any of the special data words thereby resulting in a long string of data words which is very susceptible to intermittent noise, power interruptions or power surges.

It will be further appreciated by those of skill in the art that should transmitters of the present invention be placed, either inadvertently or purposely, on the same power transmission line as may be receivers of the prior art, namely receivers using the X-10 protocol, the prior art receivers will not respond to the commands generated by the present invention's transmitter when using the protocol according to the present invention. The data signal format of the present invention is inconsistent with that of the X-10 protocol and thereby avoids potential conflicts between two such systems connected to a single power line. However, transmitters and receivers of the present invention can be programmed to respond to signals on the system from standard X-10 protocol devices.

Specifically, as previously stated herein, the X-10 protocol provides a means for transmitting a variable number of bytes of extended commands, the first byte of which represents the remaining number of bytes in the string to follow. Each byte following the extended code command is comprised of eight (8) bits. Thus, the total number of bits following the extended code command (01111) is divisible by four (4). The number of bits following the extended code command in the present invention is not divisible by four. Rather, as illustrated by the embodiment of FIG. 3, the number of bits following the extended code command of the present invention is nine (9). In essence, these nine (9) bits, a fixed number of bits, replaces the variable number of bytes which follow the extended code command of the X-10 protocol.

Though there are no known commercially available X-10 receivers which implement the extended code command, if such X-10 extended code receivers were available, the data signal of the present invention would not be considered a valid signal by such a receiver. Because the number of bits following the extended code command of the present invention is not divisible by four (4), an X-10 extended code receiver would interpret the data signal of the present invention as noise. Thus, it will be appreciated by those of skill in the art that the number of bits following the extended code command of the present invention need not be fixed at nine (9) bits, but may be comprised of any number of bits which is indivisible by four (4). It will also be appreciated that the data protocol of the present invention is generally in accordance with the X-10 protocol as described herein except for the manner in which the extended code is implemented. The data signal is transmitted at a frequency greater than the frequency of the power line with the signals' data bits transmitted at the zero crossing of the power line signal. Further, bits comprising the data signal may be transmitted in both true and complement form to ensure data integrity. Also, the commands of the data signal may be repeated as is generally done (with the exception of the bits transmitted in association with the X-10 extended code) in the X-10 protocol.

FIG. 4 shows a table of one embodiment of the bit pattern values of codes transmitted according to the communications protocol of FIG. 3. These data codes are representative as the bit patterns may be assigned a corresponding value in other forms and still be within the contemplation of the present invention. For the sixteen (16) available bit patterns available for each of these codes, the page code (first number code), house code (letter code) and key code (special code) values are illustrated in FIG. 4. Note that in permitting the page code, the house code and the key code, when the key codes last bit is set at zero (0), to be comprised of four bits each, the power line communication system of the present invention is able to support up to 4096 addressable devices. Those devices are designated as addresses 1A1 . . . 1A16, 2A1 . . . 2A16, . . . 16A1 . . . 16A16, 1B1 . . . 1B16, . . . 1P1 . . . 1P16, . . . 16P1 . . . 16P16.

According to the table of FIG. 4, should it be desired to command devices connected to 1A1 and to 1A2 to be turned on, the following is transmitted by a transmitter using the data protocol according to the present invention:

[address1][address1]. . . [address2 ][address2 ]. . . [function ][function]

where address1 is:

| SC | 1 | EC | A | 1 |
|---|---|---|---|---|
| 1110 | 01 10 10 01 | 01 10 10 10 10 | 01 10 10 01 | 01 10 10 01 01 | and address2 is:

| SC | 1 | EC | A | 2 |
|---|---|---|---|---|
| 1110 | 01 10 10 01 | 01 10 10 10 10 | 01 10 10 01 | 01 10 10 01 01 | and function is:

| SC | 1 | EC | A | ON |
|---|---|---|---|---|
| 1110 | 01 10 10 01 | 01 10 10 10 10 | 01 10 10 01 | 01 10 10 01 10 |

If a command is sent wherein the function code corresponds to "All Units On" or "All Units Off" that command will only be applicable to those addresses starting preceding the command code in the function. For example, the function:

| SC | 1I | EC | I | All Units On |
|---|---|---|---|---|
| 1110 | 01 01 10 10 | 01 10 10 10 10 | 01 10 10 10 | 01 01 01 10 10 | will turn on all units designated as 1II, namely 1I1 . . . 1I16.

It will be appreciated by those of skill in the art that when the last bit of the key or special code is designated as one (1), the key code corresponds to a particular command to be executed by a receiver connected to the system to cause the result desired with the electric device or appliance connected to that receiver. In this embodiment, note that each of the available commands are essentially divided into two permissible bit pattern sets designated as "normal" and "shifted" in the table of FIG. 4. For example, ON is represented by the bit patterns 0010 and 1010 where 1010 is the "shifted" command code, the first bit of the pattern serving as a toggle bit between "normal" and "shifted" and the remaining three operation bits, "010", represent the ON operation. Thus, if the receiver connected to the system is capable of being set to be responsive to only one of either the "normal" or the "shifted" command code sets, then the power line communication system may be used to effectively support 8192 devices. This is a significant improvement over the support of 256 addressable devices accomplished with the prior art as discussed herein.

Figure 5:
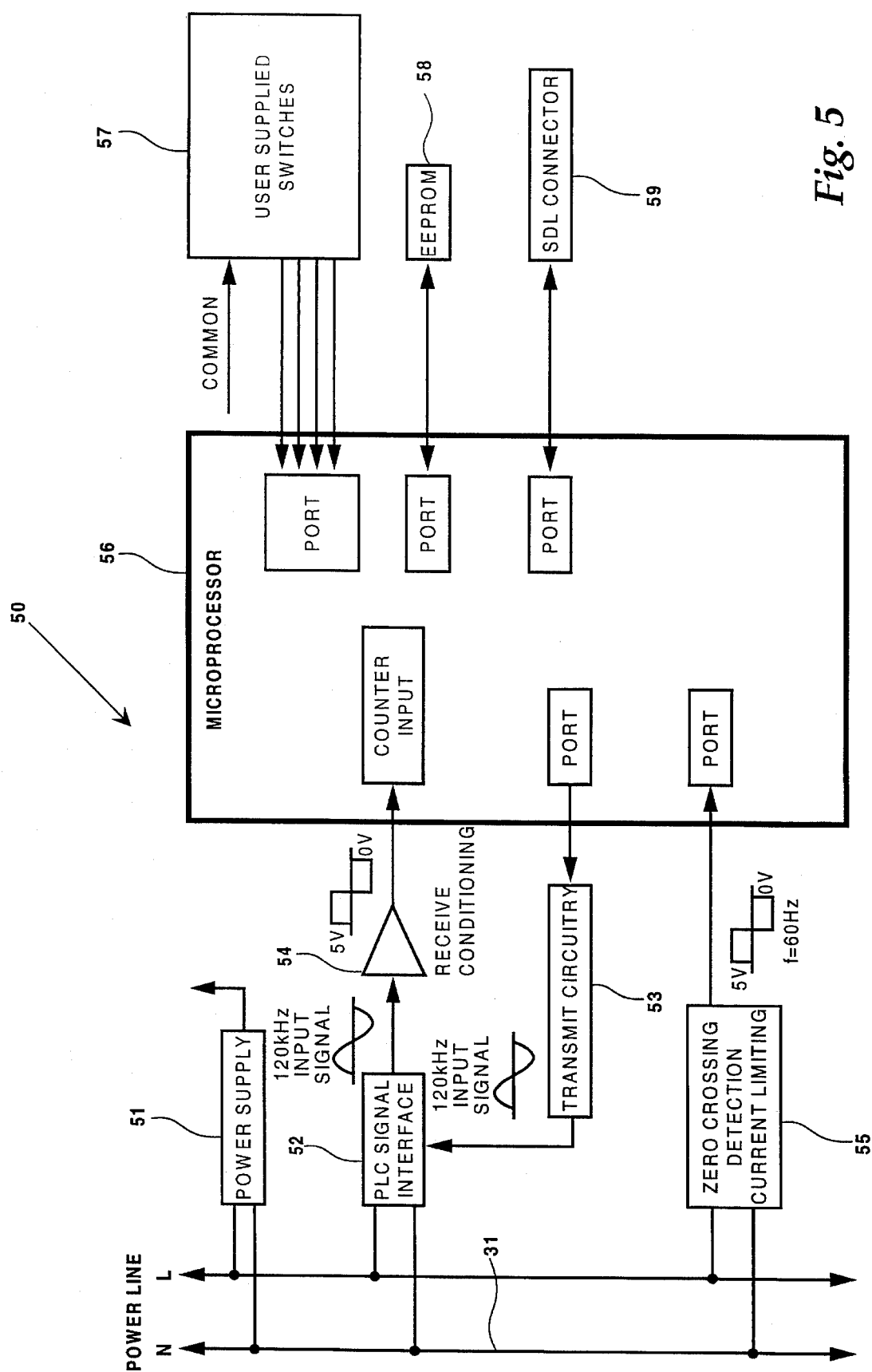
FIG. 5 shows a block diagram of one embodiment of the transmitter of the power line communication system according to the present invention.

Referring now to FIG. 5, there is shown a block diagram of one embodiment of the transmitter of the power line communication system according to the present invention. Specifically, transmitter 50 includes power supply 51 and PLC interface 52 to transmission power line 31. Transmit circuitry 53 is capable of generating and transmitting a 120 kHz signal over power line 31 via PLC interface 52. Also, a 120 kHz input signal transmitted over power line 31 is converted via receive conditioning circuitry 54 to a square wave having an amplitude of 5 volts. In one embodiment, transmitter 50 also includes zero-crossing detection current limiting circuitry 55 which determines the point at which the 60 Hz (or 50 Hz) signal of power line 31 has made a zero-crossing. Also serving as input to microprocessor 56 of transmitter 50 are user supplied switches 57 which provide a means for inputting the addressable device to be commanded by transmitter 56 as well as the command to be generated by transmitter 50. Such switch means may be, for example, a wall plate having ON/OFF switches for each receiver to be commanded by transmitter 50. For storage of critical data, which will be discussed further herein, EEPROM 58 is operatively connected to microprocessor 56. Also, serial data link (SDL) connector 59, an electrical communications port, is connected to microprocessor 56 of transmitter 50.

During operation, microprocessor 56 continuously monitors the status of user supplied switches 57. When the user selects the device to be controlled and the function to be performed with that device by actuation of user supplied switches 57, the switch input is converted by microprocessor 56 into a data signal of the form illustrated in FIG. 3. The data command signal is transmitted via transmit circuitry 53 through PLC interface 52 to power line 31. The signal includes the transmitter's stored address code. All receivers residing on power line 31 receive the data signal transmitted from transmitter 50 and those receivers having the same address as the transmitter interpret the data signal as is discussed herein.

In addition to transmitting signals in the event the user has changed the state of user supplied switches 57, transmitter 50 of the present invention also includes an automatic refresh capability. Specifically, a value defining a predetermined time interval is either hand-coded in the software running on microprocessor 56 or is set in EEPROM 58 by the manufacturer or through the programmer provided with the system as is discussed below. According to that predetermined time interval, the last signal generated by transmitter 50, whether or not the state of user supplied switches 57 has changed, is retransmitted via transmit circuitry 50. In this manner, if the transmission of the previous signal sent by transmitter 50 was in any way interfered with prior to reaching a receiver connected to the system as may be caused by excessive noise, spurious spikes or temporary power interruption in the transmission line 31, the data signal is automatically retransmitted over the power line communication system to make certain that the receiver receives such a command. In one embodiment, the retransmission occurs every thirty (30) seconds.

Transmitter 50 of the present invention may be used to transmit data signals having the data protocol described herein in association with FIG. 4. It will be appreciated by those of skill in the art, however, that transmitter 50 may also be utilized to transmit data signals having other data protocols, such as the protocol discussed with regard to FIG. 3.

The use of microprocessor 56 provides a means of generating data signals having a plurality of protocols. Provided the data signal is transmitted at a frequency compatible with that of transmit circuitry 53, microprocessor 56 provides a great deal of flexibility in the content of the data signal transmitted. Software running on microprocessor 56 may accommodate more than one such protocol and a parametric value may be stored in EEPROM 58 to indicate the desired protocol to be transmitted by transmitter 50. The parametric value stored in EEPROM 58 may be set by the manufacturer or set by a programming device as is discussed in further detail herein. In this manner, the same transmitter may be used to support a multitude of data protocols. If desired, an array of parametric values, each element of the array corresponding to a particular addressable device, may be stored in EEPROM so that transmitter 50 may be utilized to transmit data signals to receivers or addressable devices using more than one data protocol among them. The refresh capability of transmitter 50 previously discussed may be applied to protocols other than that disclosed herein, such as with the X-10 protocol, so that data signals are retransmitted to receivers using other protocols as well.

Figure 6:
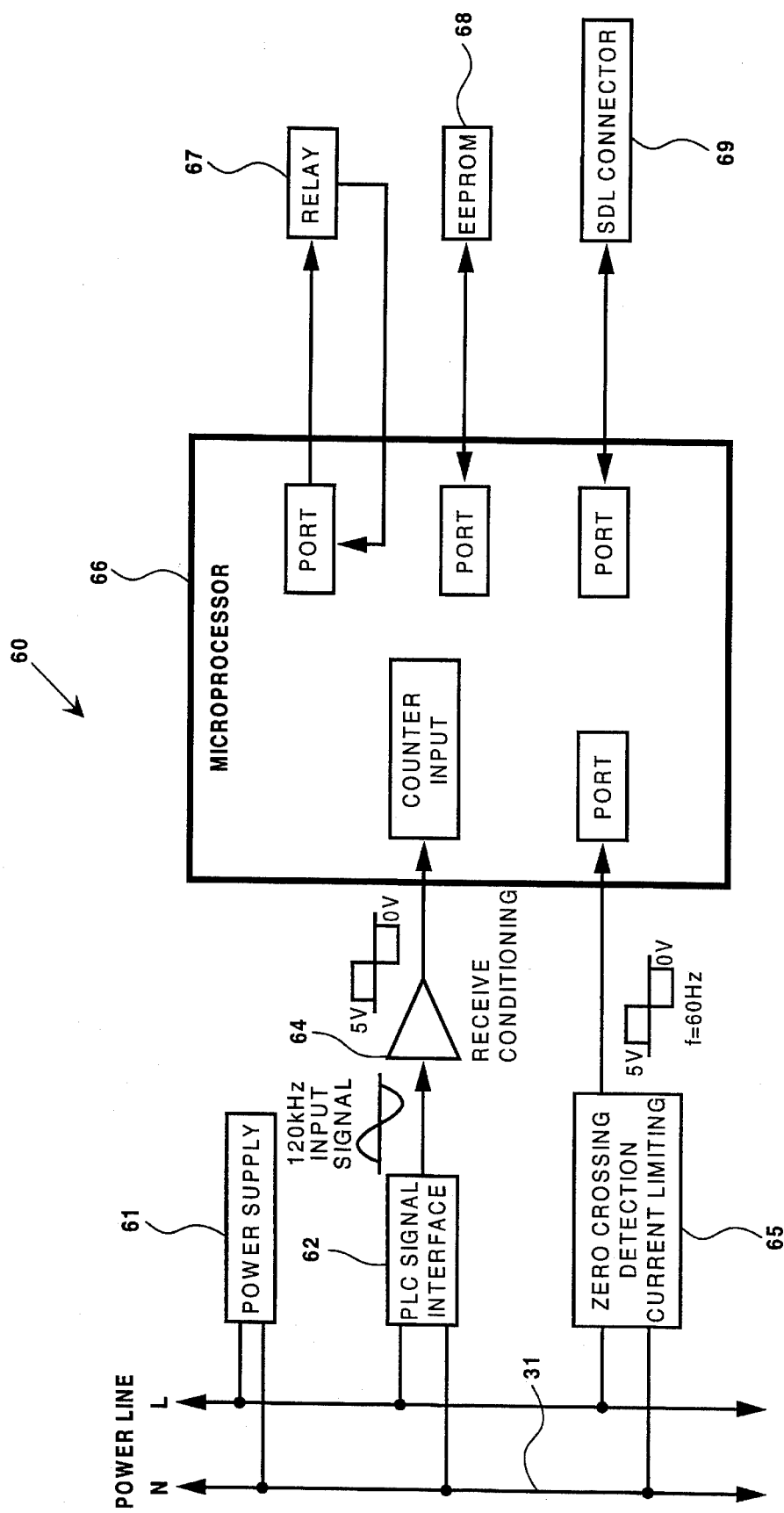
FIG. 6 shows a block diagram of one embodiment of the receiver of the power line communication system of the present invention.

FIG. 6 shows a block diagram of one embodiment of the receiver of the power line communications systems of present invention. Receiver 60 includes power supply 61 and PLC interface 62 to power line 31. The 120 kHz data signal generated by a transmitter, such as transmitter 50 of FIG. 5, connected to the system is received by receive conditioning circuitry 64 where the 120 kHz signal is converted to a square wave having an amplitude of 5 volts. As was true with the embodiment of the transmitter of the present invention as illustrated in FIG. 5, receiver 60 also includes zero-crossing detection current limiting circuitry 65 which detects the points at which the power line 31 signal makes a zero-crossing. An important component of receiver 60 is microprocessor 66 which is operatively connected to EEPROM 68 for storage of parametric data values essential to the operation of receiver 60. Also connected to microprocessor 66 is serial data link (SDL) connector 69, an electrical communications port, the function of which will be discussed in greater detail herein. In addition, microprocessor 66 of receiver 60 is operatively connected to relay 67 which is electrically connected to the electrical device or appliance which is to be controlled by receiver 60 according to the data signal received by receiver 60. Relay 67 serves as a switch means for selectively controlling the extent to which power from the power line is connected to the electrical appliance's connector, such as a power cord, and may also utilize a TRIAC for the provision of varying levels of power to the electrical appliance.

During its receiving operation, receiver 60 is electrically connected to power line 31 via PLC interface 62. Microprocessor 66 awaits the occurrence of receipt of a data signal over power line 31 through receive conditioning circuitry 64. Specifically, data signals transmitted over power line 31, such as a signal generated by transmitter 50, is received by PLC interface 62 and is converted to a square wave by receive conditioning circuitry 64 before passing into microprocessor 66. Concurrently, microprocessor 66 receives input from zero crossing detection circuitry 65 indicating the time at which a zero-crossing of the power line signal has occurred. Microprocessor 66 evaluates the received signal at each zero-crossing occurrence, looking for the receipt of the bit pattern corresponding to the start code of the data signal as previously described. When a valid start code has been detected by microprocessor 66, microprocessor 66 then collects incoming data to ascertain whether a valid data signal, according to the expected data protocol, has been received. Once a complete and correct data signal is detected, microprocessor 66 compares the value of the address code contained in the data signal to the address code of receiver 60 stored in EEPROM. If the address codes differ, microprocessor 66 causes no operation of relay 67, but if the address codes match, microprocessor 66 commands relay 67 to perform the electrical function, such as ON, OFF, DIM, or BRIGHT, to thereby cause electrical operation of the electrical appliance attached thereto accordingly.

As previously discussed, transmitter 50 of the present invention includes a "refresh" capability wherein the data signal(s) transmitted are retransmitted at a predetermined time interval to increase the likelihood that the device(s) to be commanded receive the transmitted data signal(s) in the event of the occurrence of temporary power interruption, noise, and the like. Another advantage of the present invention is the provision of means for monitoring the receipt of data signals by receiver 60. Specifically, microprocessor 66 includes a timer to permit microprocessor 66 to measure the amount of time elapsing since the receipt of the last valid data signal over power line 31. By establishing a predetermined time period in the software running on microprocessor 66 or by storing a predetermined time period in EEPROM 68, the measured elapsed time is compared to the predetermined time period. If the time measured exceeds the predetermined time period, microprocessor 66 commands relay 67 to enter its default state, such default state being stored in EEPROM 68 or set in the software running on microprocessor 66. In this manner, should PLC interface 62, receive conditioning circuitry 64 or zero-crossing detection circuitry 65 of receiver 60 fail, or should transmitter 50 fail to send signals at the prescribed time interval, or should a lengthy interruption or interference of power line 31 occur, receiver 60 via relay 67 sets the electrical appliance attached thereto in the preferred state. For example, when receiver 60 is connected to a coffee pot, it may be desired to make certain the coffee pot is is turned off in the event of such a failure.

It will be appreciated by those of skill in the art that the provision of the refresh capability of transmitter 50 and the monitoring capability of receiver 60 provide added assurance that the power line system operates in accordance with the desired or commanded manner. These capabilities also help to make certain that both minor and major problems occurring with the system or its individual components are detected and handled properly thereafter according to the desires of the consumer as well as with the consumer's safety in mind.

Figure 7:
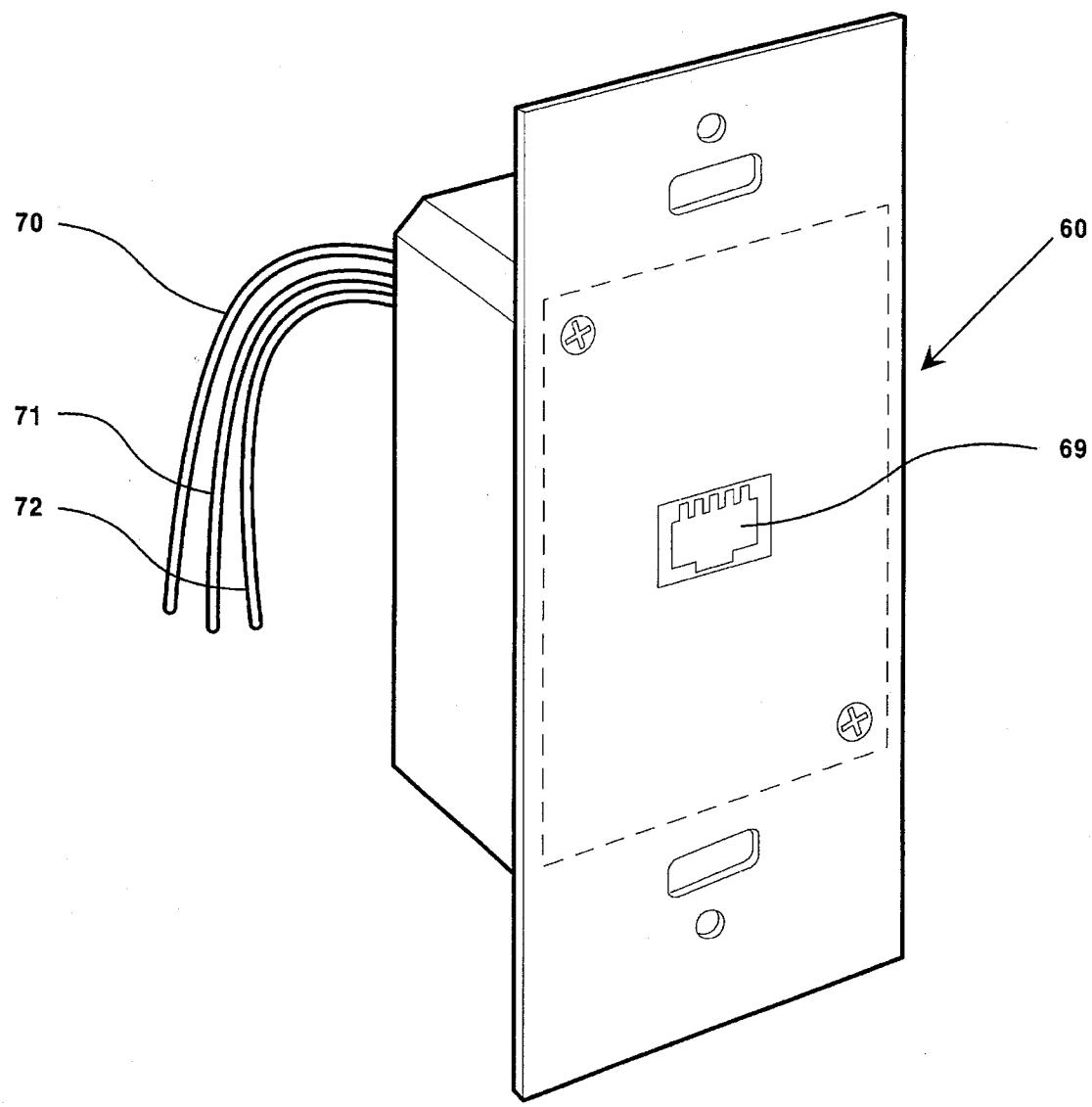
FIG. 7 shows a perspective view of the receiver of the present invention.

Referring to FIG. 7, there is shown a perspective view of the receiver of the present invention. On the face of receiver 60 is shown SDL connector 69 which, in this embodiment, is an RJ-11 receptacle. At the rear of receiver 60 are electric lines 70, 71 and 72 for electrical connection to the power line of the system as well as for connection to the electrical appliance to be controlled by receiver 60. In one embodiment of the present invention, the transmitter has a physical appearance similar to that of receiver 60 shown in FIG. 7 and the same type of SDL connector is used for both receiver 60 and the transmitter of the system.

Figure 8A:
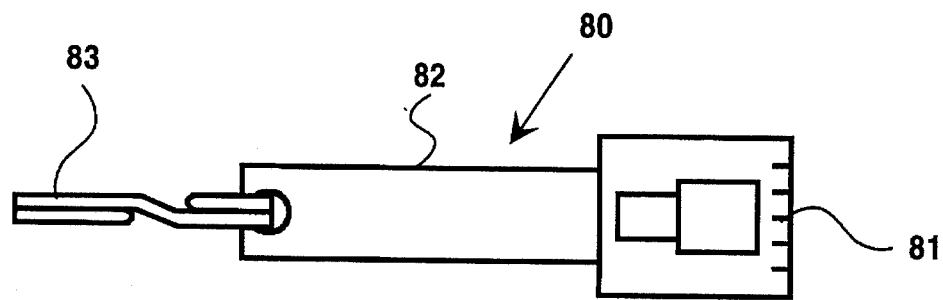
FIG. 8A shows a top view of one embodiment of the override jumper of the present invention.
Figure 8B:
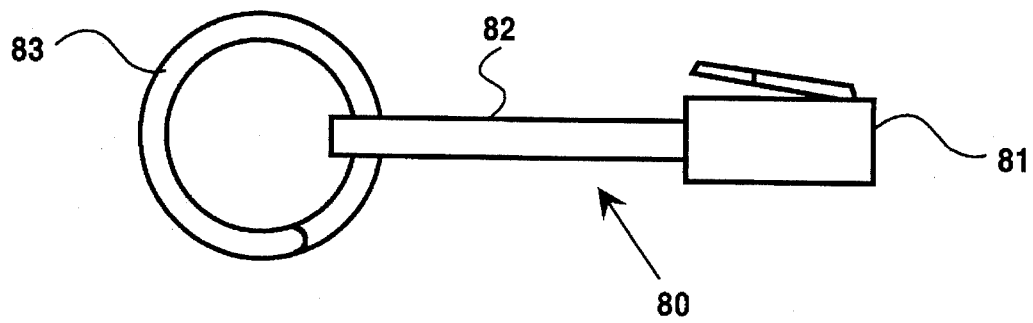
FIG. 8B shows a side view of the override jumper of the embodiment of FIG. 8A.

FIG. 8A shows a top view of one embodiment of the override jumper of the present invention. Override jumper 80 includes RJ-11 connector 81, RJ-11 wire 82 and key ring 83. The first and third conductors is of RJ-11 connector 81 are shorted together. When override jumper 80 is connected to SDL connector 69 of receiver 60, receiver 60 determines that override jumper 80 is present and toggles the state of relay 67. If, for example, relay 67 is OFF, relay 67 is turned ON when receiver 60 detects the presence of override jumper 80. Removal of override jumper 80 from SDL connector 69 does not effect the state of relay 67. Thus, override jumper 80 assists the installer in locally cycling the electrical appliance connected to receiver 60 between ON and OFF to verify that receiver 60 is properly connected to the electrical appliance and to ascertain that receiver 60 is in proper working order.

Figure 9:
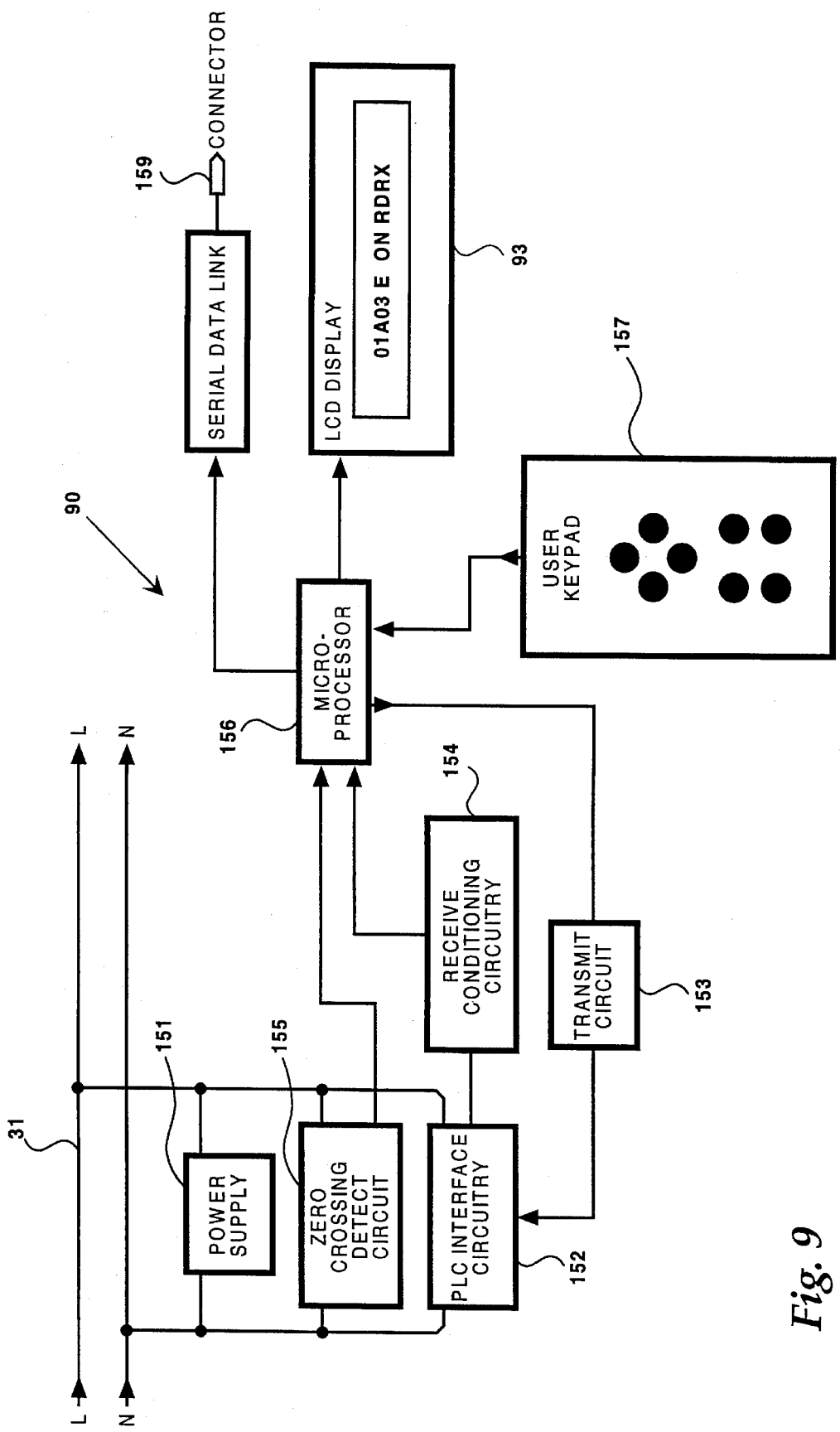
FIG. 9 shows a block diagram of one embodiment of the test transmitter/programmer of the power line communication system of the present invention.

FIG. 9 shows a block diagram of one embodiment of the test transmitter/programmer of the power line communication system of the present invention. Like transmitter 50 of the present invention (see FIG. 5), test transmitter/programmer 90 includes power supply 151 and PLC interface 152 to transmission power line 31. Transmit circuit 153 is capable of generating and transmitting a signal of 120 kHz over power line 31 via PLC interface 152. A 120 kHz input signal transmitted over power line 31 is converted via receive conditioning circuitry 154 to a square wave having an amplitude of 5 volts. Test transmitter/programmer 90 also includes zero-crossing detect circuit 155 which determines the point at which the 60 Hz (or 50 Hz) signal of power line 31 has made a zero-crossing. Serving as input to test transmitter/programmer 90 is user keypad 157, and serving as a means for displaying information available from microprocessor 156 is LCD display 93, both of which are described in further detail herein in association with FIG. 10. Microprocessor 156 is electrically connected to user keypad 157, LCD display 93, transmit circuit 153, receive conditioning circuitry 154 and zero-crossing detect circuit 155 as shown. Serial data link connector 159 is also connected to microprocessor 156 and serves as a means for connecting test transmitter/programmer 90 to a transmitter or receiver of the present invention for communication therebetween.

Figure 10:
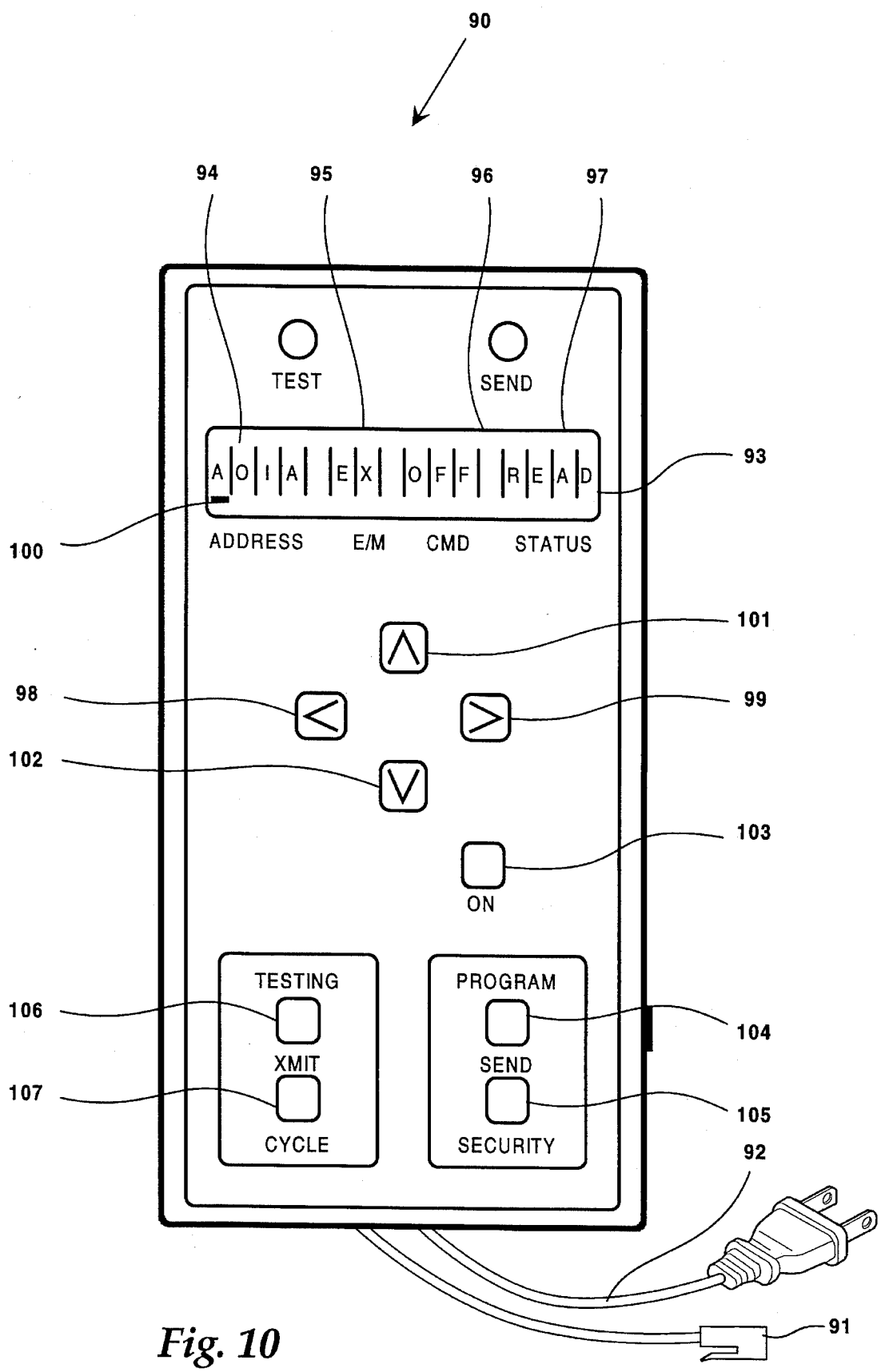
FIG. 10 shows a front view of the combination test transmitter and programmer of the power line communication system of the present invention.

Referring now to FIG. 10, there is shown a front view of the combination test transmitter and programmer of the power line communication system of the present invention. Specifically, test transmitter/programmer 90 comprises an RJ-11 connector 91 for mating connection with either of the electrical communications ports, namely SDL connector 59 of transmitter 50 (see FIG. 5) or SDL connector 69 of receiver 60 (see FIG. 6) of the present invention. Power is provided to test transmitter by plugging power cord 92 into a power supply as may be provided through an electrical outlet, or test transmitter 90 may operate from its own internal battery source (not shown). Referring first to the general features of test transmitter/programmer 90, LCD display 93 for display of information selected, transmitted or received by test transmitter/programmer 90 is divided into four sub-displays: address display 94 showing an address code, protocol display 95 showing the data protocol (Extended Mode or Normal Code), command display 96 showing the type of command and status display 97 showing the type of operation of test transmitter/programmer 90.

Several data entry keys are provided for selection purposes. Left arrow key 98 and right arrow key 99 allow the user to move cursor 100 between address display 94, protocol display 95, command display 96 and status display 97. When cursor resides at any of the sub-displays 94–97, up arrow key 101 and down arrow key 102 are used to select the desired value of that display. For example, when cursor 100 resides under the first character of address display 94 as shown in FIG. 10, depression of up arrow key 101 advances the value shown of that portion to the next value (ex: from 1 to 2) while depression of down arrow key 102 decreases the value in that position. Similarly, if cursor 100 resides in protocol display 94, depression of either up arrow key 101 or down arrow key 102 causes the value in protocol display 94 to toggle between E and N. Various other data entry means, such as a keyboard and CRT, that are well known in the art, may be implemented with test transmitter/programmer 90 and are within the scope of the present invention. The data entry keys illustrated in FIG. 10 allow the user to make the necessary selections in a very compact and aesthetically pleasing form.

Test transmitter 90 may be used to test any addressable receiver connected to a power line. Two testing functions are provided in this embodiment of transmitter/programmer 90 when used as a test transmitter, namely TEST and CYCLE, with TEST mode referring to the transmission of a single test signal and CYCLE mode referring to the provision of successive test signals. To test a receiver, power is provided to test transmitter 90 by connecting test transmitter 90 to the power line to which the receiver to be tested is connected. To transmit a test signal to a particular receiver with test transmitter 90, the user turns on test transmitter 90 by depressing ON switch 103 and then cursor 100 in address display 94. The address code of the receiver to be tested is selected by using up and down arrow keys 101 and 102. Once the address is selected, depression of Testing Xmit key 106 causes an OFF command to be transmitted over the power line to command the selected addressable device to turn off the electrical appliance attached thereto. Depression of Testing Xmit key 106 again causes transmission of an ON command to the selected addressable device. Depression of Testing Xmit key 106 is referred to as the TEST mode wherein depression should cause the appliance connected to the selected addressable device to alternately be turned on and off. By depressing Testing Cycle key 107, the CYCLE mode is invoked. In this mode, the ON and OFF commands for the selected address are sent in succession until Testing Cycle Key 107 is depressed again.

As previously discussed, for communication between receivers 60 and transmitters 50 of the present invention, both are designated with a unique address code. The address code of receiver 60 is stored in receiver EEPROM 68 and the address code of transmitter 50 is stored in transmitter EEPROM 58. Of course, the value of the device's address code stored in either receiver EEPROM 68 or transmitter EEPROM 58 may be preprogrammed by the manufacturer using an EEPROM programmer as is known in the art. In addition, test transmitter/programmer 90 may be used to program or reprogram the value of the address code stored in either receiver or transmitter EEPROM 68 or 58, respectively, when test transmitter/programmer 90 is used as a programming device as discussed below.

To program/reprogram the address code stored in receiver EEPROM 68, RJ-11 mating connector 91 of programmer 90 is connected to receiver SDL connector 69. In one embodiment, receiver 60 need not be connected to a power line, but power must be provided to programmer 90 either through connection to a power line or from an internal battery source (not shown) of programmer 90. In general, signals transmitted by programmer 90 to receiver SDL connector 69 are in turn received by receiver microprocessor 66 which is electrically connected to receiver EEPROM 69. Microprocessor 66 is capable of modifying parametric values, including the receiver's address code, which are stored in EEPROM 69. To select the address code to be programmed, the user turns on programmer 90 by depressing ON switch 103, places cursor 100 in address display 94 by using left arrow key 90 and right arrow key 99, and uses up arrow key 101 and down arrow key 102 to select the value of the address code in address display 94 to the desired address code. Then, the user depresses program send key 104 to send a signal containing the desired address through receiver SDL connector 69 to receiver microprocessor 66. Alternately, the user may be required, prior to the depression of program send key 104, to move cursor 100 to status display 97 and select the status ASET which sets programmer 90 in the proper mode for sending an address set command to the addressable device, receiver 60, attached thereto.

Upon depression of program send key 104, microprocessor 156 (see FIG. 9) of programmer 90 ascertains that program send key 104 has been depressed such that microprocessor 156 may initiate the transmission of the appropriate data signal, in this instance an ASET signal (see Table I), via SDL connector 159 of programmer 90. The data signal is received by receiver microprocessor 66 (see FIG. 6) via receiver SDL connector 69. Microprocessor 66 of receiver 60 then changes the value of the address code stored in receiver EEPROM 68 to be that of the new address code selected by the user and transmitted by programmer 90.

To program the address code stored in transmitter EEPROM 58 of transmitter 50, RJ-11 mating connector 91 is connected to transmitter SDL connector 59 and power is provided to programmer 90. As with receiver 60, transmitter 50 need not be connected to the power line. The same programming steps described above for programming the address code of receiver 60 are used to program the address code of transmitter 50.

In addition to programming/reprogramming the address code of an addressable device, programmer 90 also includes the capability to communicate with an addressable device to determine the current value of the address code saved in the device's EEPROM. To read the device's address code, RJ-11 connector 91 is connected to the SDL connector of the device. The device's microprocessor detects the present of programmer 90 and sends the address code of the device to programmer 90. Alternately, the user may set status display to ARED, and depress program send button 104, to cause programmer 90 to send an inquiry signal to the device through the device's electronic communications port (SDL connector). The address code of the device is sent to programmer 90 by the device's microprocessor in response to the request command generated and sent by programmer 90. In both instances, upon receipt of the address code by programmer 90, the address code of the device is displayed in address display 94 of programmer 90. In this mode, the microprocessor of the addressable device serves as a status transmitting means for transmitting information, namely, in this embodiment the stored address code, to the electronic communications port of the device.

In addition to setting and reading the address code for the receiver or transmitter (addressable device) connected to programmer 90, several other programming and inquiry functions may be invoked with programmer 90. The serial data link (SDL) signals transmitted by test transmitter/programmer 90 are shown in Table I and the corresponding SDL signals sent by the receiving device (namely, the receiver or transmitter to which programmer 90 is connected via mating connector 91 to the electrical communications port) are shown in Table II for one embodiment of the present invention. Ten signal types are shown in each table. Those signals are:

| Signal Type | Description |
| --- | --- |
| ARED | Address Read |
| ASET | Address Set |
| CRED | Customer Code Read |
| CSET | Customer Code Set |
| COPN | Customer Code Unlock |
| CLOK | Customer Code Lock |
| CLER | Clear Memory |
| TEST | Test Unit |
| DRED | Date Read (Date Code, Lot No., etc.) |
| DSET | Date Set |

The acronyms used in the tables are defined as follows:

| Symbol | Description |
| --- | --- |
| AEN | Address Extended Number |
| AL | Address Letter |
| AN | Address Number |
| C#B# | Customer Code Digit #, Bit # |
| CC | Customer Code Clear |
| CH | Chip Firmware Revision |
| CS | Customer Code Set |
| D5 | Disable 50 Hz |
| DA | Disable All On Function |
| DD | Disable Dim/Bright Function |
| DP | Disable Polite Function |
| DS | Disable Shifted Command Set Access |
| E5 | Enable 50 Hz Operation |
| EA | Enable All On Function |
| ED | Enable Dim/Bright Function |
| EP | Enable Polite Function |
| ES | Enable Shifted Command Set Access |
| EX | Extended Code Device |
| NL | Normal Code Device |
| RX | Receiver |
| TX | Transmitter |
| TY | Device Type |
| W | Week Date Code |
| Y | Year Date Code |

TABLE I

| | PROGRAMMING DEVICE COMMANDS | | | | | | | | | |
| --- | --- | --- | --- | --- | --- | --- | --- | --- | --- | --- |
| Bit# | ARED | ASET | CRED | CSET | COPN | CLOK | CLER | TEST | DRED | DSET |
| 0 | 0 | 0 | 0 | 0 | 0 | 0 | 0 | 0 | 0 | 0 |
| 1 | 0 | 1 | 0 | 1 | 1 | 1 | 1 | 1 | 0 | 1 |
| 2 | 1 | 1 | 0 | 0 | 0 | 0 | 1 | 0 | 1 | 1 |
| 3 | 1 | 1 | 1 | 1 | 0 | 0 | 0 | 0 | 1 | 1 |
| 4 | 0 | 0 | 0 | 0 | 1 | 1 | 0 | 0 | 1 | 1 |
| 5 | 1 | 1 | 1 | 1 | 1 | 1 | 0 | 0 | 0 | 0 |
| 6 | 1 | 1 | 0 | 0 | 0 | 0 | 1 | 1 | 1 | 1 |
| 7 | 0 | 0 | 1 | 1 | 0 | 1 | 1 | 0 | 1 | 1 |

TABLE I-continued

PROGRAMMING DEVICE COMMANDS

| Bit# | ARED | ASET | CRED | CSET | COPN | CLOK | CLER | TEST | DRED | DSET |
|---|---|---|---|---|---|---|---|---|---|---|
| 8 | 0 | AEN3 | 0 | C3B3 | C3B3 | 0 | 0 | AEN3 | 0 | Y3 |
| 9 | 0 | AEN2 | 0 | C3B2 | C3B2 | 0 | 0 | AEN2 | 0 | Y2 |
| 10 | 0 | AEN1 | 0 | C3B1 | C3B1 | 0 | 0 | AEN1 | 0 | Y1 |
| 11 | 0 | AEN0 | 0 | C3B0 | C3B0 | 0 | 0 | AEN0 | 0 | Y0 |
| 12 | 0 | AL3 | 0 | C2B3 | C2B3 | 0 | 0 | AL3 | 0 | W7 |
| 13 | 0 | AL2 | 0 | C2B2 | C2B2 | 0 | 0 | AL2 | 0 | W6 |
| 14 | 0 | AL1 | 0 | C2B1 | C2B1 | 0 | 0 | AL1 | 0 | W5 |
| 15 | 0 | AL0 | 0 | C2B0 | C2B0 | 0 | 0 | AL0 | 0 | W4 |
| 16 | 0 | AN3 | 0 | C1B3 | C1B3 | 0 | 0 | AN3 | 0 | W3 |
| 17 | 0 | AN2 | 0 | C1B2 | C1B2 | 0 | 0 | AN2 | 0 | W2 |
| 18 | 0 | AN1 | 0 | C1B1 | C1B1 | 0 | 0 | AN1 | 0 | W1 |
| 19 | 0 | AN0 | 0 | C1B0 | C1B0 | 0 | 0 | AN0 | 0 | W0 |
| 20 | 0 | 0 = DS<br>1 = ES | 0 | C0B3 | C0B3 | 0 | 0 | 0 = OFF<br>1 = ON | 0 | CH3 |
| 21 | 0 | 0 = DD<br>1 = ED | 0 | C0B2 | C0B2 | 0 | 0 | 0 | 0 | CH2 |
| 22 | 0 | 0 = DA<br>1 = EA | 0 | C0B1 | C0B1 | 0 | 0 | 0 | 0 | CH1 |
| 23 | 0 | 0 = D5<br>1 = E5 | 0 | C0B0 | C0B0 | 0 | 0 | 0 | 0 | CH0 |
| 24 | 0 | 0 = DP<br>1 = EP | 0 | 0 | 0 | 0 | 0 | 0 | 0 | 0 |
| 25 | 0 | 0 = NL<br>1 = EX | 0 | 0 | 0 | 0 | 0 | 0 | 0 | 0 |
| 26 | 0 | 0 | 0 | 0 | 0 | 0 | 0 | 0 | 0 | 0 |
| 27 | 0 | 0 | 0 | 0 | 0 | 0 | 0 | 0 | 0 | 0 |

TABLE II

RECEIVING DEVICE COMMANDS

| Bit# | ARED | ASET | CRED | CSET | COPN | CLOK | CLER | TEST | DRED | DSET |
|---|---|---|---|---|---|---|---|---|---|---|
| 0 | 0 | 0 | 0 | 0 | 0 | 0 | 0 | 0 | 0 | " |
| 1 | 0 = CC<br>1 = CS | " | 0 | 0 | 0 | 0 | 0 | 0 = CC<br>1 = TX | 0 = CC<br>1 = TX | " |
| 2 | 0 = RX<br>1 = TX | " | 0 | 0 | 0 | 0 | 0 | 0 = RX<br>1 = TX | 0 = RX<br>1 = TX | " |
| 3 | 0 | 1 | 0 | 1 | 0 | 0 | 1 | 0 | 0 | 1 |
| 4 | TY2 | 0 | 0 | 0 | 0 | 0 | 0 | TY2 | TY2 | 0 |
| 5 | TY1 | 0 | 0 | 0 | 0 | 0 | 0 | TY1 | TY1 | 0 |
| 6 | TY0 | 0 | 0 | 0 | 0 | 0 | 0 | TY0 | TY0 | 0 |
| 7 | 0 | 0 | 0 | 0 | 0 | 0 | 0 | 0 | 0 | 0 |
| 8 | AEN3 | " | C3B3 | " | C3B3 | 0 | 0 | AEN3 | Y3 | " |
| 9 | AEN2 | " | C3B2 | " | C3B2 | 0 | 0 | AEN2 | Y2 | " |
| 10 | AEN1 | " | C3B1 | " | C3B1 | 0 | 0 | AEN1 | Y1 | " |
| 11 | AEN0 | " | C3B0 | " | C3B0 | 0 | 0 | AEN0 | Y0 | " |
| 12 | AL3 | " | C2B3 | " | C2B3 | 0 | 0 | AL3 | W7 | " |
| 13 | AL2 | " | C2B2 | " | C2B2 | 0 | 0 | AL2 | W6 | " |
| 14 | AL1 | " | C2B1 | " | C2B1 | 0 | 0 | AL1 | W5 | " |
| 15 | AL0 | " | C2B0 | " | C2B0 | 0 | 0 | AL0 | W4 | " |
| 16 | AN3 | " | C1B3 | " | C1B3 | 0 | 0 | AN3 | W3 | " |
| 17 | AN2 | " | C1B2 | " | C1B2 | 0 | 0 | AN2 | W2 | " |
| 18 | AN1 | " | C1B1 | " | C1B1 | 0 | 0 | AN1 | W1 | " |
| 19 | AN0 | " | C1B0 | " | C1B0 | 0 | 0 | AN0 | W0 | " |
| 20 | 0 = DS<br>1 = ES | " | C0B3 | " | C0B3 | 0 | 0 | 0 = OFF<br>1 = ON | CH3 | " |
| 21 | 0 = DD<br>1 = ED | " | C0B2 | " | C0B2 | 0 | 0 | 0 | CH2 | " |
| 22 | 0 = DA<br>1 = EA | " | C0B1 | " | C0B1 | 0 | 0 | 0 | CH1 | " |
| 23 | 0 = D5<br>1 = E5 | " | C0B0 | " | C0B0 | 0 | 0 | 0 | CH0 | " |
| 24 | 0 = DP<br>1 = EP | " | 0 | " | 0 | 0 | 0 | 0 | 0 | " |
| 25 | 0 = NL<br>1 = EX | " | 0 | 0 | 0 | 0 | 0 | 0 | 0 | " |
| 26 | 0 | 0 | 0 | 0 | 0 | 0 | 0 | 0 | 0 | " |
| 27 | 0 | 0 | 0 | 0 | 0 | 0 | 0 | 0 | 0 | 0 |

In one embodiment, once a test transmitter/programmer is connected to the communications port of a transmitter or receiver and the Program Send key is depressed, the same 27 bit inquiry command is sent to the transmitter or receiver. The transmitter or receiver acts according to the command, and returns an identically formatted 27 bit status response. Therefore, the same transmitter/programmer can be used to interrogate and to program either a receiver or a transmitter.

The above acronyms also represent values that are or may be stored in the addressable device's EEPROM. Thus, when programmer 90 sends an ARED command to an addressable device, the values AEN, AL and AN are returned from the receiving device to programmer 90. Similarly, AEN, AL and AN are modified when an ASET signal containing these parameters is sent from programmer 90 to a receiving device.

Four of the signals listed above, CRED, CSET, COPN and CLOK, relate to a customer code, C#B#, for the receiving device. The customer code refers to a unique code which may be set by the customer to serve as a password for the customer's system. Such a code may be added to the data communications protocol to therefore serve as a password prohibiting the communication between systems or devices having different customer codes. A customer code may be useful when more than one system is installed to a main power trunk as may be found in a building wherein several small offices are leased by various distinct entities.

The customer code may also be used to prohibit unauthorized users having a programmer according to the present invention from programming the addressable devices of the system. This may be accomplished in several ways. For example, by storing the customer code in transmitter EEPROM 58 and receiver EEPROM 68, transmission of a signal from programmer 90 instructing an address change must include the customer code. Microprocessor 56 or 66, respectively, serves as a means for preventing a change of the address code stored in EEPROM 58 or 68, respectively, if the customer code transmitted does not match the customer code stored in EEPROM 56 or 58. The transmitted customer code from programmer 90 may be required to be entered by the user on programmer 90 each time programmer 90 is used to change an address code, or, more practically, the customer code may be stored in the EEPROM of programmer 90.

With regard to the other SDL signal types listed above, CLER, or the clear memory function, allows the user to reset the values stored in the EEPROM of the addressable device to default values. For example, the default value for the address code may be 1A1. CRED and CSET allow the user to read and to set the customer code, C#B#, stored in the device's EEPROM. The COPN and CLOK functions allow the customer code to be locked and unlocked to permit or prohibit, respectively, modification of the customer code stored in the device's EEPROM. Also, the DRED and DSET functions allow the user to read or to set the date code.

In this embodiment, information regarding the type of device (RX or TX), the type of protocol (extended mode EX or normal mode NL) for the device, the firmware version of the device's microprocessor (CH), and date codes (W and Y) are also stored in EEPROM. It will be appreciated by those of skill in the art that additional variables maybe stored in the receiving device's EEPROM and additional commands for setting and reading those variables may be provided. For example, the predetermined time interval for automatically retransmitting signals may be stored in EEPROM 58 of transmitter 50 and the predetermined time period for monitoring signals received by receiver 60 may be stored in receiver EEPROM 58, and SDL signals established to set and read these time periods may be handled by programmer 90 and the respective receiving device.

It will be further appreciated that additional signals may be exchanged between programmer 90 and receiver 60 or transmitter 50. For example, perhaps the software residing on receiver microprocessor 66 or transmitter microprocessor 56 provides a variety of optimal software features that may or may not be desirable for a particular application. If "enable codes" for enabling/disabling those software options are stored in EEPROM, an enable and disable signal may be sent from programmer 90 to the correct microprocessor. Similarly, the value of the enable codes stored in memory may be read by programmer 90.

It will also be appreciated by those of skill in the art that two versions of programmer 90 may be manufactured—one for the consumer and one for the manufacturer—which differ from each other by the software executing on each. The manufacturer's version may contain functions not made available in the consumer version. For example, it may be desirable to prohibit the consumer from modifying the firmware version number, the date code, or to enable functions considered by the manufacturer as optional for which the consumer has opted not to purchase.

It will be further appreciated that the serial data link communications signals exchanged between programmer 90 and either receiver 60 or transmitter 50 are identical. Thus, essentially the same software codes and communications protocol may be used for receiver microprocessor 66 as is used for transmitter microprocessor 56 in handling the device's two-way communication with programmer 90.

Figure 11:
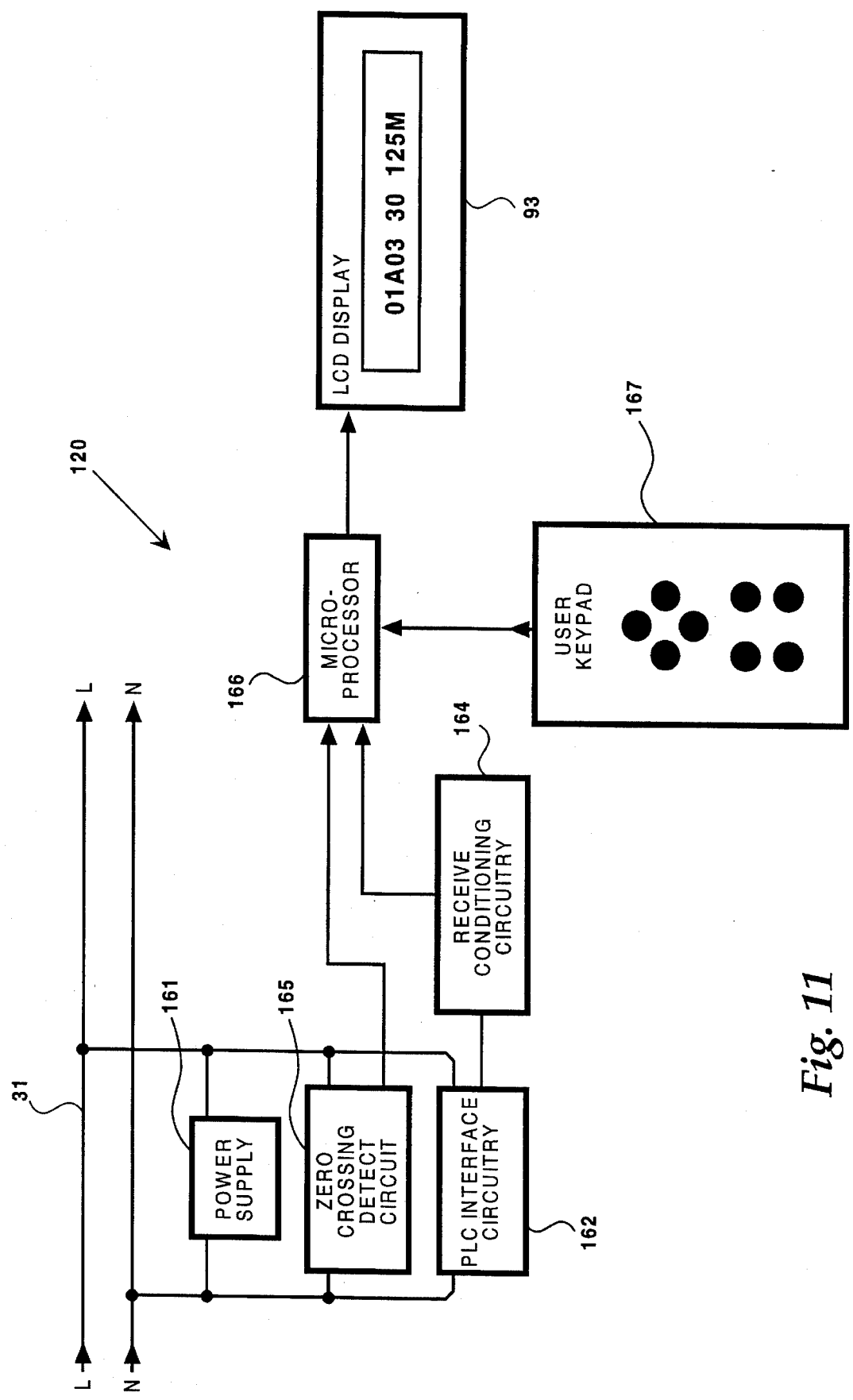
FIG. 11 shows a block diagram of one embodiment of the test receiver of the power line communication system of the present invention.

FIG. 11 shows a block diagram of one embodiment of the test receiver of the power line communication system of the present invention. Test receiver 120 comprises many of the same types of elements comprising receiver 60 of the present invention as illustrated in FIG. 6. Specifically, test receiver 120 includes power supply 161 and PLC interface 162 to power line 31. A signal of 120 kHz generated by a transmitter, such as transmitter 50 of FIG. 5 or test transmitter/programmer 90 of FIGS. 9–10, connected to the system of the present invention is received by receive conditioning circuitry 164 which converts the 120 kHz signal to a square wave. Test receiver 120 includes zero-crossing detect circuit 165 for detecting the points at which the signal of power line 31 makes a zero-crossing. For the selection of input data and the display of information, test receiver 120 also includes user keypad 167 and LCD display 93, respectively, the operation of which is described in further detail herein. Connected to user keypad 167, LCD display 93, receive conditioning circuit 164 and zero-crossing detect circuit 165 is microprocessor 166.

Figure 12:
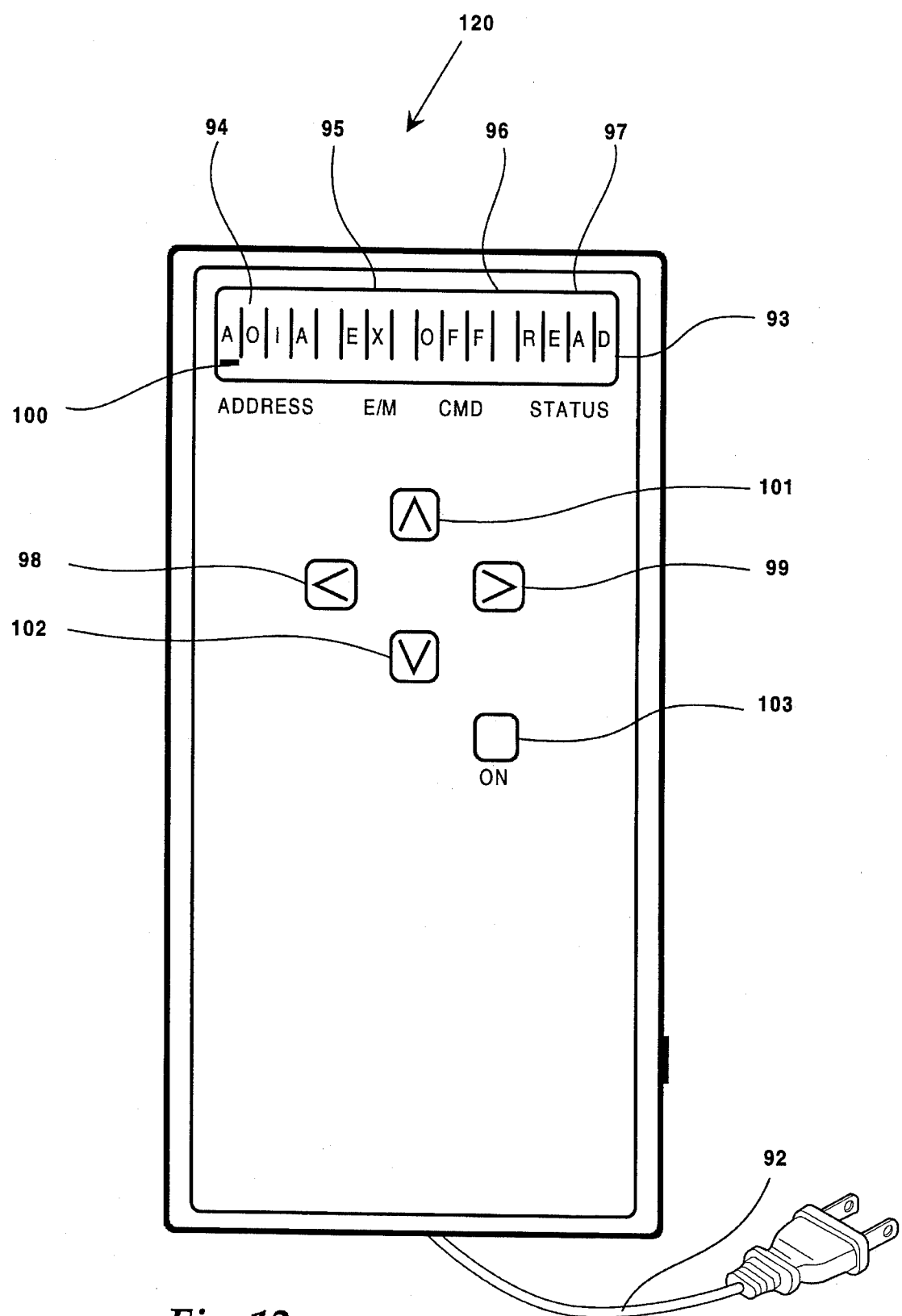
FIG. 12 shows a front view of one embodiment of the test receiver of the power line communication system of the present invention.

Referring now to FIG. 12, there is shown a front view of one embodiment of the test receiver of the power line communication system of the present invention. Test receiver 120 includes LCD display 93 for displaying a received signal and includes four sub-displays: address display 94, protocol display 95, command display 96 and status display 97, all similar to that of test transmitter/programmer 90. By connecting test receiver 120 to a power line via power cord 92, test receiver 120 monitors all recognizable signals transmitted over that power line, displays the signal on LCD display 93 and indicates the strength of the signal by displaying the signal strength on LCD display 93. Specifically, a message such as "PEAK ##MV", where ## is the value of the signal strength, is displayed beginning in address display 94 of LCD display 93. In this manner, a signal generated by transmitter 50 or test transmitter 90 of the present invention may be evaluated with regard to the accuracy of the content of the intended signal as well as the sufficiency of the strength of the signal. With regard to the content of the signal, the address code, protocol type, command, and states are all displayed on LCD display 93 of test receiver 120.

During operation of test receiver 120, power is provided to test receiver 120 via connection of power cord 92 to the power line. To activate test receiver 120, the user depresses ON button 103. At this point, the user may observe on LCD display 93 the address, protocol mode, command and status of all data signals detected by test receiver 120. If the user desires only to view commands sent to a particular addressable device on the power system, the user uses left, right, up and down arrow keys 98, 99, 101 and 102, respectively, in the manner previously described to set address display 94 to the desired address to be monitored.

Referring to the block diagram of test receiver 120 illustrated in FIG. 11, upon selection of the address or addresses to be monitored by test receiver 120, microprocessor 166 of test receiver 120 monitors data signals transmitted over power line 31. Such data signals are received by PCT interface circuitry 162 and converted to a square wave by receive conditioning circuitry 164 before passing into microprocessor 166. Concurrently, microprocessor 166 receives input from zero-crossing detect circuit 165 indicating the time at which a zero-crossing of the power line signal has occurred. Like receiver 60 of the present invention, microprocessor 166 evaluates the signal received at each zero-crossing occurrence and looks for the receipt of a valid data signal according the the prescribed data protocol. After collecting incoming data of a valid data signal, microprocessor 166 compares the address of such a signal to the selected address(es) to be monitored. When the data signal's address code matches that (those) of the selected address(es), microprocessor 166 causes a message to be displayed on LCD display 93. Simultaneous with the collection of a valid data signal, microprocessor 166 notes the strength of the data signal, such strength being measured in terms of voltage as the signal is converted to a square wave by receive conditioning circuitry 164. In this manner, the peak voltage is presented by microprocessor 166 on LCD display 93 for the address(es) selected.

Software code for transmitter 50 and receiver 60, and flowcharts for the software code for test transmitter 90 and test receiver 120 according to one embodiment of the present invention are shown in the Appendix. The software for the transmitter and receiver encompasses the handling of the transmission and receipt, respectively, of the data communications protocol according to the present invention, as well as the interface of these devices to test programmer 90—the serial data link communications code. The software code for the test transmitter/programmer also includes the SDL communications software for the device's interface to the transmitter and receivers of the present invention.

10600002.ASM

```
        SUBTITL "Extended Code PCC Transmitter"
        LIST    P=16C54,N=40,C=132,R=DEC ;==========Program Description====================
;
; PCC Extended Code Transmitter for PIC16C54
; Written by: Matt Sargeant 08-28-92 Modified M.Neal 092192
; For: Advanced Control Technologies, Inc.
; Engineering Part Number: 160-0106-000-000
; PIC ID 1057
; for use in TRX board, lockout 1A1-1P16, default 2A1  01-21-93
;=================================================

;==========Register Assignments

INDEX   EQU     00h             ;indirect index register
RTCC    EQU     01h             ;timer port
PC      EQU     02h             ;program counter
STATUS  EQU     03h             ;status register
FSR     EQU     04h             ;file select register PORTA   EQU     05h             ;port a
                                ;  3: SDL clock line
                                ;  2: SDL data  line
                                ;  1: Zero crossing input
                                ;  0: PCC Tx output
PORTB   EQU     06h             ;port b
                                ;  7: clk on 93C46.
                                ;  6: di  on 93C46.
                                ;  5: do  on 93C46.
                                ;  4: cs  on 93C46.
                                ;  3: wire 4
                                ;  2: wire 3
                                ;  1: wire 2
                                ;  0: wire 1
PORTC   EQU     07h             ;port c used as file register
                                ;  0:xmission error flag
                                ;  1:
                                ;  2:
                                ;  3:ee_io loop control flag
                                ;  4:sdl data mask enable flag
                                ;  5:
                                ;  6:
                                ;  7:
DCNT1   EQU     08h             ;30 sec delay
DCNT2   EQU     09h             ;30 sec delay
I_MASK  EQU     0Ah             ;
XNIB    EQU     0Bh             ;
INLAST  EQU     0Ch             ;
BITCNT  EQU     0Dh             ;
EEADR   EQU     0Eh             ;
EEGET   EQU     0Fh             ;
EEPUT   EQU     10h             ;
BUFFN   EQU     11h             ;
BUFFL   EQU     12h             ;
ENABLE  EQU     13h             ;7 1=enable shifted command set
                                ;6 1=enable brt/dim response
                                ;5 1=enable all on   response
                                ;4 1=enable 50hz timing
                                ;3 1=enable polite transmit
                                ;2 1=extended code device
                                ;1 not used
```

10600002.ASM

```
                                        ;0 not used
TEMP1    EQU     14h                    ;
TEMP2    EQU     15h                    ;
TEMP3    EQU     16h                    ;
XTRAB    EQU     17h                    ;
BUFF1    EQU     18h                    ;sdl communication buffer
BUFF2    EQU     19h                    ;         "
BUFF3    EQU     1Ah                    ;         "
BUFF4    EQU     1Bh                    ;         "
COUNT1   EQU     1Ch                    ;points to control input
COUNTA   EQU     1Dh                    ;
COUNTB   EQU     1Eh                    ;
COUNTE   EQU     1Fh                    ;

;==========Port B Pin Assignments

SK       EQU     7                      ;clk on 93C46
DI       EQU     6                      ;di  on 93C46
DO       EQU     5                      ;do  on 93C46
CS       EQU     4                      ;cs  on 93C46
SDLCLK   EQU     3                      ;sdl clock line
SDLDAT   EQU     2                      ;sdl data line
ZC       EQU     1                      ;zero crossing input
PLCXMT   EQU     0                      ;plc output ;==========General Assignments CARRY    EQU     0                      ;carry flag of status register.
ZFLAG    EQU     2                      ;zero flag of status register.
F        EQU     1                      ;file ;==========Power-On/Reset Entry Point ORG     1FFh                   ;set reset address
         GOTO    INIT ;==========Routines ORG     000h                   ;get starting address for routines.

;==========Millisecond Delay
MILSEC   MOVLW   0C7h                   ;load w with delay value
MS_LP1   MOVWF   COUNTB                 ;load count down variable
         NOP
         DECFSZ  COUNTB,W
         GOTO    MS_LP1
         CLRWDT
         RETLW   0

;==========PLC Routines

;==========Transmit a One via PLC
X1       CALL    ZCROSS
         CLRF    COUNTA
X1_1     COMF    PORTA
         DECFSZ  COUNTA,F
         GOTO    X1_1
;        MOVLW   85                     ;*these lines used for 0&30 deg Tx
;        MOVWF   COUNTA                 ;*
;X1_2    COMF    PORTA                  ;*
;        DECFSZ  COUNTA,F               ;*
;        GOTO    X1_2                   ;*
```

10600002.ASM

```
;X1_3      COMF    PORTA              ;*
;          DECFSZ  COUNTA,F           ;*
;          GOTO    X1_3               ;*
           CLRF    PORTA
           RETLW   01h
           GOTO    P_READ

;==========Transmit a Zero via PLC
X0         CALL    ZCROSS
           CALL    MILSEC
           RETLW   00h ;==========Reads the RTCC PLC input and sets error flag
P_READ
           MOVWF   TEMP2
           MOVLW   0D1H
           ADDWF   RTCC,W
           BTFSS   STATUS,CARRY
           GOTO    LOW_IN
HI_IN      MOVLW   01h
           GOTO    IN_TST
LOW_IN     MOVLW   00h
IN_TST     XORWF   TEMP2,W
           IORWF   PORTC,F
           RETLW   00h ;==========Zero Crossing Detection
ZCROSS     CLRWDT
           BTFSS   PORTA,ZC           ;check current ac level, goto correct wait
           GOTO    ZEROH              ;
ZEROL      BTFSC   PORTA,ZC           ;test zero crossing input, done if low
           GOTO    ZEROL              ;not low yet
           GOTO    ZOUT               ;
ZEROH      BTFSS   PORTA,ZC           ;test zero crossing input,done if high
           GOTO    ZEROH              ;not high yet
ZOUT       CLRF    RTCC               ;clear rtcc for pcc receive count
           RETLW   0                  ;

;========PCC Look-up Table
TABLE      ADDWF   PC,F               ;
           RETLW   00001000b          ;
           RETLW   00001001b          ;
           RETLW   00001010b          ;
           RETLW   00001011b          ;
           RETLW   00001100b          ;
           RETLW   00001101b          ;
           RETLW   00001110b          ;
           RETLW   00001111b          ;
           RETLW   00000100b          ;
           RETLW   00000101b          ;
           RETLW   00000001b          ;
           RETLW   00000000b          ;
           RETLW   00000110b          ;
           RETLW   00000111b          ;
           RETLW   00000010b          ;
           RETLW   00000011b          ;

;==========SDL Routines

;==========SDLSFT
SDLSFT     BTFSS   PORTA,SDLCLK       ;wait for rising edge of sync
           GOTO    SDLSFT             ;
```

10600002.ASM

```
            BCF     PORTA,SDLDAT      ;preset data out 0
            BTFSC   BUFF4,7           ;check data out level
            BSF     PORTA,SDLDAT      ;set data out if 1
WAITRX      CLRWDT                    ;
            BTFSC   PORTA,SDLCLK      ;wait for falling edge of sync
            GOTO    WAITRX            ;
            CALL    SFTBUF            ;
            BCF     BUFF1,0           ;
            BTFSC   PORTA,SDLDAT      ;
            BSF     BUFF1,0           ;
            RETLW   0                 ;

;===========Buffer Shift
SFTBUF      RLF     BUFF1,F           ;rotate carry into first buffer
            RLF     BUFF2,F           ;rotate buff1 carry into buff2
            RLF     BUFF3,F           ;rotate buff2 carry into buff3
            RLF     BUFF4,F           ;rotate buff3 carry into buff4
            RETLW   0                 ;end of sftbuf ;===========EEPROM Memory Map
;           00h     ####XXXX -- number code a; extended code command
;           01h     LLLL#B_1 -- letter code; number code b, first input
;           02h     ENABLE BYTE
;           7Fh     00001111 -- key byte EECLK       BSF     PORTB,SK          ;clock out bit
            BCF     PORTB,SK          ;
            RETLW   0                 ;end of eeclk EERITE      MOVWF   EEPUT             ;store data
            BSF     EEADR,7           ;set D7 for write
            GOTO    EECM2             ;send command to ee without EEADR store
EEWEN       MOVLW   01100000B         ;load ewen
            GOTO    EECMD             ;send command to ee
EEWDS       MOVLW   00000000B         ;load ewds
            GOTO    EECMD             ;send command to ee
EECLR       MOVLW   01000000B         ;load eral
EECMD       MOVWF   EEADR             ;store command
EECM2       BCF     PORTB,SK          ;clear sk
            BCF     PORTB,DI          ;clear di
            BSF     PORTB,CS          ;enable ee
            CALL    EECLK             ;
            BSF     PORTB,DI          ;data 1
            CALL    EECLK             ;
            BCF     PORTB,DI          ;data 0
            CALL    EECLK             ;
            GOTO    RITE16            ;write EEADR, eeput get eeget EEREAD      BCF     PORTB,SK          ;clear sk
            BCF     PORTB,DI          ;clear di
            BSF     PORTB,CS          ;enable ee
            CALL    EECLK             ;
            BSF     PORTB,DI          ;data 1
            CALL    EECLK             ;
            BSF     PORTB,DI          ;data 1
            CALL    EECLK             ;

RITE16      MOVLW   8                 ;load counter value
            MOVWF   COUNTB            ;store count value
            MOVF    EEADR,W           ;get copy of EEADR
            MOVWF   TEMP1             ;store backup copy
LOOPA       RLF     TEMP1,F           ;shift bit into carry
```

10600002.ASM

```
            BCF     PORTB,DI        ;default clear di
            BTFSC   STATUS,0        ;test if 1 needs sent
            BSF     PORTB,DI        ;set output to 1
            CALL    EECLK           ;
            DECFSZ  COUNTB,F        ;dec bit counter
            GOTO    LOOPA           ;next bit
            MOVLW   8               ;load counter value
            MOVWF   COUNTB          ;store count value
   LOOPB    RLF     EEPUT,F         ;shift bit into carry
            BCF     EEPUT,0         ;clear junk bit
            BCF     PORTB,DI        ;default clear di
            BTFSC   STATUS,0        ;test if 1 needs sent
            BSF     PORTB,DI        ;set output to 1
            CALL    EECLK           ;
   REDBIT   RLF     EEGET,F         ;shift read data
            BCF     EEGET,0         ;preclear shift in bit
            BTFSC   PORTB,DO        ;check for 1 bit
            BSF     EEGET,0         ;set bit to 1
            DECFSZ  COUNTB,F        ;dec bit counter
            GOTO    LOOPB           ;next bit
            BCF     PORTB,DI        ;clear di
            BCF     PORTB,CS        ;disable rr
            BTFSS   EEADR,7         ;skip delay if no write
            GOTO    SKPDEL          ;
            MOVLW   20              ;20 ms delay loop
            MOVWF   TEMP1           ;store delay val
   NXTWT1   CALL    MILSEC          ;stall
            DECFSZ  TEMP1,F         ;end loop
            GOTO    NXTWT1          ;
   SKPDEL   BCF     EEADR,7         ;reset write command bit
            INCF    EEADR,F         ;increment to next address
            RETLW   0               ;exit rite16

;==========MAIN PROGRAM========================

;==========Initialization======================
   INIT     MOVLW   11111010b       ;set porta
                                    ; 3 sdlclk = in
                                    ; 2 sdldat = out
                                    ; 1 zc     = in
                                    ; 0 plc    = out
            TRIS    PORTA           ;
            CLRF    PORTA           ;
            MOVLW   00101111b       ;portb tristate assignment
                                    ; 7 sk     = out
                                    ; 6 di     = out
                                    ; 5 do     = in
                                    ; 4 cs     = out
                                    ; 3 wire4  = in
                                    ; 2 wire3  = in
                                    ; 1 wire2  = in
                                    ; 0 wire1  = in
            TRIS    PORTB           ;
            CLRF    PORTB           ;
            MOVLW   07Fh            ;
            MOVWF   EEADR           ;
            CALL    EEREAD          ;
            MOVLW   11110000b       ;
            XORWF   EEGET,W         ;verify eeprom key byte
            BTFSC   STATUS,ZFLAG    ;1=match: 0=no match
            GOTO    INIT2           ;key byte matches, continue
                                    ;set eeprom defaults
```

10600002.ASM

```
            CALL    EEWEN           ;enable the eeprom
            CALL    EECLR           ;clear  eeprom
            MOVLW   20              ;load delay val 20 ms
            MOVWF   TEMP1           ;
NXTWT2      CALL    MILSEC          ;
            DECFSZ  TEMP1,F         ;
            GOTO    NXTWT2          ;
            CLRF    EEADR           ;write #a:command byte
            MOVLW   11100111b       ;
            CALL    EERITE          ;
            MOVLW   01100110b       ;write Letter:#b
            CALL    EERITE          ;
            MOVLW   04h             ;write enable byte
            CALL    EERITE          ;
            MOVLW   07Fh            ;write to address 7f
            MOVWF   EEADR           ;
            MOVLW   11110000b       ;write key byte
            CALL    EERITE          ;
            CALL    EEWDS           ;disable eeprom write INIT2       MOVLW   11111010b       ;refresh the port direction assigments
                                    ; 3 sdlclk = in
                                    ; 2 sdldat = out
                                    ; 1 zc     = in
                                    ; 0 plc    = out
            TRIS    PORTA           ;
            MOVLW   00101111b       ;portb tristate assignment
                                    ; 7 sk     = out
                                    ; 6 di     = out
                                    ; 5 do     = in
                                    ; 4 cs     = out
                                    ; 3 wire4  = in
                                    ; 2 wire3  = in
                                    ; 1 wire2  = in
                                    ; 0 wire1  = in
            TRIS    PORTB           ;
            CLRF    EEADR           ;refresh buffn & buffl with base plc
            CALL    EEREAD          ; addresses
            MOVF    EEGET,W         ;
            MOVWF   BUFFN           ;
            CALL    EEREAD          ;
            MOVF    EEGET,W         ;
            MOVWF   BUFFL           ;
            CALL    EEREAD          ;refresh enable byte
            MOVF    EEGET,W         ;
            MOVWF   ENABLE          ;

;==========Control Mode=========================

CMODE       CLRWDT                  ;
            MOVLW   116             ;wait for 30 seconds
            MOVWF   DCNT1           ;
DOWN2       CALL    MILSEC          ;
            DECFSZ  DCNT2,F         ;inner count down
            GOTO    DOWN2           ;
            BTFSC   PORTA,SDLCLK    ;1=plugged in: 0=not
            GOTO    SDLCON          ;talk to programmer
            DECFSZ  DCNT1,F         ;outer count down
            GOTO    DOWN2           ;
            MOVLW   01h             ;
            MOVWF   I_MASK          ;
            MOVLW   00001111b       ;force 4 transmits
```

10600002.ASM

```
            MOVWF    XNIB              ;store change status
            MOVF     PORTB,W           ;
            MOVWF    INLAST            ;store last values
;           INCF     BUFF4,F           ;TEST USE TX TOGGLE ********************
;           BTFSS    BUFF4,0           ;TEST USE TX TOGGLE ********************
;           COMF     INLAST,F          ;TEST USE TX TOGGLE ********************
            MOVLW    04H               ;set up a loop to look at each bit of
            MOVWF    COUNT1            ; xnib to see if any of the inputs
                                       ; have changed.

CMODE1
            RRF      XNIB,F            ;
            BTFSC    STATUS,CARRY      ;1=go to xmode: 0=check next input
            GOTO     XMODE             ;
CMODE2
            DECFSZ   COUNT1,F          ;done checking inputs?
            GOTO     NXTCOD            ;no, check next bit of instat
            GOTO     INIT2             ;start over again NXTCOD      RLF      I_MASK,F          ;
            MOVF     BUFFL,W           ;Get next number code
            ANDLW    00001111b         ;Mask out number
            CALL     TABLE             ;
            MOVWF    TEMP1             ;Store number code
            MOVLW    11110000b         ;
            ANDWF    BUFFL,F           ;
            MOVF     TEMP1,W           ;
            IORWF    BUFFL,F           ;
            GOTO     CMODE1            ;

;===========SDL Mode============================

;===========SDL Connect
SDLCON
            MOVLW    11111010b         ;refresh the port direction assigments
                                       ; 3 sdlclk = in
                                       ; 2 sdldat = out
                                       ; 1 zc     = in
                                       ; 0 plc    = out
            TRIS     PORTA             ;
            CLRF     TEMP3             ;255 millisecond delay for connect
NXTWT3      CALL     MILSEC            ;
            DECFSZ   TEMP3             ;
            GOTO     NXTWT3            ;

;===========SDL Main Loop
SYNHI1
            CLRWDT                     ;keep wdt from triggering on slow com
            BTFSC    PORTA,SDLCLK      ;wait for sync clock ready
            GOTO     SYNHI1            ;
SYNLO1      BTFSS    PORTA,SDLCLK      ;wait for sync start
            GOTO     SYNLO1            ;
            MOVLW    00101000B         ;load init tx
            MOVWF    BUFF4             ;store init tx
            CALL     SDLSFT            ;output bit
            CALL     SDLSFT            ;
            CALL     SDLSFT            ;
            CALL     SDLSFT            ;
            CALL     SDLSFT            ;
            CALL     SDLSFT            ;
SDLCOR      GOTO     SDLRCV            ;go receive  packet
RETRCV      GOTO     SDLDEC            ;go decode   packet
```

```
RETDEC   GOTO    SDLENC          ;go encode   packet
RETENC   GOTO    SDLXMT          ;go transmit packet
RETXMT   GOTO    SDLCOR          ;continue sdl loop ;=========SDL Receive Setup and Call
SDLRCV   CLRF    BUFF1           ;beginning of receive routine
         CLRF    BUFF2           ;
         CLRF    BUFF3           ;
         CLRF    BUFF4           ;
SYNHI2   BTFSS   PORTA,SDLCLK    ;wait for rising edge of sdlclk
         GOTO    SYNHI2          ;
SYNLO2
         CLRWDT                  ;keep wdt from triggering on slow com
         BTFSC   PORTA,SDLCLK    ;wait for falling edge of sdlclk
         GOTO    SYNLO2          ;
         MOVLW   11111110b       ;refresh the port direction assigments
                                 ; 3 sdlclk = in
                                 ; 2 sdldat = in
                                 ; 1 zc     = in
                                 ; 0 plc    = out
         TRIS    PORTA           ;
NXTRX    CALL    SDLSFT          ;shift in data buff1-4
         BTFSS   BUFF4,4         ;check for start bit
         GOTO    NXTRX           ;continue receiving bits SYNHI3   BTFSS   PORTA,SDLCLK    ;wait for rising edge of sdlclk
         GOTO    SYNHI3          ;
         MOVLW   11111010b       ;refresh the port direction assigments
                                 ; 3 sdlclk = in
                                 ; 2 sdldat = out
                                 ; 1 zc     = in
                                 ; 0 plc    = out
         TRIS    PORTA           ;
         GOTO    RETRCV          ;return to sdl main ;==========SDL Packet Decoder
;     0001x111-0110xxxx-xxxxxxxx-00000000  data for ASET
;     0001x011-0110xxxx-xxxxxxxx-00000000  data for ARED
SDLDEC   MOVF    BUFF4,W         ;get sdl data
         ANDLW   00001111B       ;mask unneeded data
         MOVWF   TEMP3           ;store masked data
         MOVF    BUFF3,W         ;get more data
         ANDLW   11110000B       ;mask data
         IORWF   TEMP3,F         ;combine to get full command bits
         MOVLW   11110011B       ;load compare bits mask
         ANDWF   TEMP3,W         ;get bits
         XORLW   01100011B       ;compare for aset-ared
         BTFSS   STATUS,ZFLAG    ;0=ared; 1=aset
         GOTO    RETDEC          ;not aset-ared
         BTFSS   TEMP3,2         ;check if cmd is aset
         GOTO    RETDEC          ;do not process data
         CALL    EEWEN           ;enable eeprom for write
         CLRF    EEADR           ;store EEADR
XTDPCC   SWAPF   BUFF3,W
         ANDLW   11110000b       ;mask unneeded data
         XORLW   01100000b       ;compare to PLC1                    **
         BTFSC   STATUS,ZFLAG    ;                                   **
         IORLW   10000000b       ;change PLC1 to PLC2: lockout X10   **
         XORLW   01100000b       ;compare to PLC1                    **
         IORLW   00000111b       ;set extnd code bits
         CALL    EERITE          ;store number code
         MOVF    BUFF2,W         ;get letter code
```

10600002.ASM

```
            CALL    EERITE          ;store letter code
            MOVF    BUFF3,W         ;load buff3 for number comparison
            ANDLW   00001111b       ;mask out upper nibble
            XORLW   00000110b       ;compare to plc 1
            BTFSS   STATUS,ZFLAG    ;0=# not one,extnd: 1=# is one, normal code
            BSF     BUFF1,2         ;set extended code flag
            MOVF    BUFF1,W         ;get enable bits
            CALL    EERITE          ;store enable bits
            GOTO    RETDEC          ;end of xtd address change ;=========SDL Packet Builder BUFF1-4
;    00010010-0010xxxx-xxxxxxxx-xx100x00  response to ARED and ASET
SDLENC  MOVLW   00100000B       ;preload null address number
LDBUF3  MOVWF   BUFF3           ;store in buff3
        CLRF    EEADR           ;
        CALL    EEREAD          ;read xtd address number
        SWAPF   EEGET,W         ;
        ANDLW   00001111B       ;mask for number only
        IORWF   BUFF3,F         ;insert address into buff3
LDBUF2  CALL    EEREAD          ;read address letter
        MOVF    EEGET,W         ;get address letter
        MOVWF   BUFF2           ;store letter
LDBUF1  CALL    EEREAD          ;read enable bits
        MOVF    EEGET,W         ;
        MOVWF   ENABLE          ;store enable bits
        MOVWF   BUFF1           ;store in buff1
LDBUF4  MOVLW   00010010b       ;load nl code for std address
        MOVWF   BUFF4           ;store in buff4
        GOTO    RETENC          ;return to sdl ;=========SDL Transmit Setup and Call
SDLXMT
        MOVLW   32              ;load bit downcount value
        MOVWF   BITCNT          ;load counter
SYNLO3
        CLRWDT                  ;keep wdt from triggering on slow com
        BTFSC   PORTA,SDLCLK    ;wait for falling edge of sdlclk
        GOTO    SYNLO3          ;
NXTTX
        CALL    SDLSFT          ;call shift out
        BCF     BUFF1,0         ;clear junk data rx bit
        DECFSZ  BITCNT,F        ;dec bit counter
        GOTO    NXTTX           ;continue transmitting
        GOTO    RETXMT          ;return to sdl main ;==========Xmit Mode=========================
XMODE
;==========Transmit set up
        MOVLW   11111010b       ;refresh the port direction assigments
                                ; 3 sdlclk = in
                                ; 2 sdldat = out
                                ; 1 zc     = in
                                ; 0 plc    = out
        TRIS    PORTA           ;
        BTFSS   ENABLE,2        ;1=extended Code; 0=normal
        GOTO    XMODEN ;==========Extended Code Transmission
XMODEX  MOVLW   10101111b       ;extra bits; extended code xmission
        MOVWF   XTRAB           ;

XMOD0X  BCF     PORTC,0         ;clear transmission error flag
```

10600002.ASM

```
         MOVLW    11000000b         ;set bit transmission counter to roll
         MOVWF    COUNTE            ; over after 64 ticks.
ZC6X     CALL     ZCROSS            ;???
         CALL     ZCROSS            ;???
         CALL     ZCROSS            ;???
         CALL     ZCROSS            ;???
         CALL     ZCROSS            ;???
         CALL     ZCROSS            ;???

SCODEX   CALL     X1                ;send start code
         CALL     X1                ;
         CALL     X1                ;
         CALL     X0                ;

COPYX    MOVF     BUFFN,W           ;set up xmit rotation buffers
         MOVWF    BUFF1             ; from base bytes
         MOVF     BUFFL,W           ;
         MOVWF    BUFF2             ;

BTFSS    COUNTE,5          ;is it time to mask in the command?
         GOTO     XX                ;no MASKX    MOVLW    11110000b         ;mask in command nibble over the number
         ANDWF    BUFF2,F           ; in the second buffer
         MOVF     I_MASK,W          ;
         ANDWF    INLAST,W          ;
         BTFSC    STATUS,ZFLAG      ;
         GOTO     MSKONX            ;
         MOVLW    00000011b         ;mask in an OFF command
         IORWF    BUFF2,F           ;
         GOTO     XX                ;

MSKONX   MOVLW    00000010b         ;mask in an ON command
         IORWF    BUFF2,F           ;

XX       CLRF     TEMP1             ;
         RLF      BUFF2,F           ;shift the bit to xmit into carry?
         RLF      BUFF1,F           ;
         RLF      TEMP1,F           ;

;==========Eight bit transmission
XMIT1X   BTFSS    TEMP1,0           ;send a 1 or 0?
         GOTO     XZER1X            ;
         CALL     X1                ;send a 1
         GOTO     NDUN1X            ;
XZER1X   CALL     X0                ;send a 0
NDUN1X   BTFSC    TEMP1,7           ;1=complement bit sent; 0=not sent yet
         GOTO     XMOD4X            ;
         MOVLW    81h               ;
         XORWF    TEMP1,F           ;toggle the msb and lsb bit
         GOTO     XMIT1X            ;

XMOD4X   INCF     COUNTE,F          ;increment bit counter
         MOVLW    00000111b         ;done with a set of eight bits yet?
         ANDWF    COUNTE,W          ;
         BTFSS    STATUS,ZFLAG      ;
         GOTO     XX                ;no ;==========Extra bits transmission
XTRAX    CLRF     TEMP1             ;
         RLF      XTRAB             ;
```

10600002.ASM

```
              RLF      TEMP1              ;

XMIT2X        BTFSS    TEMP1,0            ;
              GOTO     XZER2X             ;
              CALL     X1                 ;
              GOTO     NDUN2X             ;
XZER2X        CALL     X0                 ;
NDUN2X        BTFSC    TEMP1,7            ;1=complement sent; 0=not sent
              GOTO     XMOD5X             ;
              MOVLW    81h                ;
              XORWF    TEMP1,F            ;toggle the msb and lsb bit
              GOTO     XMIT2X             ;

XMOD5X        MOVF     COUNTE,W           ;has counter rolled over yet?
              BTFSC    STATUS,ZFLAG       ;1=rolled over; 0=no
              GOTO     CMODE2             ;goto cmode2
              BTFSC    COUNTE,3           ;1=shift 2nd eight bits; 0=next
              GOTO     XX                 ;
              MOVLW    00011111b          ;
              ANDWF    COUNTE,W           ;
              BTFSS    STATUS,ZFLAG       ;1=start of command bytes; 0=not
              GOTO     SCODEX             ;
              GOTO     ZC6X               ;

;=========Normal Code Transmission
XMODEN        MOVLW    00111111b          ;
              MOVWF    XTRAB              ;set up extra bits
;XMODN1       BCF      PORTC,0            ;clear transmission error flag
;             MOVLW    11100000b          ;set bit transmission counter to roll
;             MOVWF    COUNTE             ; over after 32 ticks.
;
;ZC6N         CALL     ZCROSS             ;???
;             CALL     ZCROSS             ;???
;             CALL     ZCROSS             ;???
;             CALL     ZCROSS             ;???
;             CALL     ZCROSS             ;???
;             CALL     ZCROSS             ;???
;
;SCODEN       CALL     X1                 ;send start code
;             CALL     X1                 ;
;             CALL     X1                 ;
;             CALL     X0                 ;
;
;COPYN        MOVF     BUFFL,W            ;
;             MOVWF    BUFF2              ;set up/restore ln in buff2
;             BTFSS    COUNTE,4           ;is it time to mask in the command?
;             GOTO     XN                 ;no
;
;MASKN        MOVLW    11110000b          ;mask in command nibble over the number
;             ANDWF    BUFF2,F            ; in the second buffer
;             MOVF     I_MASK,W           ;
;             ANDWF    INLAST,W           ;
;             BTFSC    STATUS,ZFLAG       ;
;             GOTO     MSKONN             ;
;             MOVLW    00000011b          ;mask in an OFF command
;             IORWF    BUFF2,F            ;
;             GOTO     XN                 ;
;MSKONN       MOVLW    00000010b          ;mask in an ON  command
;             IORWF    BUFF2,F            ;
;
;XN           CLRF     TEMP1
;             RLF      BUFF2,F            ;shift the bit to xmit into carry?
```

10600002.ASM

```
;         RLF     TEMP1,F
;
;;==========Eight bit transmission
;XMIT1N   BTFSS   TEMP1,0         ;send a 1 or 0?
;         GOTO    XZER1N          ;
;         CALL    X1              ;send a 1
;         GOTO    NDUN1N          ;
;XZER1N   CALL    X0              ;send a 0
;NDUN1N   BTFSC   TEMP1,7         ;1=complement bit sent; 0=not sent yet
;         GOTO    XMOD4N          ;
;         MOVLW   81h             ;
;         XORWF   TEMP1,F         ;toggle the msb and lsb bit
;         GOTO    XMIT1N          ;
;
;XMOD4N   INCF    COUNTE,F        ;increment bit counter
;         MOVLW   00000111b       ;test mask
;         ANDWF   COUNTE,W        ;
;         BTFSS   STATUS,ZFLAG    ;1=done with byte: 0=not
;         GOTO    XN              ;
;
;;==========Extra bits transmission
;XTRAN    CLRF    TEMP1           ;
;         RLF     XTRAB           ;
;         RLF     TEMP1           ;
;
;XMIT2N   BTFSS   TEMP1,0         ;
;         GOTO    XZER2N          ;
;         CALL    X1              ;
;         GOTO    NDUN2N          ;
;XZER2N   CALL    X0              ;
;NDUN2N   BTFSC   TEMP1,7         ;1=complement sent; 0=not sent
;         GOTO    XMOD5N          ;
;         MOVLW   81h             ;
;         XORWF   TEMP1,F         ;toggle the msb and lsb bit
;         GOTO    XMIT2N          ;
;
;XMOD5N   MOVF    COUNTE,W        ;has counter rolled over yet?
;         BTFSC   STATUS,ZFLAG    ;1=rolled over; 0=no
         GOTO    CMODE2          ;goto cmode2
;         BTFSS   COUNTE,3        ;0=start of command; 1=now 2nd byte
;         GOTO    ZC6N            ;
;         GOTO    SCODEN          ;
;
END
```

10700004.ASM

```
         LIST P=16C54,R=DEC
;************************************************
; PCC Extended Code Receiver for PIC16C54
; Written by: Mike Neal 092192
; Engineering Part Number: 160-0107-000-000
; Rev: 0   00-00-92  Mike Neal    PIC ID 1049
;************************************************
; Receives commands over the power lines and responds
; by sectively enabling or disabling the output.
; Com-loss timeout=relay off, override jumper sense.
;************************************************
; Default address is 2A1, the first extended code.
; For use in new TRX board, lockout 1A1-1P16     012293
; Shortened receive window to 600uS              050593
;************************************************

; FILE EQUATES
INDEX    EQU 00H                ;INDIRECT INDEX REGISTER
RTCC     EQU 01H                ;TIMER PORT
PC       EQU 02H                ;PROGRAM COUNTER
STATUS   EQU 03H                ;STATUS REGISTER
FSR      EQU 04H                ;FILE SELECT REGISTER
PORTA    EQU 05H                ;Port A 4 bits SDL,ZXING,TX
PORTB    EQU 06H                ;Port B 8 bits RELAY,EEPROM,SENSE
FLAGS    EQU 07H                ;Port C 8 bits not avail., used as var.
;        EQU 08H                ;
;        EQU 09H                ;
;        EQU 0AH                ;
;        EQU 0BH                ;
DELAY    EQU 0CH                ;Timer down counter
DCNT1    EQU 0DH                ;9 min counter
DCNT2    EQU 0EH                ;9 min counter
TEMP1    EQU 0FH                ;general purpose data
TEMP2    EQU 10H                ;general purpose data
TEMP3    EQU 11H                ;general purpose data
BITCNT   EQU 12H                ;general purpose counter
OUTVAL   EQU 13H                ;bit 7 1=ON 0=OFF  output status
BUFF1    EQU 14H                ;PCC-SDL bits shift register
BUFF2    EQU 15H                ;PCC-SDL bits shift register
BUFF3    EQU 16H                ;PCC-SDL bits shift register
BUFF4    EQU 17H                ;PCC-SDL bits shift register
BUFF5    EQU 18H                ;PCC-SDL bits shift register
BUFF6    EQU 19H                ;PCC-SDL bits shift register
EEADR    EQU 1AH                ;EE Address
EEGET    EQU 1BH                ;EE shift space for read
EEPUT    EQU 1CH                ;EE shift space for write
;        EQU 1DH                ;
ENABL    EQU 1EH                ;bits showing enabled functions
STATE    EQU 1FH                ;bits showing CMD decode ZC       EQU 1                  ;zero crossings input
FB       EQU 0                  ;relay sense input
F        EQU 1                  ;file direction control
SK       EQU 7                  ;EE shift clock
DI       EQU 6                  ;EE data to EEprom
DO       EQU 5                  ;EE data from EEprom
CS       EQU 4                  ;EE chip select
NLN      EQU 0                  ;Letter Number Letter code ok bit
CMD      EQU 1                  ;CoManD detected ok bit
COK      EQU 2                  ;Command accepted
DAT      EQU 2                  ;SDL data I/O
SYN      EQU 3                  ;SDL sync clock
```

10700004.ASM

```
ZRO       EQU   2                       ;status bit ZERO  flag
CAR       EQU   0                       ;status bit CARRY flag
;         STATE BITS                    ENABLE BITS
;         0 NLN valid                   0 always zero
;         1 CMD detected                1 not used
;         2 previous CMD                2 1=extended code device
;         3 1=ON  or BRT                3 1=enable polite transmit
;         4 1=OFF or DIM                4 1=enable 50Hz timing
;         5 0=ON/OFF 1=BRT/DIM          5 1=enable ALL ON  response
;         6 0=STD 1=SFT cmd set         6 1=enable BRT/DIM response
;         7 1=PVALID OK                 7 1=enable shifted command set ;==============================================================================
; PROGRAM START
;==============================================================================
          ORG   01FFh                   ;locate FIRST EXECUTED address
          GOTO  INIT                    ;FIRST INSTRUCTION
          ORG   000H                    ;locate FIRST ADDRESS for SUBROUTINES
;==============================================================================
; SUBROUTINES APPEAR FIRST BECAUSE THEY HAVE TO
; BE WITHIN THE FIRST 255 BYTES OF ROM ON THIS CPU
;==============================================================================

ETABLE    ADDWF PC,F                    ;vector to data look up
          RETLW 11110000B               ;0    first key byte
          RETLW 01111100B               ;1    SC, 2       PCC stored compressed
          RETLW 11110110B               ;2    Ext, A
          RETLW 01100000B               ;3    1, A/C=0
          RETLW 00100000B               ;4    ENABLE bits see table end of EQUs
          RETLW 00110011B               ;5    CHIP-YEAR   CY   00-F9
          RETLW 00011000B               ;6    WEEK-WEEK   WW   01-52

MILSEC    MOVLW 199                     ;load W with delay value
MILOOP    MOVWF DELAY                   ;load count down variable
          NOP                           ;fill delay time
          DECFSZ DELAY,W
          GOTO  MILOOP
          CLRWDT
          RETLW 0

ZCROSS    BTFSS PORTA,ZC                ;check current AC level, goto correct wait
          GOTO  ZEROH                   ;
ZEROL     BTFSC PORTA,ZC                ;test zero crossing input,done if LOW
          GOTO  ZEROL                   ;not LOW yet
          GOTO  GO4IT                   ;exit loop
ZEROH     BTFSS PORTA,ZC                ;test zero crossing input,done if HIGH
          GOTO  ZEROH                   ;not HIGH yet
GO4IT     CLRF  RTCC                    ;preclear RTCC for PCC detect
          RETLW 0                       ;

RELOUT    MOVLW 00000000B               ;set RELAY NULL
          BTFSS PORTA,ZC                ;check if NEGATIVE half cycle
          GOTO  OUTPUT                  ;skip   if NEGATIVE half cycle
          MOVLW 00101111B               ;set relay lines as inputs to test sense
          TRIS  PORTB                   ;
          BTFSC OUTVAL,7                ;check if DEMAND is LATCHED
          GOTO  TESTON                  ;
TESTOF    BTFSC PORTB,FB                ;check if RELAY is UNLATCHED
          MOVLW 00000010B               ;set RELAY OFF
          GOTO  OUTPUT                  ;
TESTON    BTFSS PORTB,FB                ;check if RELAY is LATCHED
```

10700004.ASM

```
            MOVLW   00000001B       ;set RELAY ON
OUTPUT      MOVWF   TEMP1           ;save outops
            MOVLW   00101100B       ;set relay lines as outputs
            TRIS    PORTB           ;
            MOVF    TEMP1,W         ;get outops
            MOVWF   PORTB           ;switch output
            RETLW   0               ;

SFTBUF      RLF     BUFF1,F         ;rotate carry into first buffer
            RLF     BUFF2,F         ;rotate buff1 carry into buff2
            RLF     BUFF3,F         ;rotate buff2 carry into buff3
            RLF     BUFF4,F         ;rotate buff3 carry into buff4
            RLF     BUFF5,F         ;rotate buff4 carry into buff5
            RLF     BUFF6,F         ;rotate buff5 carry into buff6
            RETLW   0               ;end of SFTBUF VALID1      MOVWF   TEMP2           ;store
            ANDLW   10101010B       ;mask true bits
            MOVWF   TEMP1           ;store
            MOVLW   01010101B       ;mask complement bits
            ANDWF   TEMP2,F         ;store
            XORWF   TEMP2,F         ;invert complement bits
            RLF     TEMP2,F         ;shift complement bits to true
            BCF     TEMP2,0         ;clear undefined bit
            MOVF    TEMP2,W         ;get TEMP2 for compare
            XORWF   TEMP1,W         ;compare to inverted complement
            BTFSS   STATUS,ZRO      ;check if match
            BCF     STATE,7         ;clear if no match
            RETLW   0

EECLK       BSF     PORTB,SK        ;clock out bit
            BCF     PORTB,SK        ;
            RETLW   0               ;end of EECLK EERITE      MOVWF   EEPUT           ;store data
            BSF     EEADR,7         ;set D7 for WRITE
            GOTO    EECM2           ;send command to EE without EEADR store
EEWEN       MOVLW   01100000B       ;load EWEN
            GOTO    EECMD           ;send command to EE
EEWDS       MOVLW   00000000B       ;load EWDS
            GOTO    EECMD           ;send command to EE
EECLR       MOVLW   01000000B       ;load ERAL
EECMD       MOVWF   EEADR           ;store command
EECM2       BCF     PORTB,SK        ;clear SK
            BCF     PORTB,DI        ;clear DI
            BSF     PORTB,CS        ;enable EE
            CALL    EECLK
            BSF     PORTB,DI        ;data 1
            CALL    EECLK
            BCF     PORTB,DI        ;data 0
            CALL    EECLK
            GOTO    RITE16          ;write EEADR, EEPUT get EEGET EEREAD      BCF     PORTB,SK        ;clear SK
            BCF     PORTB,DI        ;clear DI
            BSF     PORTB,CS        ;enable EE
            CALL    EECLK
            BSF     PORTB,DI        ;data 1
            CALL    EECLK
            BSF     PORTB,DI        ;data 1
            CALL    EECLK
```

10700004.ASM

```
RITE16   MOVLW    8                ;load counter value
         MOVWF    BITCNT           ;store count value
         MOVF     EEADR,W          ;get copy of EEADR
         MOVWF    TEMP1            ;store backup copy
LOOPA    RLF      TEMP1,F          ;shift bit into Carry
         BCF      PORTB,DI         ;default clear DI
         BTFSC    STATUS,CAR       ;test if 1 needs sent
         BSF      PORTB,DI         ;set output to 1
         CALL     EECLK            ;
         DECFSZ   BITCNT,F         ;dec bit counter
         GOTO     LOOPA            ;next bit
         MOVLW    8                ;load counter value
         MOVWF    BITCNT           ;store count value
LOOPB    RLF      EEPUT,F          ;shift bit into Carry
         BCF      EEPUT,0          ;clear junk bit
         BCF      PORTB,DI         ;default clear DI
         BTFSC    STATUS,CAR       ;test if 1 needs sent
         BSF      PORTB,DI         ;set output to 1
         CALL     EECLK            ;
REDBIT   RLF      EEGET,F          ;shift read data
         BCF      EEGET,0          ;preclear shift in bit
         BTFSC    PORTB,DO         ;check for 1 bit
         BSF      EEGET,0          ;set bit to 1
         DECFSZ   BITCNT,F         ;dec bit counter
         GOTO     LOOPB            ;next bit
         BCF      PORTB,DI         ;clear DI
         BCF      PORTB,CS         ;disable EE
         BTFSS    EEADR,7          ;skip delay if no write
         GOTO     SKPDEL           ;
         MOVLW    20               ;load delay val 20ms
         MOVWF    TEMP1            ;
NXTWT1   CALL     MILSEC           ;stall
         DECFSZ   TEMP1,F          ;
         GOTO     NXTWT1           ;
SKPDEL   BCF      EEADR,7          ;clear Write bit
         INCF     EEADR,F          ;increment to next address
         RETLW    0                ;exit RITE16

WATLOW   CLRWDT                    ;keep WDT from triggering on slow com
         BTFSC    PORTA,SYN        ;wait for sync clock READY
         GOTO     WATLOW           ;
         RETLW    0                ;

SDLSFT   BTFSS    PORTA,SYN        ;wait for rising edge of SYNC
         GOTO     SDLSFT           ;
         BCF      PORTA,DAT        ;preset data out 0
         BTFSC    BUFF4,7          ;check data out level
         BSF      PORTA,DAT        ;set data out if 1
WAITRX   CALL     WATLOW           ;wait for falling edge of SYNC
         CALL     SFTBUF           ;shift BUFF1-6
         BCF      BUFF1,0          ;
         BTFSC    PORTA,DAT        ;check DATa Rx
         BSF      BUFF1,0          ;
         RETLW    0                ;
```

;================================================================
; Program Initialization
;================================================================

```
INIT     MOVLW    00000011B        ;preload outval
         MOVWF    OUTVAL           ;preload
         CLRF     STATE            ;preclear variables
```

10700004.ASM

```
                                        ;I/O definition 1=input 0=output
                MOVLW   00001010B       ;2-SDL data in-out,1 ZXING
                TRIS    PORTA           ;3-SDL clock in,0 Tx
                CLRF    PORTA           ;
                MOVLW   00101100B       ;0-1 relay out,2-3 N/C
                TRIS    PORTB           ;4 EECS,5 EEDO,6 EEDI,7 EESK
                MOVLW   00000000B       ;
                TRIS    FLAGS           ;portC used as FLAGS
                CLRF    PORTB           ;

CLRF    TEMP1           ;preset startup delay value to 256mS
                MOVLW   8               ;delay value for 2 seconds
                MOVWF   TEMP2           ;
STRDEL          CALL    MILSEC          ;delay 256mS
                DECFSZ  TEMP1,F         ;
                GOTO    STRDEL          ;
                DECFSZ  TEMP2,F         ;
                GOTO    STRDEL          ;
                GOTO    EETEST          ;test EE first INIT2           CLRWDT                  ;I/O definition 1=input 0=output
                MOVLW   00001010B       ;2-SDL data in-out,1 ZXING
                TRIS    PORTA           ;3-SDL clock in,0 TX
                MOVLW   00101100B       ;0-1 relay out,2-3 N/C
                TRIS    PORTB           ;4 EECS,5 EEDO,6 EEDI,7 EESK
                MOVLW   00000000B       ;
                TRIS    FLAGS           ;portC used as FLAGS
                MOVLW   4               ;set address for ENABL bits
                MOVWF   EEADR           ;
                CALL    EEREAD          ;read ENABL bits from EE
                MOVF    EEGET,W         ;
                MOVWF   ENABL           ;store ENABL bits
SDLDET          BSF     PORTA,DAT       ;set data high for override jumper test
                BTFSC   PORTA,SYN       ;check if SDL connected
                GOTO    SDLCOM          ;
                BTFSS   OUTVAL,7        ;if status is on, leave LED on
                BCF     PORTA,DAT       ;clr data for normal ops
                BSF     FLAGS,7         ;set complement enable
                DECFSZ  DCNT2,F         ;dec 9 min time out
                GOTO    ZXING           ;not end of time out
                DECFSZ  DCNT1,F         ;dec 9 min time out
                GOTO    ZXING           ;not end of time out
                BCF     OUTVAL,7        ;force output OFF if time out

ZXING           CALL    ZCROSS          ;

RELAY           CALL    RELOUT          ;check output status

PCCRCV          MOVLW   119             ;load W with delay value
RDELAY          MOVWF   DELAY           ;load count down variable
                NOP                     ;fill delay time
                DECFSZ  DELAY,W         
                GOTO    RDELAY          
                CLRWDT                  
                MOVLW   209             ;209 + 47 (a valid PCC ONE)
                ADDWF   RTCC,W          ;will set the carry bit.
                CALL    SFTBUF          ;shift BUFFs PSTART
;               CALL    MILSEC          ;extra delay for no apparent reason
                MOVLW   00001111B       ;load mask
                ANDWF   BUFF6,W         ;check for clear leadin
```

10700004.ASM

```
                BTFSS   STATUS,ZRO      ;skip exit if leadin OK
                GOTO    GOMAIN          ;exit routine, invalid leadin
                MOVLW   11110000B       ;load SC mask
                ANDWF   BUFF5,W         ;mask SC into W for test
                XORLW   11100000B       ;test for valid SC
                BTFSS   STATUS,ZRO      ;valid SC skip to PCID
                GOTO    GOMAIN          ;restart PVALID          BSF     STATE,7         ;preset PVALID
                MOVLW   01000000B       ;SC mask for true-comp check
                XORWF   BUFF5,W         ;move masked BUFF5 for check
                CALL    VALID1          ;perform check
                MOVF    BUFF4,W         ;move BUFF4 for check
                CALL    VALID1          ;perform check
                BTFSS   ENABL,2         ;check if standard PCC mode
                BCF     BUFF3,0         ;preset bit for STD test
                MOVF    BUFF3,W         ;move BUFF3 for check
                CALL    VALID1          ;perform check
                BTFSS   ENABL,2         ;check if standard PCC mode
                GOTO    VALEND          ;done with test if STD PCC
                MOVF    BUFF2,W         ;move BUFF2 for check
                CALL    VALID1          ;perform check
                MOVF    BUFF1,W         ;move BUFF1 for check
                CALL    VALID1          ;perform check
VALEND          BTFSS   STATE,7         ;check if all BUFF valid PCC
                GOTO    GOMAIN          ;exit checks PCCSQZ          MOVLW   21              ;preload bit shift value
                MOVWF   BITCNT          ;store shift count
                CLRF    TEMP1           ;preclear temp data
NXTSQZ          RLF     TEMP1,F         ;shift temp1
                RLF     TEMP2,F         ;shift temp2
                RLF     TEMP3,F         ;shift temp3
                CALL    SFTBUF          ;shift BUFF1-6 for bit scan
                BCF     TEMP1,0         ;preclear temp1,0
                BTFSC   BUFF6,2         ;check PCC DATA
                BSF     TEMP1,0         ;set DATA bit in temp1
                CALL    SFTBUF          ;shift BUFF1-6 for bit skip
                DECFSZ  BITCNT,F        ;count down bits
                GOTO    NXTSQZ          ;continue squeeze
                MOVF    TEMP3,W         ;
                MOVWF   BUFF3           ;
                MOVF    TEMP2,W         ;
                MOVWF   BUFF2           ;
                MOVF    TEMP1,W         ;
                MOVWF   BUFF1           ;
                CALL    SFTBUF          ;
                CALL    SFTBUF          ;
                BTFSC   ENABL,2         ;goto last shift if XTD mode
                GOTO    SQZEND          ;
                MOVF    BUFF2,W         ;get end of STD transmission
                MOVWF   BUFF1           ;store in last BUFF
                MOVF    BUFF3,W         ;get mid of STD transmission
                MOVWF   BUFF2           ;store in mid BUFF
                MOVLW   11000000B       ;mask unknown bits
                IORWF   BUFF2,F         ;set unknown bits
                BTFSC   ENABL,2         ;goto last shift if XTD mode
SQZEND          CALL    SFTBUF          ;
                MOVLW   11111000B       ;mask for unknown bits
                ANDWF   BUFF1,F         ;mask

PCIDOK
```

10700004.ASM

```
                MOVLW       1                   ;load address of first byte
                MOVWF       EEADR               ;store address
                CALL        EEREAD              ;get first byte
                MOVF        EEGET,W             ;get address for compare
                XORWF       BUFF3,W             ;compare for match
                BTFSS       ENABL,2             ;skip auto verify if XTD code
                BSF         STATUS,ZRO          ;set  fake verify if STD code
                BTFSS       STATUS,ZRO          ;
                GOTO        CLRNLN              ;no match
                CALL        EEREAD              ;get next byte
                MOVF        EEGET,W             ;get address for compare
                XORWF       BUFF2,W             ;compare for match
                BTFSS       STATUS,ZRO          ;
                GOTO        CLRNLN              ;no match
                BSF         STATE,CMD           ;preset CMD
                BTFSC       BUFF1,3             ;check for Command
                GOTO        CMDDEC              ;goto CoManD DECode
                BCF         STATE,CMD           ;clear CMD preset
                BTFSS       STATE,2             ;check for previous CMD valid
                GOTO        NXTID               ;
                BCF         STATE,2             ;
                BCF         STATE,NLN           ;
NXTID           CALL        EEREAD              ;get next byte
                MOVF        EEGET,W             ;get address for compare
                XORWF       BUFF1,W             ;compare for match
                BTFSC       STATUS,ZRO          ;
                BSF         STATE,NLN           ;SC NLN matched
                GOTO        GOMAIN              ;continue to receive
CLRNLN          BCF         STATE,NLN           ;not valid NL code
                GOTO        GOMAIN              ;

CMDDEC          MOVLW       10000011B           ;mask CMD and CMD valid bits off
                ANDWF       STATE,F             ;store STATE bits
                MOVLW       00101000B           ;ON
                XORWF       BUFF1,W             ;
                BTFSC       STATUS,ZRO          ;
                BSF         STATE,3             ;cmd=ON
                MOVLW       00111000B           ;OFF
                XORWF       BUFF1,W             ;
                BTFSC       STATUS,ZRO          ;
                BSF         STATE,4             ;cmd=OFF
                BTFSS       ENABL,5             ;skip ALL ON-OFF if not enabled
                GOTO        CMDBRT              ;
                MOVLW       00011000B           ;ALL ON     \
                XORWF       BUFF1,W             ;            |
                BTFSS       STATUS,ZRO          ;            |
                GOTO        CMDAOF              ;            | ALL ON-OFF commands
                BSF         STATE,3             ;cmd=ON      | only respond if
                BSF         STATE,NLN           ;L=1         | enabled here by
CMDAOF          MOVLW       00001000B           ;ALL OFF     | setting L=1
                XORWF       BUFF1,W             ;            |
                BTFSS       STATUS,ZRO          ;            |
                GOTO        CMDBRT              ;            |
                BSF         STATE,4             ;cmd=OFF     |
                BSF         STATE,NLN           ;L=1        /
CMDBRT          BTFSS       ENABL,6             ;check for BRT-DIM enabled
                GOTO        CMDVAL              ;skip BRT-DIM options
                MOVLW       01011000B           ;BRT
                XORWF       BUFF1,W             ;
                BTFSS       STATUS,ZRO          ;
                GOTO        CMDDIM              ;
                BSF         STATE,3             ;cmd=ON
```

10700004.ASM

```
         BSF     STATE,5           ;cmd=BRT
CMDDIM   MOVLW   01001000B         ;DIM
         XORWF   BUFF1,W           ;
         BTFSS   STATUS,ZRO        ;
         GOTO    CMDVAL            ;
         BSF     STATE,4           ;cmd=OFF
         BSF     STATE,5           ;cmd=DIM
CMDVAL   BTFSS   STATE,NLN         ;check for valid L
         GOTO    CMDACT            ;EXIT,INVALID ADDRESS
         MOVF    STATE,W           ;load CMD
         ANDLW   00111000B         ;check if valid CMD found
         BTFSS   STATUS,ZRO        ;
         BSF     STATE,2           ;set C=1

CMDACT   BTFSS   STATE,2           ;valid CMD?
         GOTO    GOMAIN            ;exit, no command
         BTFSS   OUTVAL,7          ;check if CONDITION is ON
         GOTO    NODIM             ;skip BRT-DIM options
         BTFSS   STATE,5           ;check for BRT-DIM command
         GOTO    NODIM             ;skip BRT-DIM options
MAXDIM   MOVLW   10111100B         ;load max test value
         XORWF   OUTVAL,W          ;check DIMVAL for max dim
         BTFSC   STATUS,ZRO        ;if not max-dim, skip
         BCF     STATE,4           ;disable DIM if max value
MAXBRT   MOVLW   10000011B         ;load min test value
         XORWF   OUTVAL,W          ;check DIMVAL for min dim
         BTFSC   STATUS,ZRO        ;if not min-dim, skip
         BCF     STATE,3           ;disable BRT if min value
BRTCMD   BTFSC   STATE,3           ;check for BRT
         DECF    OUTVAL,F          ;decrease DIM value
DIMCMD   BTFSC   STATE,4           ;check for DIM
         INCF    OUTVAL,F          ;increase DIM value
         GOTO    CLRCMD            ;exit CMD
NODIM
;        MOVLW   11111111B         ;test for FF for no apparent reason ***
;        XORWF   BUFF3,W           ;                                   ***
;        BTFSS   STATUS,ZRO        ;                                   ***
;        MOVF    BUFF3,F           ;test for 00 for no apparent reason ***
;        BTFSC   STATUS,ZRO        ;                                   ***
;        GOTO    CLRCMD            ;                                   ***
         BTFSC   STATE,5           ;check if DIMBRT=ON
         GOTO    CLRCMD            ;skip ON-OFF if OFF and DIM CMD
         BTFSC   STATE,3           ;check if CMD=ON
         BSF     OUTVAL,7          ;this routine turns ON to last OUTVAL
         BTFSC   STATE,4           ;check if CMD=OFF
         BCF     OUTVAL,7          ;turn off without affecting OUTVAL
CLRCMD   MOVLW   11000101B         ;clear last command
         ANDWF   STATE             ;clear last command
         CLRF    DCNT1             ;set time out value to MAX
         GOTO    GOMAIN            ;

EETEST   CLRF    EEADR             ;set address for EEvalid test
         CALL    EEREAD            ;get key byte from EE for test
         CLRW                      ;set data EEvalid test
         CALL    ETABLE            ;key byte test value
         XORWF   EEGET,W           ;compare key byte to test value
         BTFSC   STATUS,ZRO        ;check match
         GOTO    GOMAIN            ;exit
         CALL    EEWEN             ;enable EEprom write functions
         CALL    EECLR             ;clear  EEprom
         MOVLW   20                ;load delay val 20ms
         MOVWF   TEMP1             ;
```

10700004.ASM

```
NXTWT2   CALL    MILSEC          ;stall
         DECFSZ  TEMP1,F         ;
         GOTO    NXTWT2          ;
         CLRF    EEADR           ;reset to base address
DFLOOP   MOVF    EEADR,W         ;get vector
         CALL    ETABLE          ;get default data
         CALL    EERITE          ;store data in EEprom
         MOVLW   7               ;sets max address+1 to write
         XORWF   EEADR,W         ;checks for max address
         BTFSS   STATUS,ZRO      ;exit loop if done
         GOTO    DFLOOP          ;continue in default loop
         CALL    EEWDS           ;disable EEprom write functions GOMAIN   GOTO    INIT2           ;goto program start ;==========SDL CONNECT==================================
SDLCOM
         CALL    MILSEC          ;
         MOVLW   00001010B       ;
         TRIS    PORTA           ;
         CLRF    PORTA           ;
         NOP                     ;stall to stabilize port    ***
         BTFSS   PORTA,SYN       ;check for override jumper
         GOTO    OVRIDE          ;goto output test
         CLRF    TEMP1           ;255 millisecond delay for connect
NXTWT3   CALL    MILSEC          ;
         DECFSZ  TEMP1,F         ;
         GOTO    NXTWT3          ;

;==========SDL MAIN PROGRAM LOOP========================
         CALL    WATLOW          ;wait for falling edge of Sync
         CLRF    BUFF4           ;
         CLRF    BUFF3           ;
         CLRF    BUFF2           ;
         MOVLW   00001010B       ;load link Tx
         MOVWF   BUFF1           ;
         GOTO    SDLXMT          ;send link
SDLCOR   GOTO    SDLRCV          ;go receive  packet
RETRCV   GOTO    SDLDEC          ;go decode   packet
RETDEC   GOTO    SDLENC          ;go encode   packet
RETENC   GOTO    SDLXMT          ;go transmit packet
RETXMT   GOTO    SDLCOR          ;continue SDL loop ;==========SDL RECEIVE SETUP AND CALL===================
SDLRCV   CLRF    BUFF1           ;Beginning of Receive routine
         CLRF    BUFF2           ;
         CLRF    BUFF3           ;
         CLRF    BUFF4           ;
SYNHI2   BTFSS   PORTA,SYN       ;wait for rising edge of SYNC
         GOTO    SYNHI2          ;
         CALL    WATLOW          ;wait for falling edge of SYNC
         MOVLW   00001110B       ;set for Receive
         TRIS    PORTA           ;
NXTRX    CALL    SDLSFT          ;shift in data BUFF1-4
         BTFSS   BUFF4,4         ;check for last bit Rxvd
         GOTO    NXTRX           ;continue Rx
SYNHI3   BTFSS   PORTA,SYN       ;wait for rising edge of SYNC
         GOTO    SYNHI3          ;
         CALL    WATLOW          ;wait for falling edge of SYNC
         MOVLW   00001010B       ;set for Transmit
         TRIS    PORTA           ;
         CLRF    PORTA           ;
```

10700004.ASM

```
            GOTO    RETRCV          ;return to SDL main
;=========SDL PACKET DECODER=================================
;    0001x111-0110xxxx-xxxxxxxx-xx000x00  data for ASET
;    0001x011-01100000-00000000-00000000  data for ARED
SDLDEC  MOVF    BUFF4,W         ;get SDL data
        ANDLW   00001111B       ;mask unneeded data
        MOVWF   TEMP1           ;store masked data
        MOVF    BUFF3,W         ;get more data
        ANDLW   11110000B       ;mask data
        IORWF   TEMP1,F         ;combine to get full command bits
        MOVLW   11110011B       ;load compare bits mask
        ANDWF   TEMP1,W         ;get bits
        XORLW   01100011B       ;compare for ASET or ARED
        BTFSS   STATUS,ZRO      ;command is ASET or ARED?
        GOTO    RETDEC          ;not ASET or ARED
        BTFSS   TEMP1,2         ;check if cmd is ASET
        GOTO    RETDEC          ;do not process data
        CALL    EEWEN           ;enable EEprom for Write
        MOVLW   1               ;load EEADR value
        MOVWF   EEADR           ;store EEADR
        RLF     BUFF3,W         ;get   Number code
        ANDLW   00011110B       ;mask unneeded data
        XORLW   00001100B       ;mask to test XN for 1      **
        BTFSC   STATUS,ZRO      ;compare XN to PLC1         **
        IORLW   00010000B       ;convert PLC1 to PLC2       **
        XORLW   00001100B       ;restore XN                 **
        MOVWF   TEMP2           ;extra copy of masked XN
        IORLW   01100000B       ;set SC bits
        CALL    EERITE          ;store Number code
        MOVLW   00001100B       ;mask to test XN for 1
        XORWF   TEMP2,W         ;compare XN to 1
        BTFSS   STATUS,ZRO      ;skip if 1
        BSF     BUFF1,2         ;force to XTD mode
        SWAPF   BUFF2,W         ;get   Letter code
        IORLW   11110000B       ;set XTD bits
        CALL    EERITE          ;store Letter code
        SWAPF   BUFF2,W         ;get   Number code
        ANDLW   11110000B       ;clear unneeded bits
        CALL    EERITE          ;store Number code
        BCF     BUFF1,0         ;force last bit to 0
        MOVF    BUFF1,W         ;get   ENABL bits
        CALL    EERITE          ;store ENABL bits
        GOTO    RETDEC          ;end of XTD Address change ;=========SDL PACKET BUILDER BUFF1-4=========================
;    0001x000-0010xxxx-xxxxxxxx-xxxxxxx0  response to ARED and ASET
SDLENC  MOVLW   00100000B       ;preload null address number
LDBUF3  MOVWF   BUFF3           ;store in   BUFF3
        MOVLW   1               ;address of xtd address number
        MOVWF   EEADR           ;
        CALL    EEREAD          ;read xtd address number
        RRF     EEGET,W         ;shift data for convenience
        ANDLW   00001111B       ;mask for number only
        IORWF   BUFF3,F         ;insert address into BUFF3
LDBUF2  CALL    EEREAD          ;read address letter
        MOVF    EEGET,W         ;get   address letter
        ANDLW   00001111B       ;mask unneeded data
        MOVWF   BUFF2           ;store letter
        CALL    EEREAD          ;read address number
        MOVF    EEGET,W         ;get   address number
        ANDLW   11110000B       ;mask unneeded data
```

10700004.ASM

```
            IORWF   BUFF2,F         ;store number
            SWAPF   BUFF2,F         ;position BUFF2 letter-number
LDBUF1      CALL    EEREAD          ;read  ENABL bits
            MOVF    EEGET,W         ;
            MOVWF   ENABL           ;store ENABL bits
            MOVWF   BUFF1           ;store in BUFF1
LDBUF4      MOVLW   00010000B       ;load NL code for STD address
            MOVWF   BUFF4           ;store in BUFF4
            GOTO    RETENC          ;return to SDL ;==========SDL TRANSMIT SETUP AND CALL=====================
SDLXMT      MOVLW   32              ;load bit downcount value
            MOVWF   BITCNT          ;load counter
NXTTX       CALL    SDLSFT          ;call shift out
            BCF     BUFF1,0         ;clear junk data Rx bit
            DECFSZ  BITCNT          ;dec bit counter
            GOTO    NXTTX           ;continue Tx
            GOTO    RETXMT          ;return to SDL main OVRIDE      MOVF    FLAGS,W         ;get mask
            XORWF   OUTVAL,F        ;complement output
            BCF     FLAGS,7         ;clear complement enable
            CALL    ZCROSS          ;
            CALL    RELOUT          ;
            CALL    ZCROSS          ;
            CALL    RELOUT          ;
            GOTO    GOMAIN          ;

END                                 ;end of listing
```

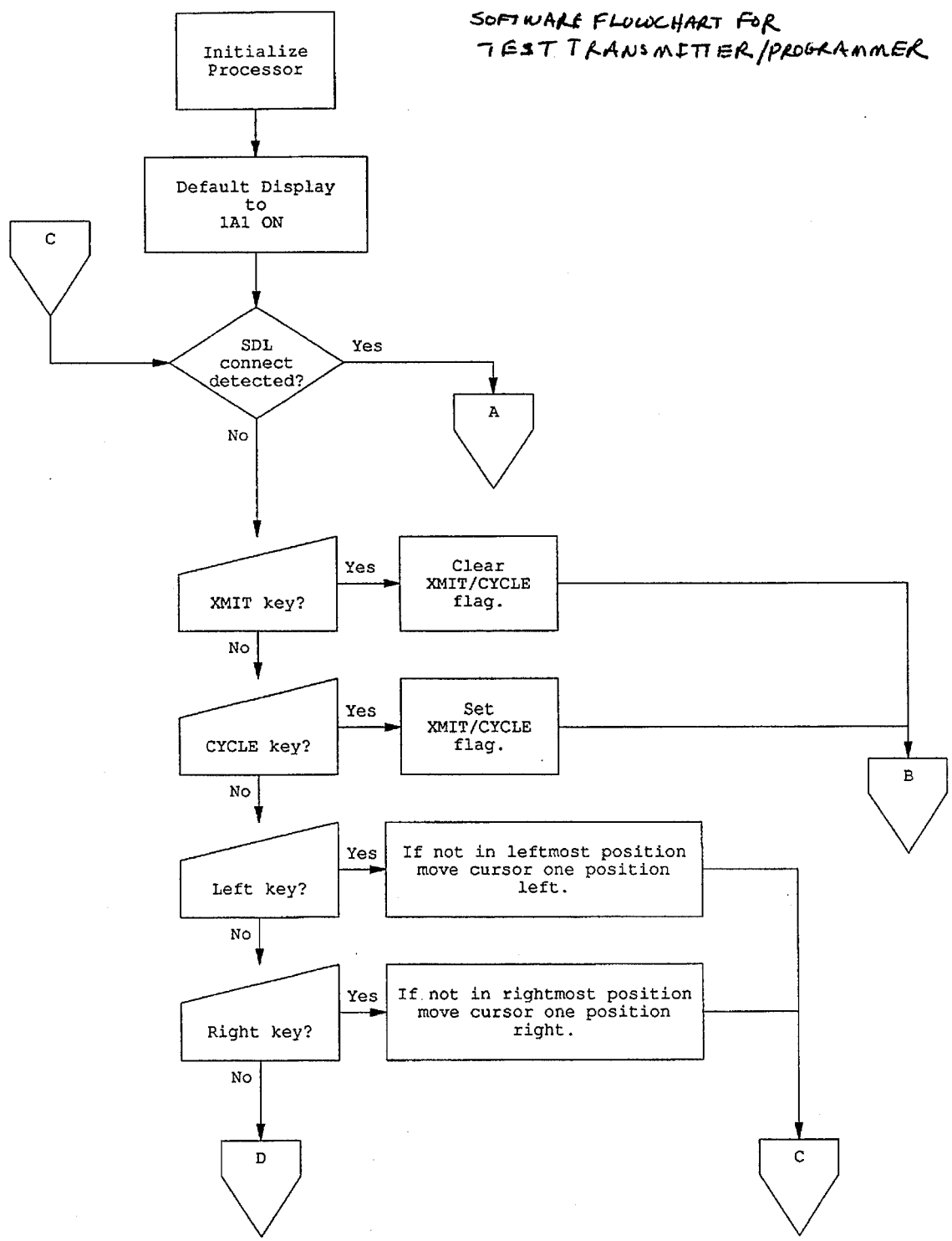

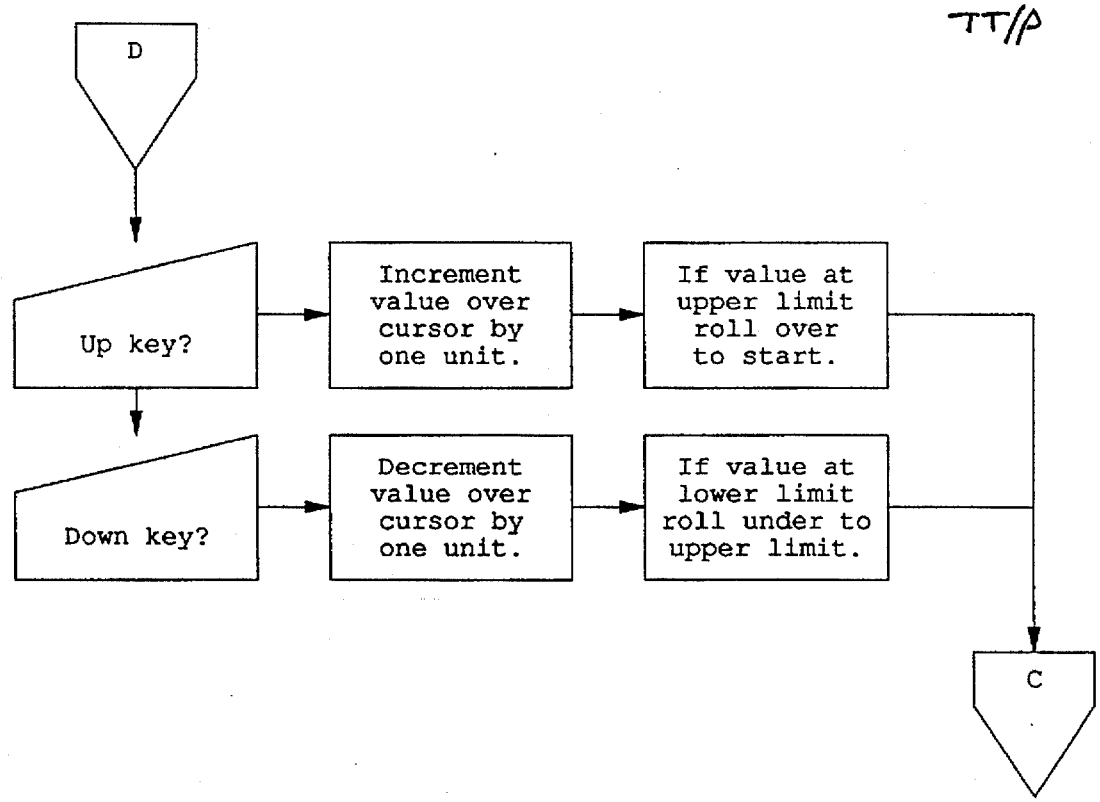

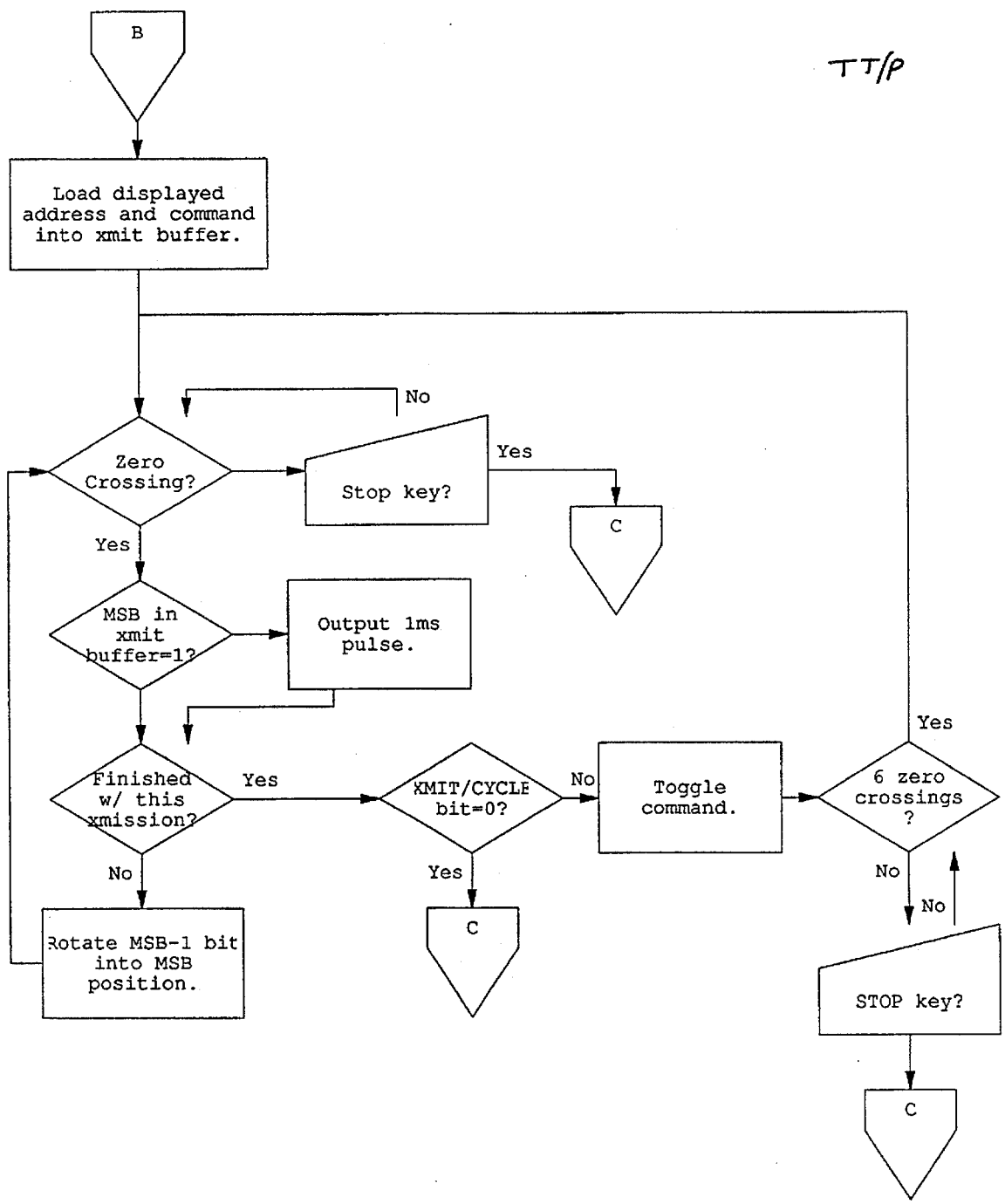

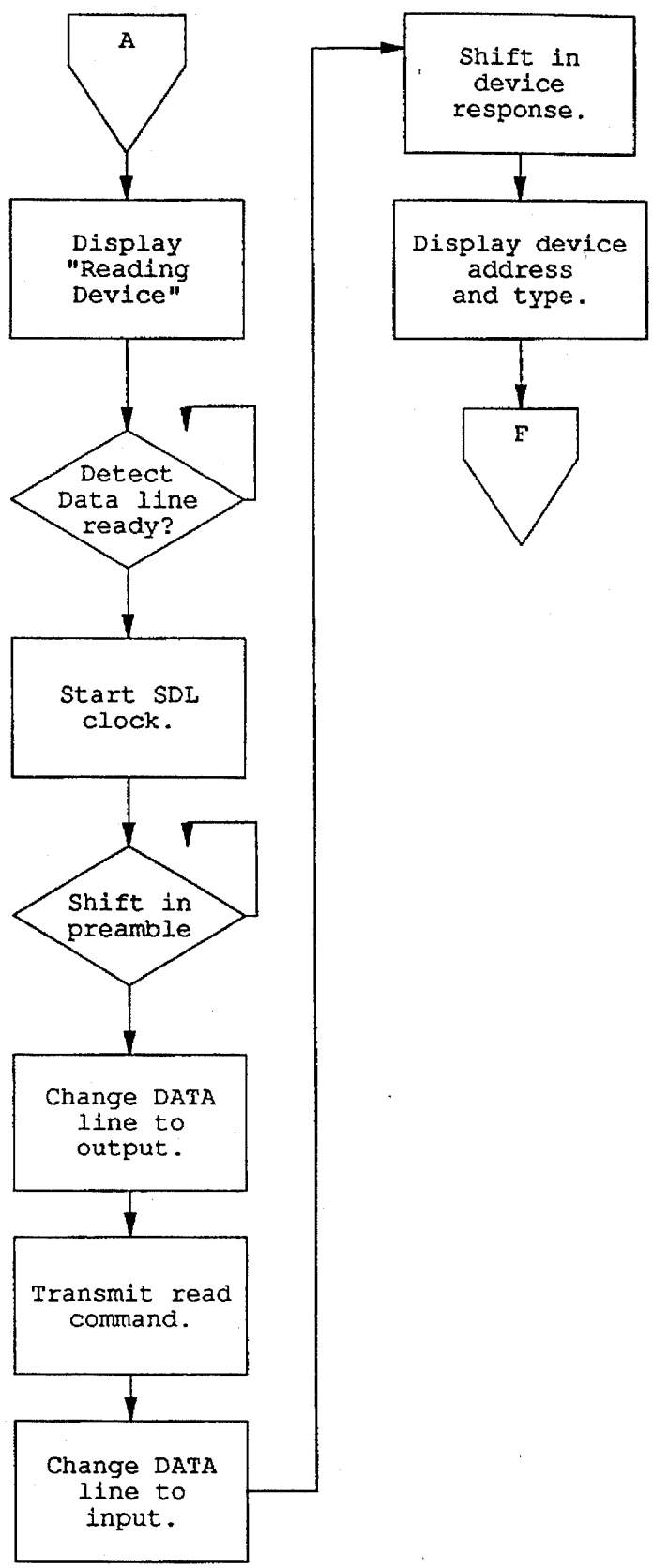

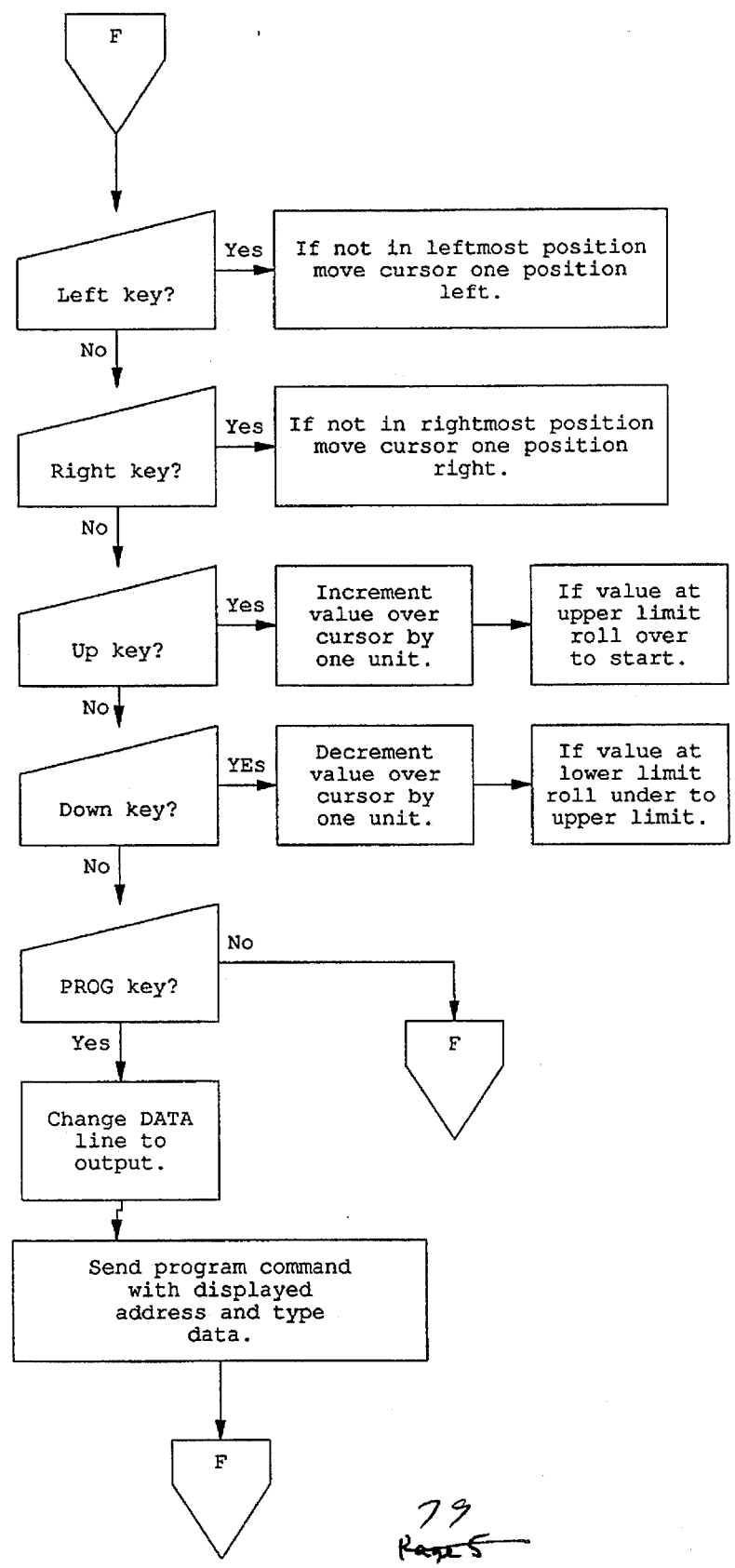

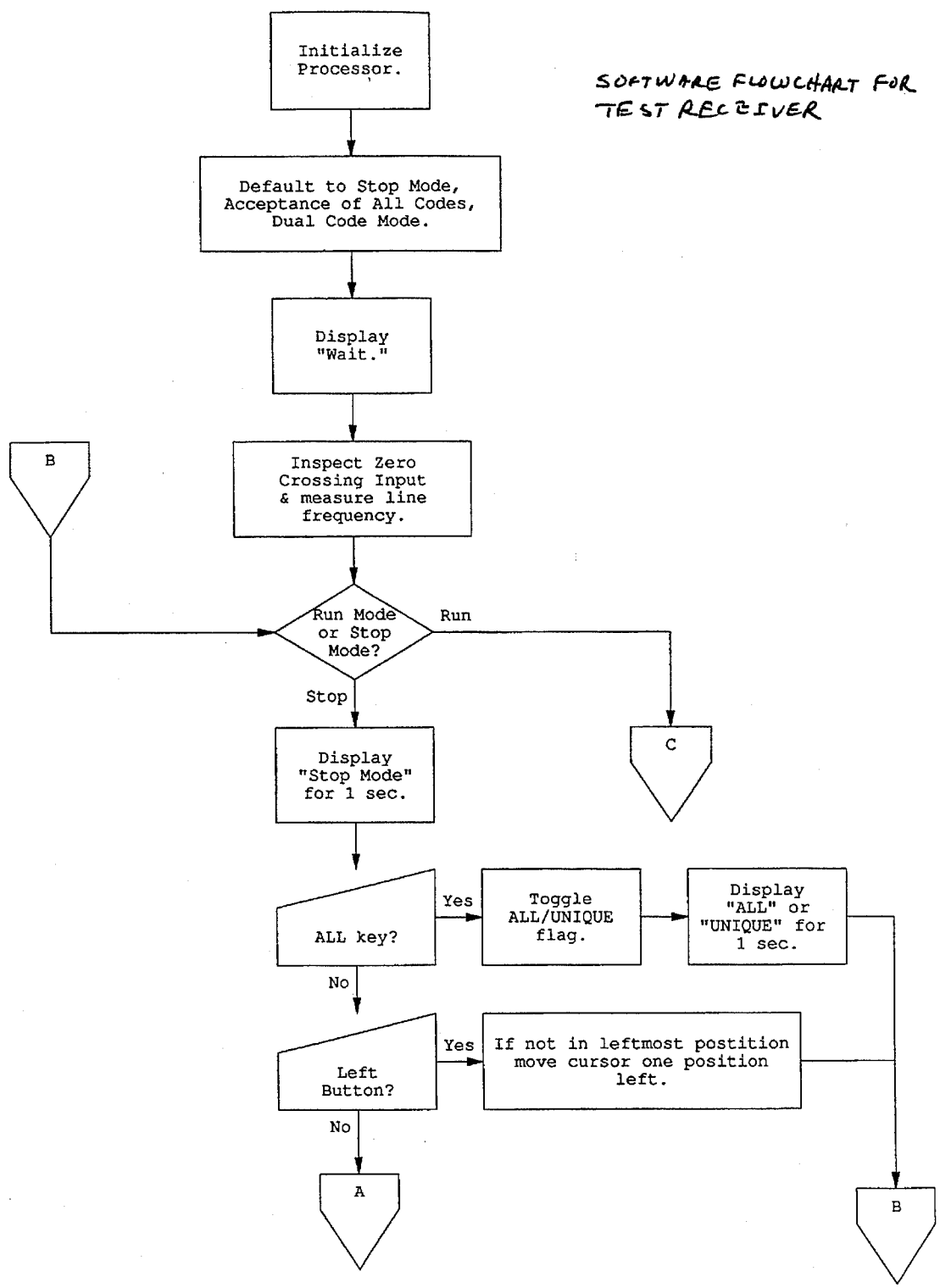

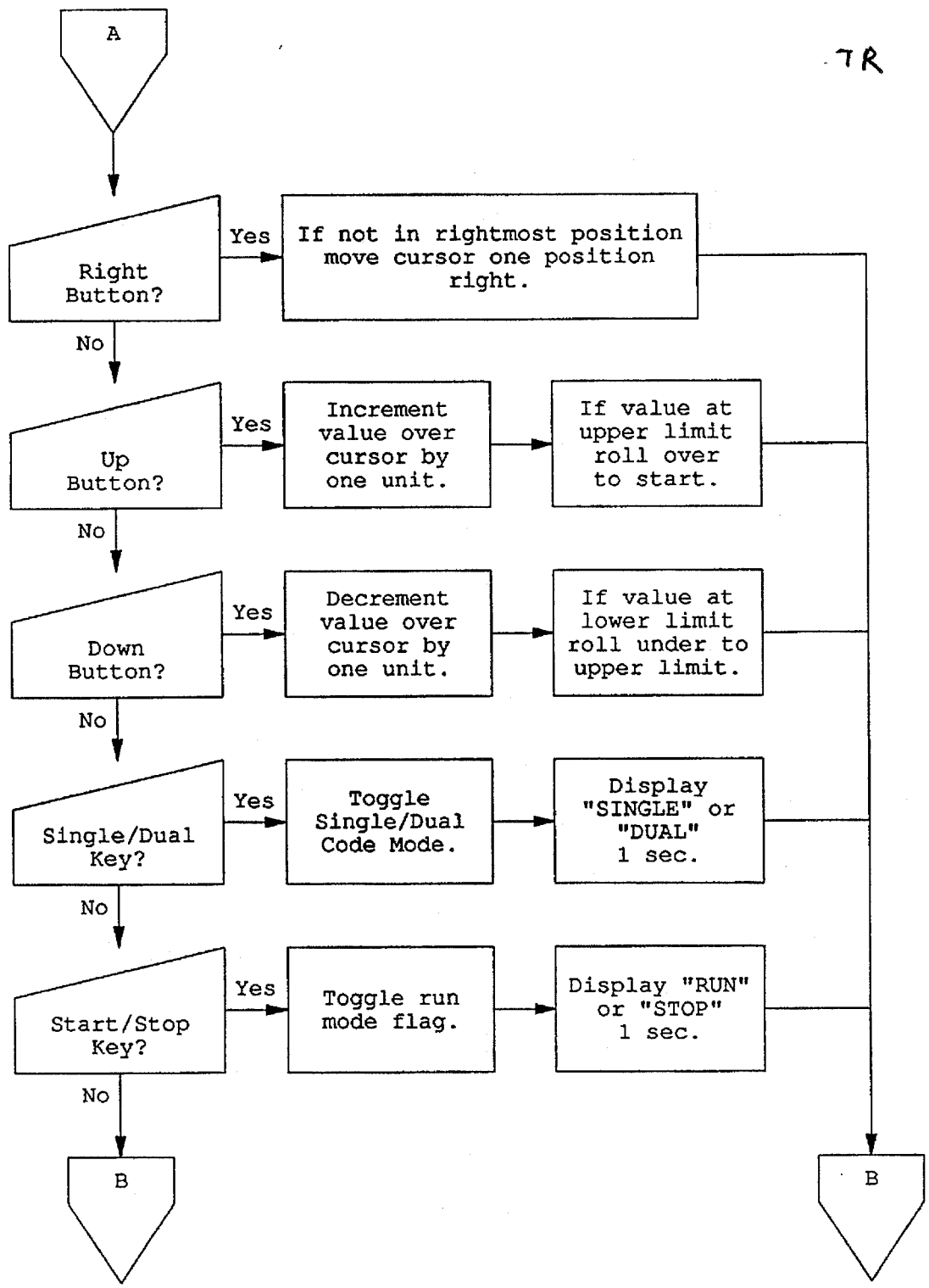

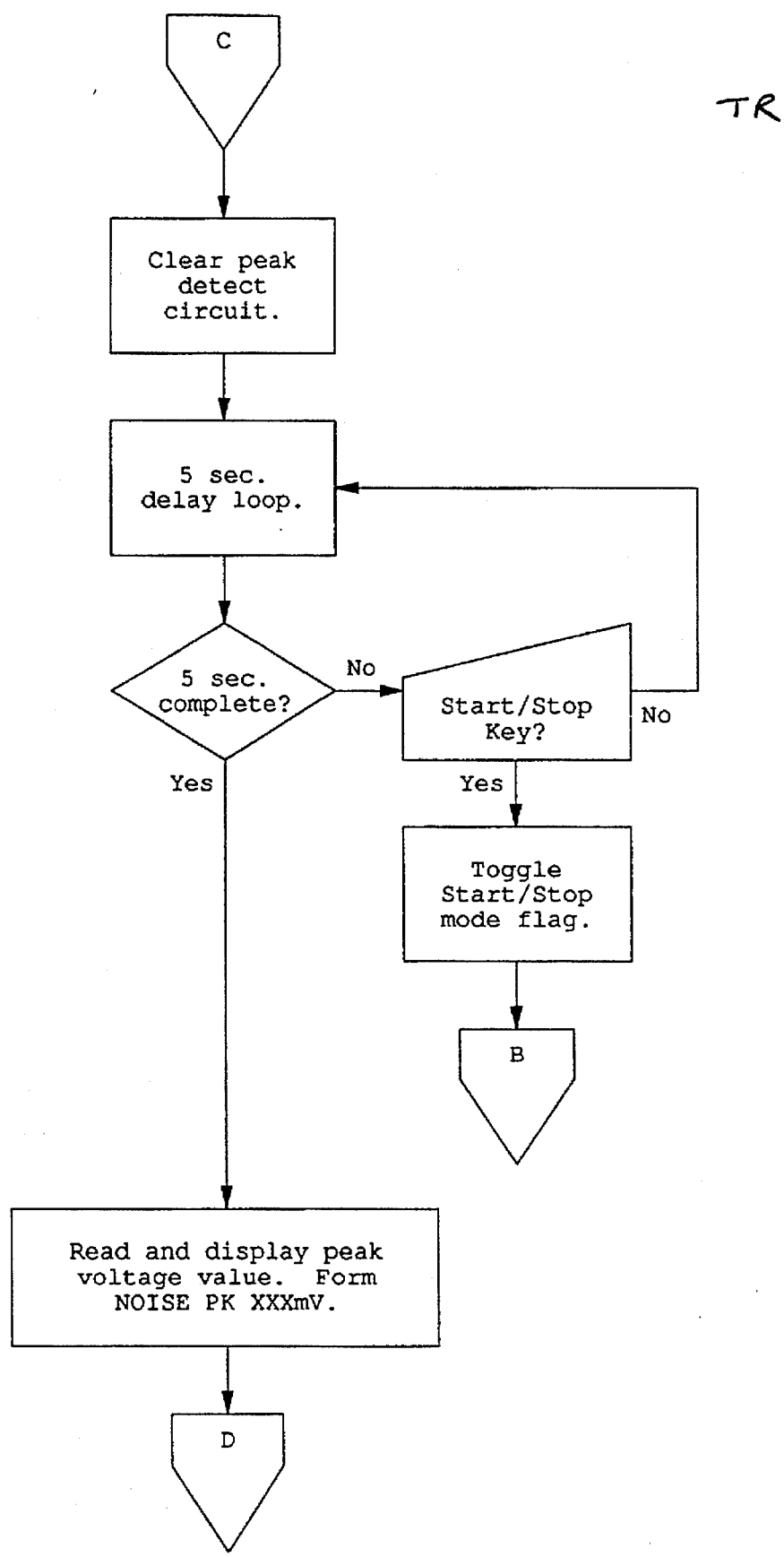

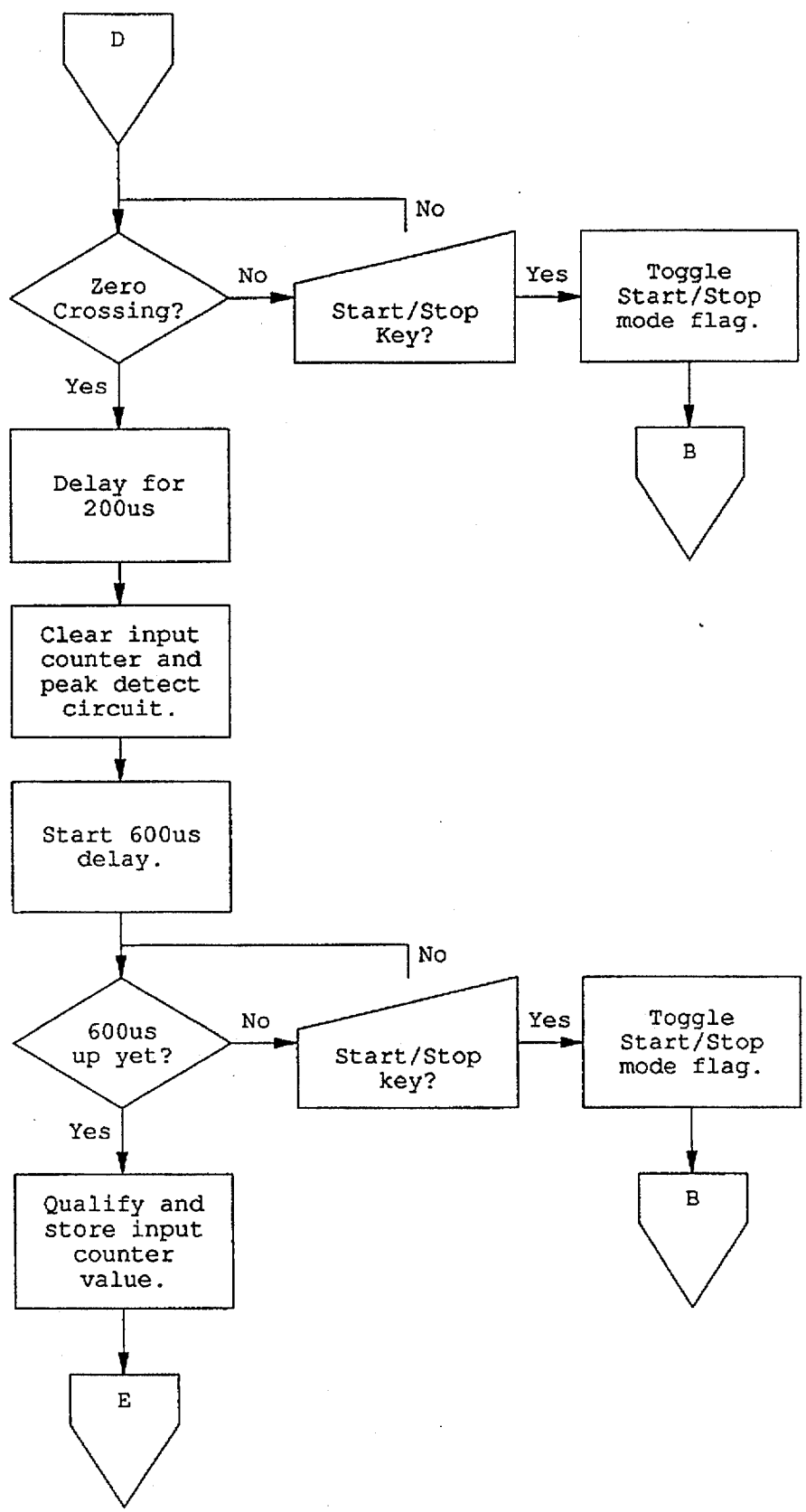

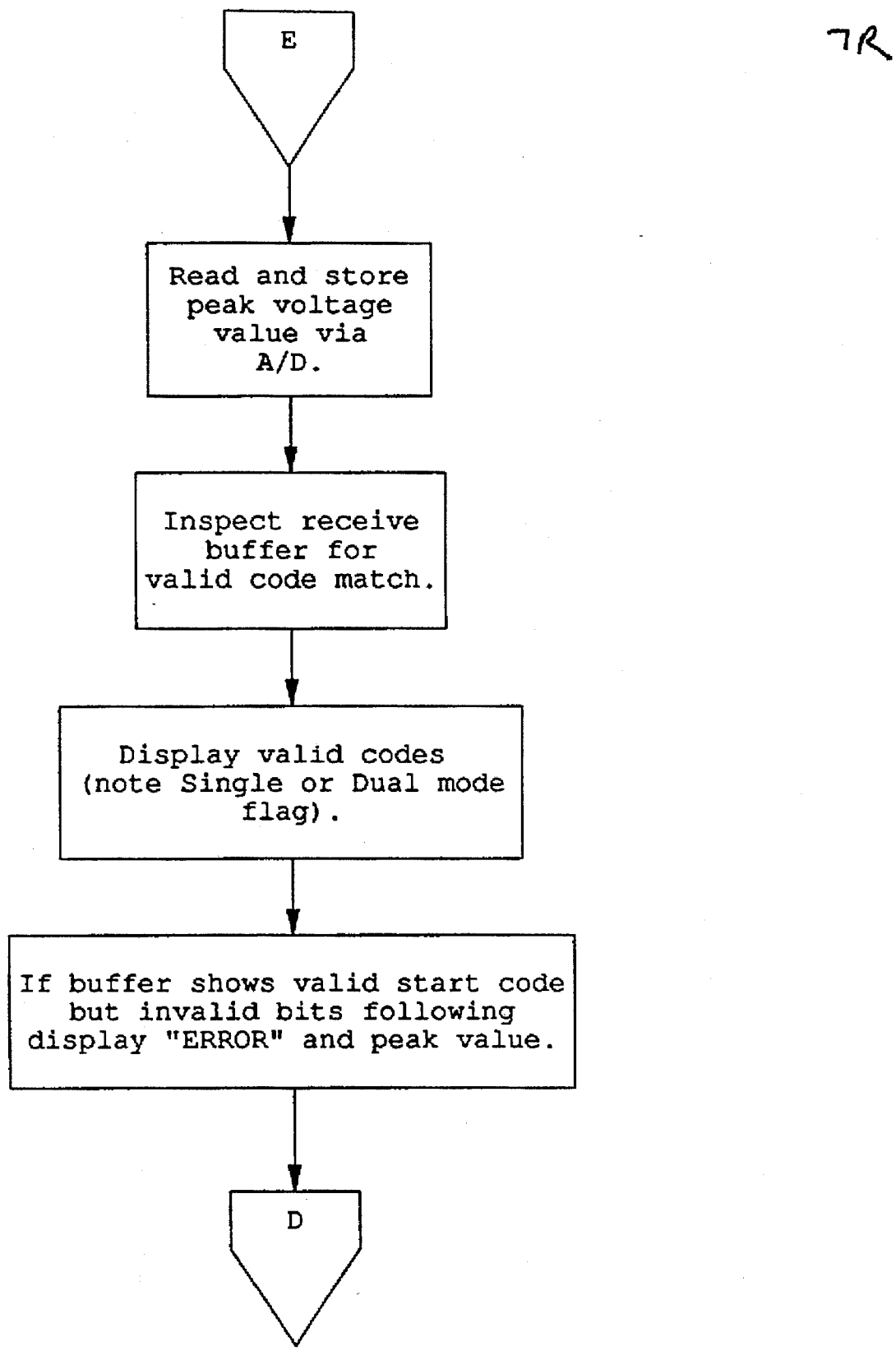

What is claimed is:

1. In a power line communication system comprising at least one transmitter electrically connected to a power line for the transmission of a data signal, the power line transmitting an AC power line signal of known frequency and having zero crossings, the data signal comprising data bits transmitted over the power line at a frequency greater than the frequency of the power line signal with the data signal's data bits transmitted at the zero crossing of the power line signal, at least one addressable receiver having a receiver address associated therewith, the receiver electrically connected to the power line and capable or receiving the data signal generated by the transmitter, the data signal being generally in accordance with a known protocol, the known protocol comprising an X-10 protocol including in sequence a start code comprising a bit pattern of 1110, a four bit first receiver address code, and an extended code command comprising a bit pattern of 01111, the improvement comprising:

the data signal further comprising a second receiver address/command code of at least five bits in number and the number of bits thereof being indivisible by four, immediately following the extended code command of the bit pattern 01111, at least one bit of said second address/command code representing whether the second address/command code represents a portion of the receiver address or a command, such that by combining the second receiver address/command code with the first receiver address code when the second receiver address/command code represents a portion of the receiver address at least 257 receivers with unique addresses may be controlled by data signals transmitted on the power line.

2. The power line communication system of claim 1 wherein the second receiver address/command code is comprised of exactly nine data bits.

3. A power line communication system programmer for a system comprising a plurality of addressable devices, each addressable device having an electric connector for connection to a power line, means for storing a programmable address code, and an electrical programming port connector, the programmer comprising:

means for receiving electric power, the electric power receiving means separate from the electric connectors of the plurality of addressable devices, a mating connector for connection to the electrical programming port connector of an addressable device, means for specifying an address code to be transmitted to the addressable device, and means for electronically transmitting the specified address code to the addressable device via the electrical programming port connector such that the specified address code is stored by the programmable address code storing means of the addressable device.

4. The programmer of claim 3 wherein at least one of the addressable devices comprises a receiver.

5. The programmer of claim 3 wherein at least one of the addressable devices comprises a transmitter.

6. A power line communication system receiver comprising:

means for connecting the receiver to a power line over which command signals including an address are transmitted, the power line transmitting a level of power, means for connecting the receiver to an electrical appliance, switch means for selectively controlling the level of power from the power line which is connected to the means for connecting the receiver to the electrical appliance, the switch means being responsive to command signals transmitted on the power line, means for storing an address code, and an electrical communications port operably connected to the address code storing means, the electrical communications port separate from the power line connecting means, such that the receiver receives a transmitted address code through the electrical communications port and stores the transmitted address in the storing means, and such that the switch means responds only to command signals having an address corresponding to the address stored by the address code storing means.

7. The power line communication system receiver of claim 6 wherein the electrical communications port includes two electrical conductors operably connected to the switch means such that shorting the two electrical conductors together results in actuation of the switch means.

8. The receiver for a power line communication system of claim 6 wherein the electrical communications port includes means for supplying electrical power to the receiver when receiving a transmitted address code.

9. A power line communication system transmitter comprising:

means for connecting the transmitter to a power line, means for transmitting command signals onto the power line to control receivers connected to the power line, means for storing an address code operably connected to the command signal transmitting means, an electrical communications port operably connected to the address code storing means, and means for receiving a transmitted address code received through the electrical communications port and storing the transmitted address in the storing means, the receiving means operably connected to the electrical communications port, such that the command signals transmitted onto the power line by the transmitter include an address corresponding to the address stored by the storing means.

10. The transmitter of claim 9 wherein the electrical communications port includes means for supplying electrical power to the transmitter when receiving a transmitted address code.

11. A power line communication system receiver for a power line communication system capable of generating command signals of a plurality of different protocols, the power line communication system including a power line transmitting a level of power and an AC power line signal of known frequency and having zero crossings, the system further comprising a command signal of data bits transmitted over the power line at a frequency greater than the frequency of the power line with the command signal's data bits transmitted at the zero crossing of the power line, the receiver comprising:

means for connecting the receiver to a power line, means for connecting the receiver to an electrical appliance, means for storing an address, and switch means for selectively controlling the level of power from the power line which is connected to the means for connecting the receiver to the electrical appliance, the switch means being responsive to command signals transmitted on the power line that include the stored address of the receiver, the switch means operably connected to the address storing means, means for connecting the receiver to a power line, and means for connecting the receiver to an electrical appliance, and the switch means being responsive to command signals of the plurality of different protocols transmitted on the power line.

12. The power line communication system receiver of claim 11 wherein one of the protocols to which the receiver is responsive to is an X-10 protocol including in sequence a four bit start code, a four bit address code and a five bit extended code command.

13. A power line communication system transmitter comprising:

means for connecting the transmitter to a power line, means for storing an address code, means for transmitting command signals onto the power line to control receivers connected to the power line such that the command signals transmitted onto the power line by the transmitter include an address corresponding to the address stored by the storing means, the command signal transmitting means operably connected to the means for connecting the transmitter to a power line and the address code storing means, means for changing the stored address code, means for storing a password, and preventing means operable to prevent changing of the stored address code unless a password is specified which corresponds to the stored password, the preventing means operably connected to the means for changing the stored address code and the means for storing a password.

14. The power line communication system transmitter of claim 13, further comprising:

an electrical communications port connected to the changing means, the port being operable to receive a specified password.

15. A power line communication system receiver comprising;

means for connecting the receiver to a power line, the power line transmitting a level of power, means for connecting the receiver to an electrical appliance, means for storing an address code, switch means for selectively controlling the level of power from the power line which is connected to the means for connecting the receiver to the electrical appliance, the switch means being responsive to command signals transmitted on the power line, the switch means operably connected to the means for connecting the receiver to a power line, means for connecting the receiver to an electrical appliance, and the address code storing means, such that the switch means responds only to command signals having an address corresponding to the address stored by the storing means, means for changing the stored address code, means for storing a password, and preventing means operably to prevent changing the stored address code unless a password is specified which corresponds to the stored password, the preventing means operably connected to the means for changing the stored address code and operably connected to the means for storing a password.

16. The power line communication system receiver of claim 15, further comprising:

an electrical communications port connected to the means for changing the stored address code, the port being operable to receive a specified password.

17. A power line communication system transmitter comprising:

means for connecting the transmitter to a power line, the power line transmitting a level of power, means for storing an address code, means for transmitting command signals onto the power line to control receivers connected to the power line such that the command signals transmitted ont the power line by the transmitter include an address corresponding to the address stored by the storing means, and timing means automatically retransmitting a previously transmitted command signal onto the power line after a predetermined time period, the timing means operably connected to the means for transmitting command signals.

18. A power line communication system receiver, comprising:

means for connecting the receiver to a power line and to an electrical appliance, the power line transmitting a level of power, means for storing an address code, switch means for selectively controlling the level of power from the power line is connected to the means for connecting the receiver to the electrical appliance, the switch means having a default state, the switch means being responsive only to command signals transmitted on the power line having an address corresponding to the address code stored by the storing means, means for measuring time elapsed since the receiver last received a command signal that included an address corresponding to its address code, and means for causing the switch means to enter its default state upon passage of a predetermined amount of time.

19. A power line communication system comprising:

at least one power line communication transmitter comprising means for connecting the transmitter to a power line, means for storing a transmitter address code, means for transmitting command signals onto the power line to control receivers connected to the power line such that the command signals transmitted on to the power line by the transmitter include an address corresponding to the address code stored by the transmitter address code storing means, the command signal transmitting means operably connected to the transmitter address code storing means, a transmitter electrical communications port separated from the means for connecting the transmitter to the power line, and transmitter status transmit means for transmitting information regarding the transmitter's status to the transmitter communications port, the transmitter status transmit means being responsive to a predetermined command signal received from the transmitter communications port; and at least one power line communication system receiver, comprising means for connecting the receiver to a power line, the power line transmitting a level of power, means for connecting the receive to an electrical appliance, means for storing a receiver address code, switch means for selectively controlling the level of power from the power line which is connected to the means for connecting the receiver to the electrical appliance, the switch means being responsive to command signals transmitted on the power line, such that the switch means responds only to command signals having an address corresponding to the address stored by the receiver address code storing means, a receiver electrical communications port separate from the means for connecting the receiver to a power line, and receiver status transmit means for transmitting information regarding the receiver's status to the receiver communications port, the receiver status transmit means being responsive to the same predetermined command signal received from the receiver communications port to which the transmitter is responsive.

20. The power line communication system of claim 19, wherein the transmitter electrical communications ports of the at least one transmitter and the receiver electrical communications port of the at least one receiver each accept an identical electrical connector.

21. A power line communication system programmer for use in connection with a power line communication system having at least one power line communication transmitter including.

means for connecting the transmitter to a power line, means for storing a transmitter address code, means for transmitting command signals onto the power line to control receivers connected to the power line such that the command signals transmitted onto the power line by the transmitter include an address corresponding to the address code stored by the transmitter address code storing means, the command signal transmitting means operably connected to the transmitter address code storing means, and a transmitter electrical communications port operably connected to the transmitter address code storing means, and separate from the means for connecting the transmitter to a power line;

at least one power line communication system receiver including means for connecting the receiver to a power line, the power line transmitting a level of power, means for connecting the receiver to an electrical appliance, means for storing a receiver address code, switch means for selectively controlling the level of power from the power line which is connected to the means for connecting the receiver to the electrical appliance, the switch means being responsive to command signals transmitted on the power line, such that the switch means responds only to command signals having an address corresponding to the address stored by the receiver address code storing means, the switch means operably connected to the address code storing means, and a receiver electrical communications port separate from the means for connecting the receiver to a power line;

the programmer comprising:

a programer electrical communications port capable of mating with the electrical communications ports of both the transmitter and receiver; and a command generation means for generating a command to be transmitted to the electrical communications port of the programmer to thereby cause a transmitter or receiver to transmit information regarding the transmitter's or receiver's status to the electrical communications port of the programmer.

22. The power communications system programmer of claim 21 further comprising display means for displaying at least a portion of the information transmitted to the programmer communications port.

23. The power communications system programmer of claim 21 further comprising means for specifying an address which may be transmitted to the programmer electrical communications port to thereby be stored by the storing means of the at least one transmitter or at least one receiver.

24. A power line communication system receiver for use in connection with the power line communication system having a plurality of power line communication transmitters, each transmitter comprising means for connecting the transmitter to a power line, means for storing an address code, means for transmitting command signals onto the power line to control receivers connected to the power line such that the command signals transmitted onto the power line by the transmitter include an address corresponding to the address stored by the storing means, and such that the command signals comprise at least one of a plurality of actions codes specifying different actions for receivers to take;

the receiver comprising:

means for connecting the receiver to a power line; and means for displaying the address of a command signal transmitted by a transmitter onto the power line, the means for displaying the address operably connected to the means for connected the receiver to a power line.

25. The receiver for a power line communication system of claim 24, further comprising means for displaying an action code corresponding to a command signal transmitted for each displayed address.

26. The receiver for a power line communication system of claim 25, further comprising means for specifying an address and means for displaying only those action codes from command signals referencing the specified address.

27. The receiver for a power line communication system of claim 24, wherein each command signal has a signal strength associated therewith, the receiver further comprising means for displaying the signal strength of a transmitted command signal.

* * * * *